US006609163B1

United States Patent
Nguyen et al.

(10) Patent No.: US 6,609,163 B1
(45) Date of Patent: Aug. 19, 2003

(54) MULTI-CHANNEL SERIAL PORT WITH PROGRAMMABLE FEATURES

(75) Inventors: Tai H. Nguyen, Houston, TX (US); Jason A. T. Jones, Houston, TX (US); Jonathan G. Bradley, Houston, TX (US); Natarajan Seshan, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 546 days.

(21) Appl. No.: 09/591,527

(22) Filed: Jun. 9, 2000

Related U.S. Application Data

(62) Division of application No. 09/055,011, filed on Apr. 3, 1998, now Pat. No. 6,167,466.
(60) Provisional application No. 60/053,081, filed on Jul. 9, 1997.

(51) Int. Cl.[7] .......................... G06F 3/00; G06F 13/00; G06F 13/12; G06F 13/14
(52) U.S. Cl. .......................... 710/21; 710/14; 710/20; 710/30; 710/33; 710/45; 710/62; 710/72; 709/231; 709/232; 709/236; 712/225
(58) Field of Search .............................. 710/30, 36, 14, 710/20, 21, 33, 45, 62, 72, 129; 709/232, 236, 231, 250; 712/225

(56) References Cited

U.S. PATENT DOCUMENTS

| 3,632,882 A | * | 1/1972 | Ciecierski et al. ........... 370/472 |
| 3,732,374 A | | 5/1973 | Rocher et al. ........... 179/15 AL |
| 4,460,993 A | | 7/1984 | Hampton et al. .............. 370/84 |
| 4,868,784 A | | 9/1989 | Marshall et al. ............. 364/900 |
| 4,939,722 A | * | 7/1990 | Beichler ..................... 370/538 |
| 4,980,886 A | | 12/1990 | Bernstein ..................... 370/80 |
| 5,029,163 A | * | 7/1991 | Chao et al. .................. 370/458 |
| 5,109,494 A | | 4/1992 | Ehlig et al. .................. 395/325 |
| 5,138,610 A | | 8/1992 | Kohlman et al. ........... 370/58.2 |
| 5,168,493 A | | 12/1992 | Nelson et al. ................. 370/84 |
| 5,241,568 A | | 8/1993 | Fernandez et al. ........... 375/116 |
| 5,553,066 A | * | 9/1996 | Kato et al. ................... 370/360 |
| 5,602,848 A | | 2/1997 | Andrews et al. ............. 370/465 |
| 5,610,919 A | | 3/1997 | Willard et al. ............... 370/336 |
| 5,617,083 A | | 4/1997 | Schwendeman et al. ...................... 340/825.44 |
| 5,671,223 A | * | 9/1997 | Shachar et al. ............. 370/471 |
| 5,734,927 A | | 3/1998 | Boutaud et al. ............. 395/880 |
| 5,805,822 A | | 9/1998 | Long et al. ............. 395/200.62 |
| 5,889,781 A | | 3/1999 | Eftimakis et al. ........... 370/509 |
| 5,896,549 A | | 4/1999 | Hansen et al. ............... 395/842 |
| 6,128,282 A | * | 10/2000 | Liebetreu et al. ........... 370/235 |
| 6,470,409 B1 | * | 10/2002 | Ridgeway .................... 710/305 |

OTHER PUBLICATIONS

*TMS320C5X User's Guide*, Texas Instruments Incorporated, Jan. 1993, pp. 5–15 to 5–48.
*Audio Codec '97 Component Specification*, Rev. 1.02, May 28, 1996; Intel Corp.
*ADI–ADSP–2106x SHARC User's Manual*, 2nd ed., 7/96.

* cited by examiner

Primary Examiner—Jeffrey Gaffin
Assistant Examiner—Tanh Q. Nguyen
(74) Attorney, Agent, or Firm—Gerald E. Laws; W. James Brady, III; Frederick J. Telecky, Jr.

(57) ABSTRACT

A microprocessor 1 is described which includes a multi-channel serial port (MCSP) 120. MCSP 120 includes clock generation and frame sync generation circuitry 300, multi-channel selection circuitry 310, and companding circuitry 320. The clock generation and frame sync generation circuitry is configurable by means of a Serial Port Control Register SPCR, and Receive Control Register RCR, a Transmit Control Register XCR, a Sample Rate Generator Register SRGR, and Pin Control Register PCR. The multi-channel selection circuitry is configurable by means of a Multi-Channel Register MCR, a Receive Channel Enable Register RCER and a Transmit Channel Enable Register XCER. Companding circuitry 320 performs optional expansion or compression of received or transmitted data using $\mu$-LAW or A-LAW, as selected by the Receive Control Register or the Transmit Control Register.

12 Claims, 29 Drawing Sheets

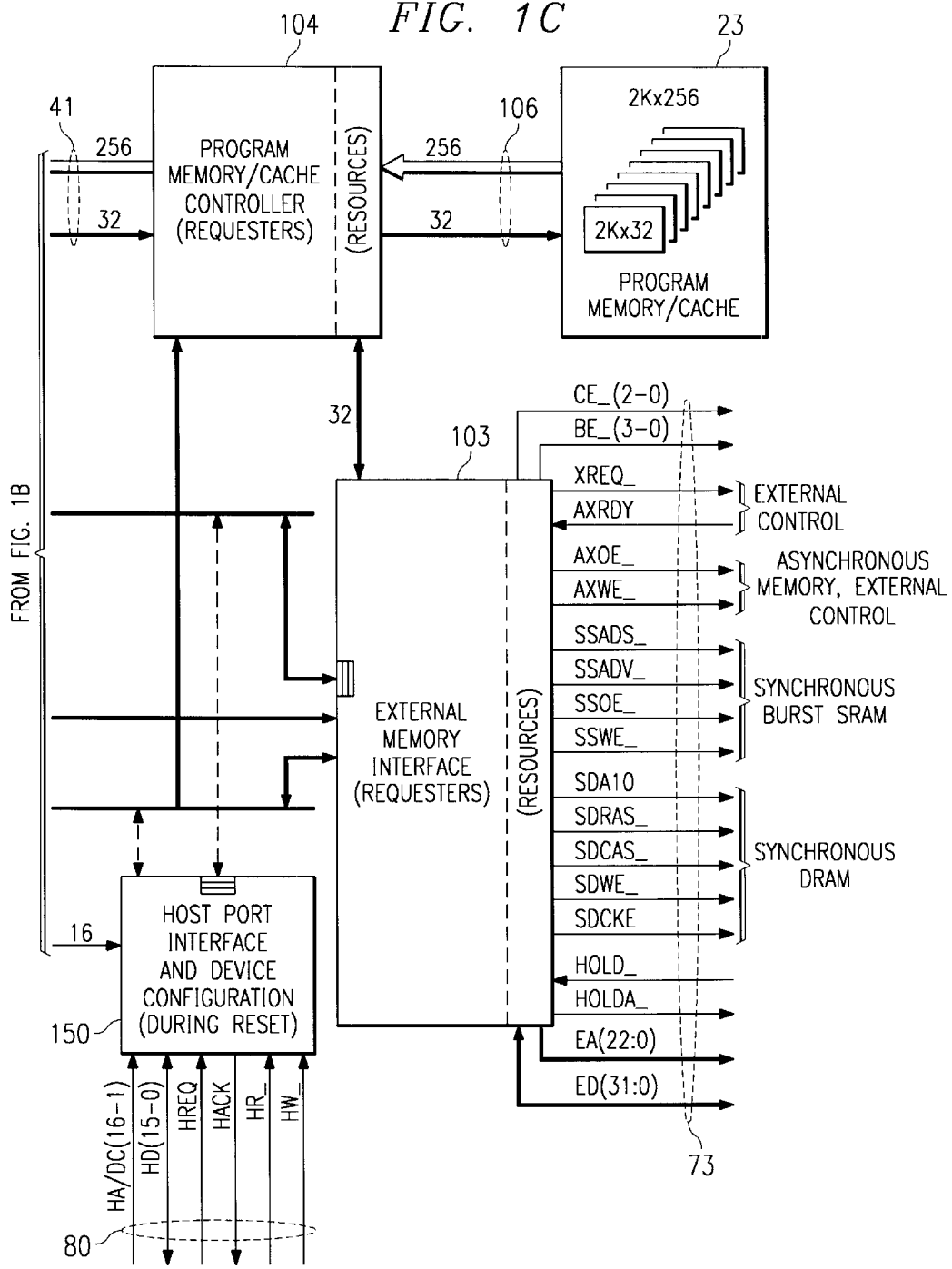

| MEMORY MAP 0 | | |
|---|---|---|
| STARTING ADDRESS | | BLOCK SIZE (BYTES) |
| 000 0000 | EXTERNAL MEMORY SPACE CE0 | 16M |
| 100 0000 | EXTERNAL MEMORY SPACE CE1 | 4M |
| 140 0000 | INTERNAL PROGRAM RAM | 64K |
| 141 0000 | RESERVED | 4M |
| 180 0000 | INTERNAL PERIPHERAL SPACE | 4M |
| 1C0 0000 | RESERVED | 4M |
| 200 0000 | EXTERNAL MEMORY SPACE CE2 | 32M |
| 400 0000 | RESERVED | 1984M |
| 8000 0000 | INTERNAL DATA RAM | 64K |
| 8001 0000 | RESERVED | 4M |
| 8040 0000 | RESERVED | 2044M |
| 1 0000 0000 | | |

FIG. 3A

| MEMORY MAP 1 | | |
|---|---|---|
| STARTING ADDRESS | | BLOCK SIZE (BYTES) |
| 000 0000 | INTERNAL PROGRAM RAM | 64K |
| 001 0000 | RESERVED | 4M |
| 040 0000 | EXTERNAL MEMORY SPACE CE0 | 16M |
| 140 0000 | EXTERNAL MEMORY SPACE CE1 | 4M |
| 180 0000 | SAME AS MEMORY MAP 0 | |
| 1 0000 0000 | | |

| 31 | 24 23 | 22 | 21 | 20 19 | 18 | 17 | 16 |
|---|---|---|---|---|---|---|---|
| reserved | reserved | reserved | XINTM | XSYNCERR | XEMPTY- | XRDY | XRST- |
| R, +0 | R, +0 | R, +0 | RW, +0 | RW, +0 | R, +0 | R, +0 | RW, +0 |

| 15 | 14 | 13 12 | 10 9 | 8 7 | 6 | 5 | 4 3 | 2 | 1 | 0 |
|---|---|---|---|---|---|---|---|---|---|---|
| DLB | RJUST | CLKSTP | reserved | reserved | reserved | RINTM | RSYNCERR | RFULL | RRDY | RRST- |
| RW, +0 | RW, +0 | RW, +0 | R, +0 | R, +0 | R, +0 | RW, +0 | RW, +0 | R, +0 | R, +0 | RW, +0 |

FIG. 6

| 31 | 16 |
|---|---|
| reserved | |
| R, +0 | |

| 15 14 13 | 12 | 11 | 10 | 9 | 8 | 7 | 6 | 5 | 4 3 | 2 | 1 | 0 |
|---|---|---|---|---|---|---|---|---|---|---|---|---|
| resv | XIOEN | RIOEN | FSXM | FSRM | CLKXM | CLKRM | resv | CLKS_STAT | DX_STAT DR_STAT | FSXP | FSRP | CLKXP | CLKRP |
| R, +0 | RW, +0 | RW, +0 | RW, +0 | RW, +0 | RW, +0 | RW, +0 | R, +0 | R, +0 | R, +0 | RW, +0 | RW, +0 | RW, +0 | RW, +0 |

FIG. 7

| 31 | 30 | 24 23 | 21 20 | 19 | 18 | 17 | 16 |
|---|---|---|---|---|---|---|---|
| RPHASE | RFRLEN2 | RWDLEN2 | RCOMPAND | RFIG | RDATDLY | |
| RW, +0 | RW, +0 | RW, +0 | RW, +0 | RW, +0 | RW, +0 | |

| 15 | 14 | 8 7 | 5 4 | 0 |
|---|---|---|---|---|
| reserved | RFRLEN1 | RWDLEN1 | reserved | |
| R, +0 | RW, +0 | RW, +0 | R, +0 | |

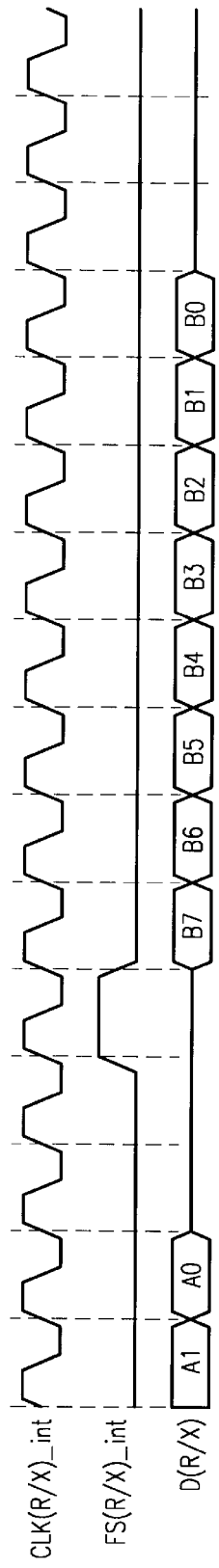
FIG. 8
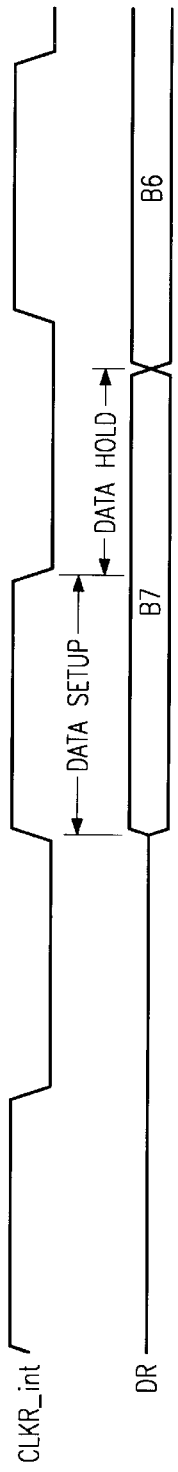
FIG. 9
FIG. 10

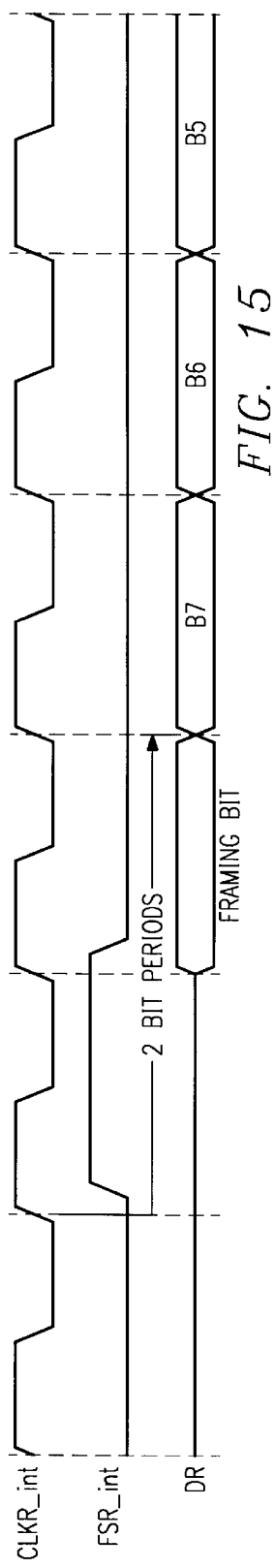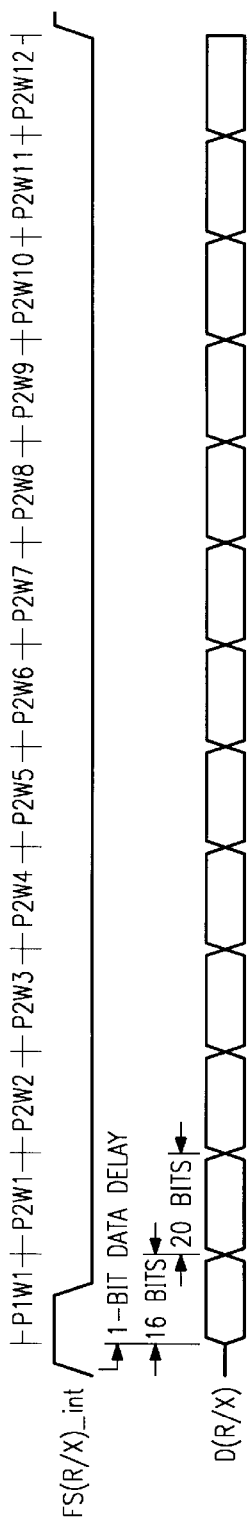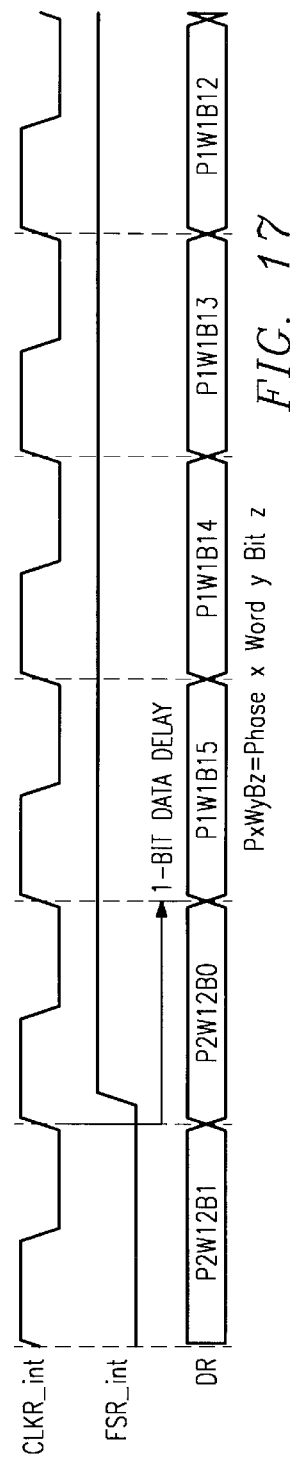

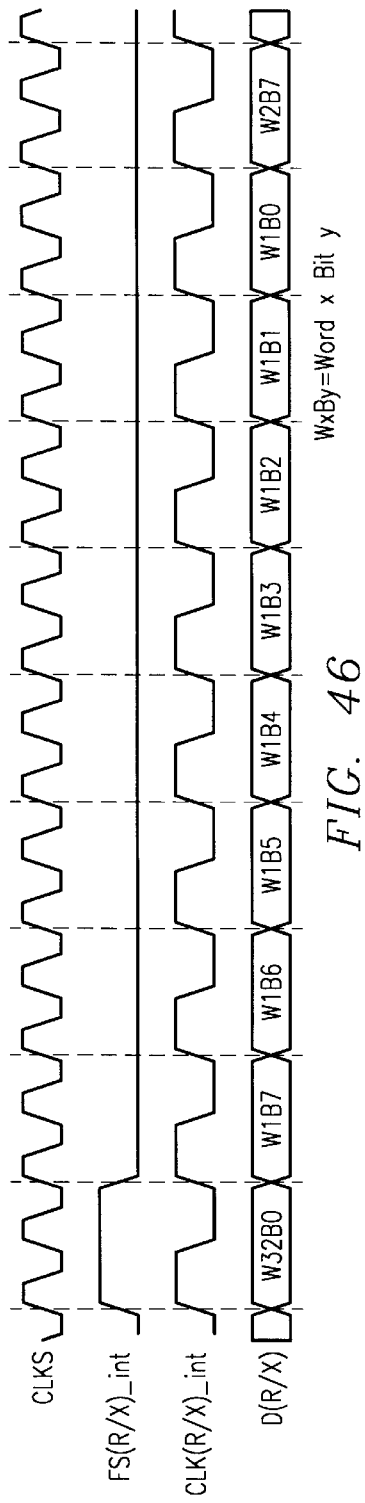
FIG. 46
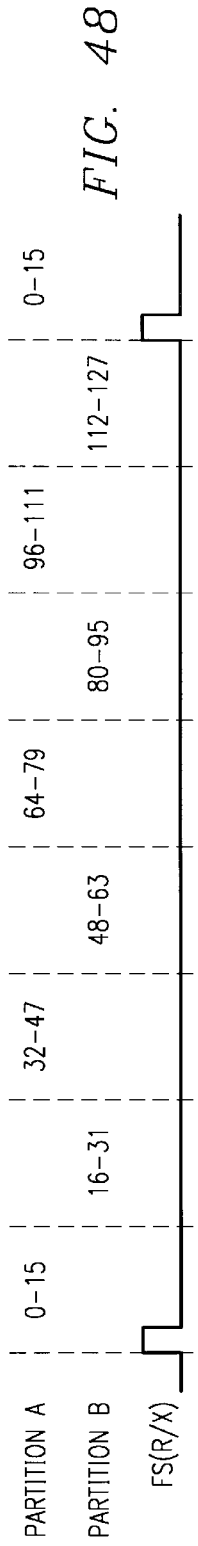
FIG. 47
FIG. 48

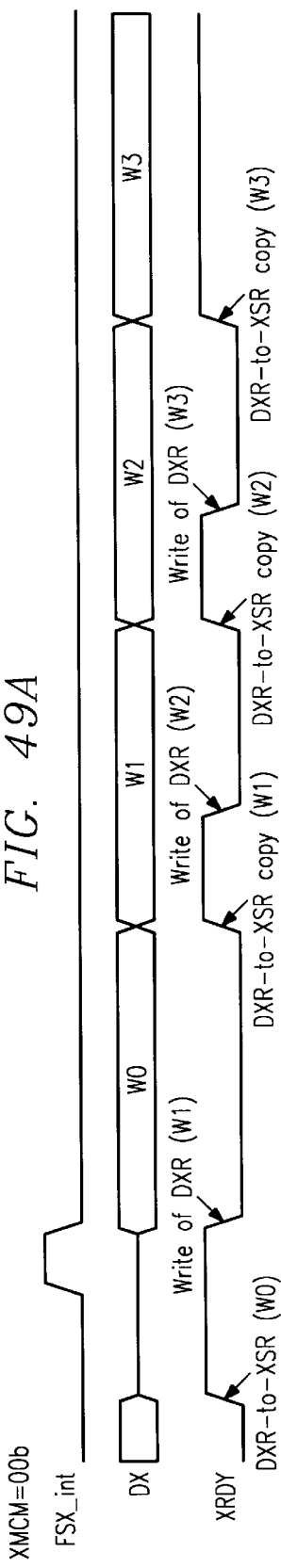
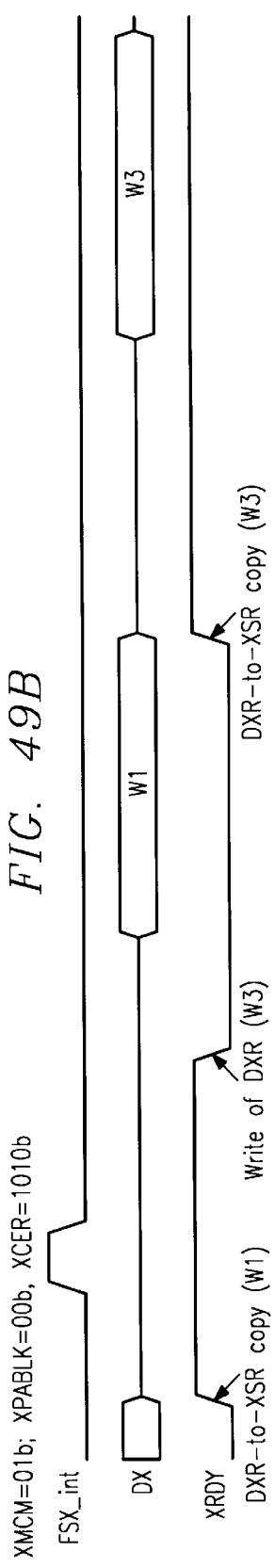
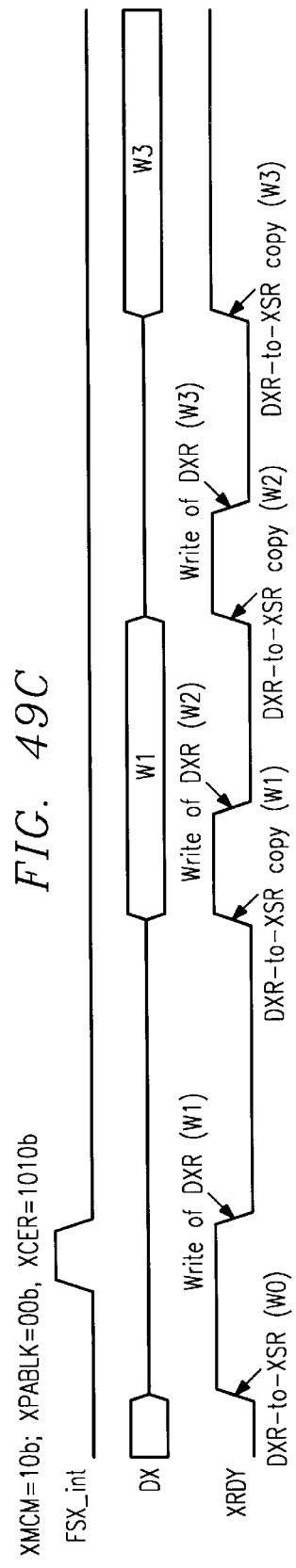

MULTI-CHANNEL SERIAL PORT WITH PROGRAMMABLE FEATURES

This application claims priority under 35 USC §119(e) (1) of Provisional Application Ser. No. 60/053,081, filed Jul. 9, 1997. This application is a Divisional Application under 1.53(b), from pending patent application Ser. No. 09/055, 011, filed Apr. 3, 1998 now U.S. Pat. No. 6,167,466, issued Dec. 26, 2000.

CROSS REFERENCE TO RELATED APPLICATIONS

This application is related to co-assigned application Ser. No. 09/012,813 (TI docket number T-25311), now U.S. Pat. No. 6,182,203, issued Jan. 30, 2000 filed contemporaneously herewith and incorporated herein by reference.

TECHNICAL FIELD OF THE INVENTION

This invention relates to microprocessors, and particularly relates to microprocessor integrated circuits which include an on-chip serial port.

BACKGROUND OF THE INVENTION

Microprocessor designers have increasingly endeavored to improve performance in various microprocessors by increasing clock speeds and adding parallelism. Large blocks of random access memory (RAM) are included within the microprocessor for data storage and for program storage in order to reduce memory access times. Various types of input/output devices are included within a microprocessor integrated circuit in order to reduce total system chip count and cost. Serial ports are an example of a class of input/output devices that are commonly included with microprocessors. Various examples of serial ports may be found on digital signal processors available from Texas Instruments Incorporated, including TMS320C2x and TMS320C5x series of devices. Various features are included within the serial ports on these devices, such as Full-Duplex communication, double buffered data registers which allow a continuous data stream, independent framing and clocking for receive and transmit, direct interface to industry standard Codecs, Analog Interface Chips (AICs), and other serially connected A/D and D/A devices, and external shift clock generation or an internal programmable frequency shift clock.

An object of the present invention is to provide improvements in the operation and control of serial interfaces for microprocessor integrated circuits.

SUMMARY OF THE INVENTION

In general, and in a form of the present invention, a microprocessor which has a central processing unit (CPU) and an internal memory, is further equipped with serial port interface circuitry that is operable to transmit and receive data with dual phase frames, wherein each phase has a different set of parameters.

In another embodiment of the present invention, the serial port interface circuitry is further operable to select a different number of words for each phase, and further operable to selectively enable or mask particular channels.

In another embodiment of the present invention, the serial port interface circuitry further comprises clock generation circuitry that is operable to convert a multi-rate clock to a single rate clock.

In another embodiment of the present invention, the serial port interface circuitry further comprises clock generation circuitry operable to perform re-synchronization.

In another embodiment of the present invention, the serial port interface circuitry further comprises clock generation circuitry operable to generate a sample clock and timing synchronization signals from an external clock source.

Other embodiments of the present invention will be evident from the description and drawings.

BRIEF DESCRIPTION OF THE DRAWINGS

Other features and advantages of the present invention will become apparent by reference to the following detailed description when considered in conjunction with the accompanying drawings, in which:

FIGS. 1B and 1C are a more detailed block diagram of the microprocessor of FIG. 1A;

FIGS. 3A and 3B illustrate two address maps used by the microprocessor of FIG. 1A;

Figure 4:
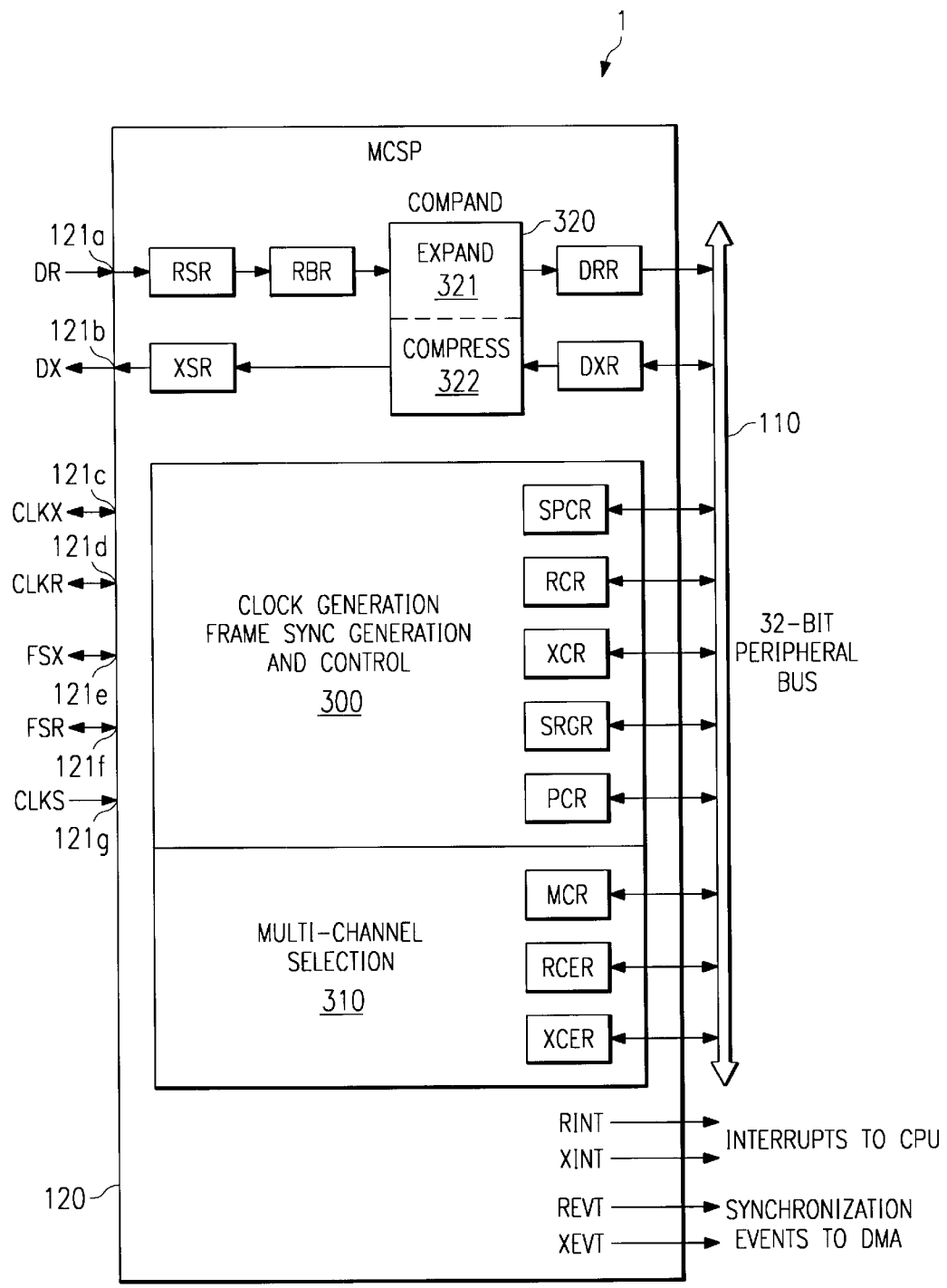
FIG. 4 is a Block Diagram of the Multichannel Serial Port (MCSP) contained within the microprocessor of FIG. 1A.
Figure 11:
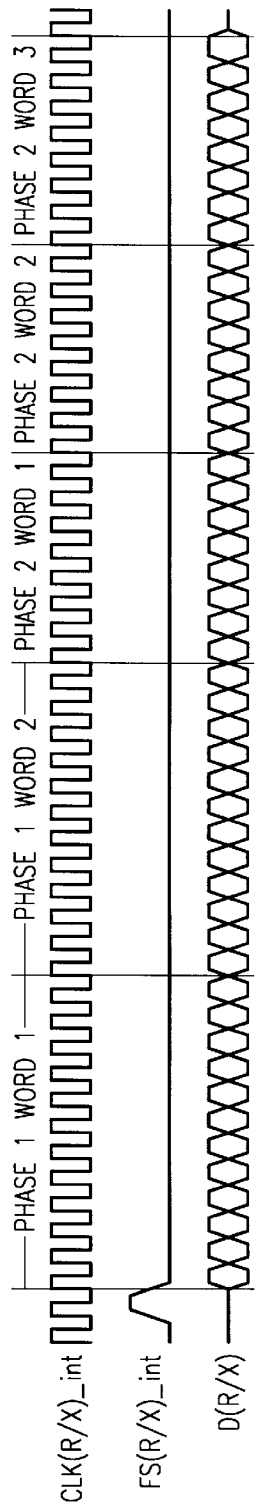
Figure 12:
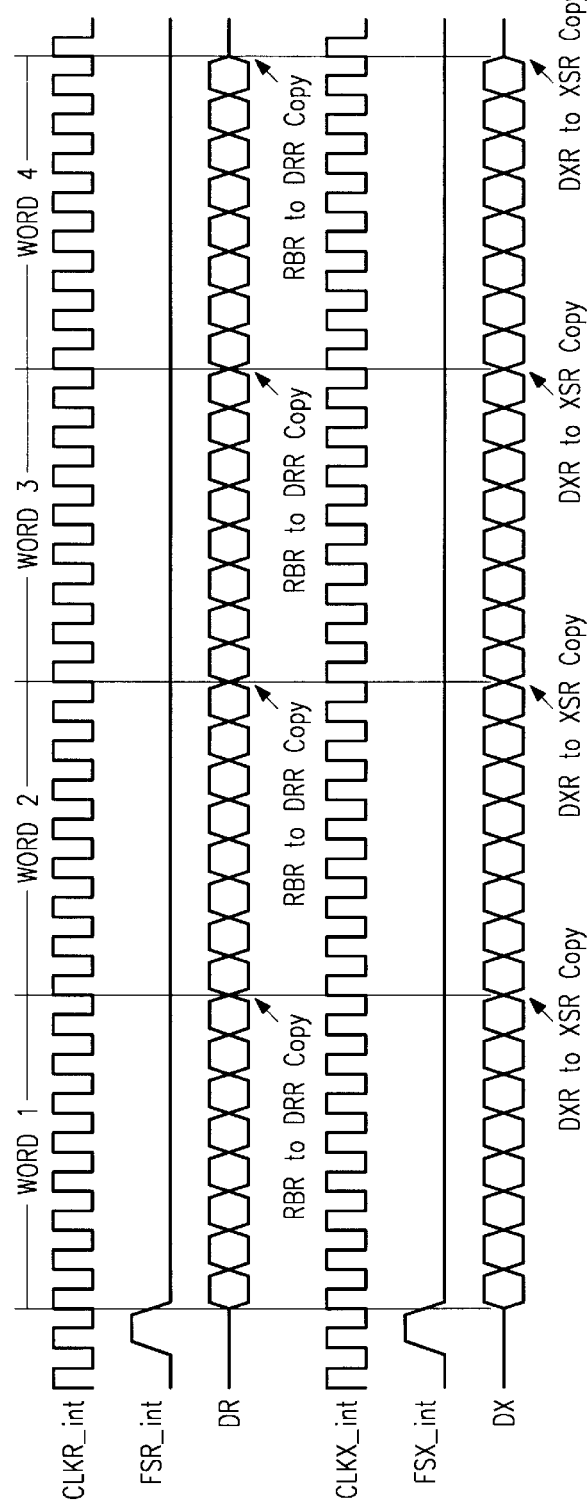
Figure 13:
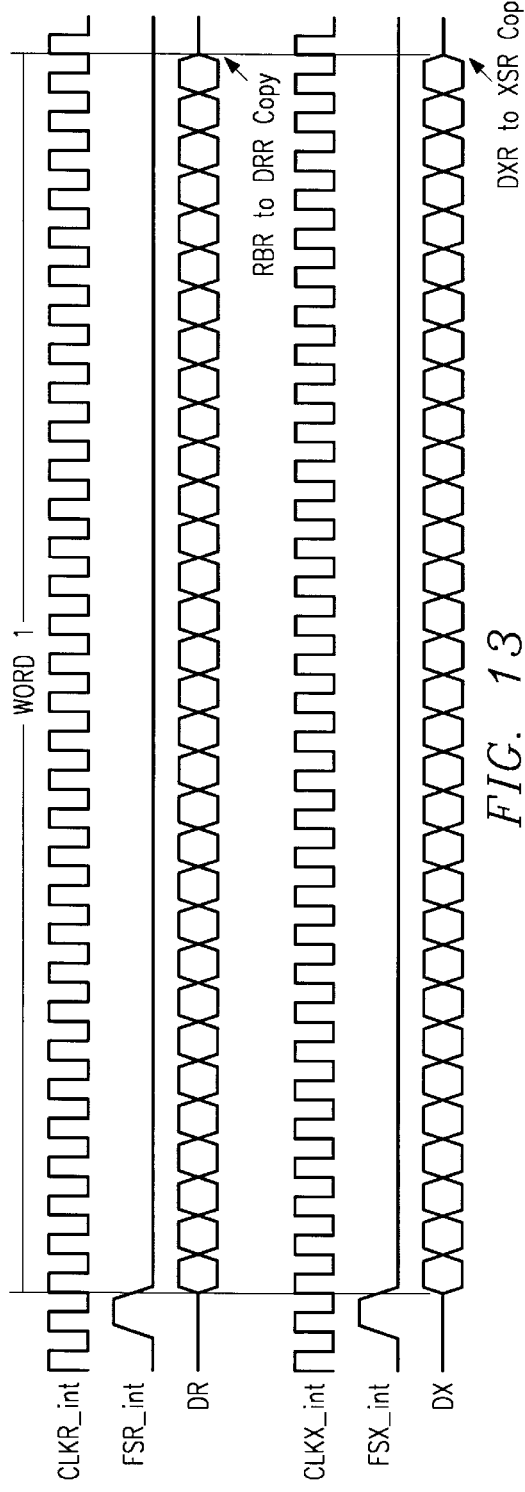
Figure 14:
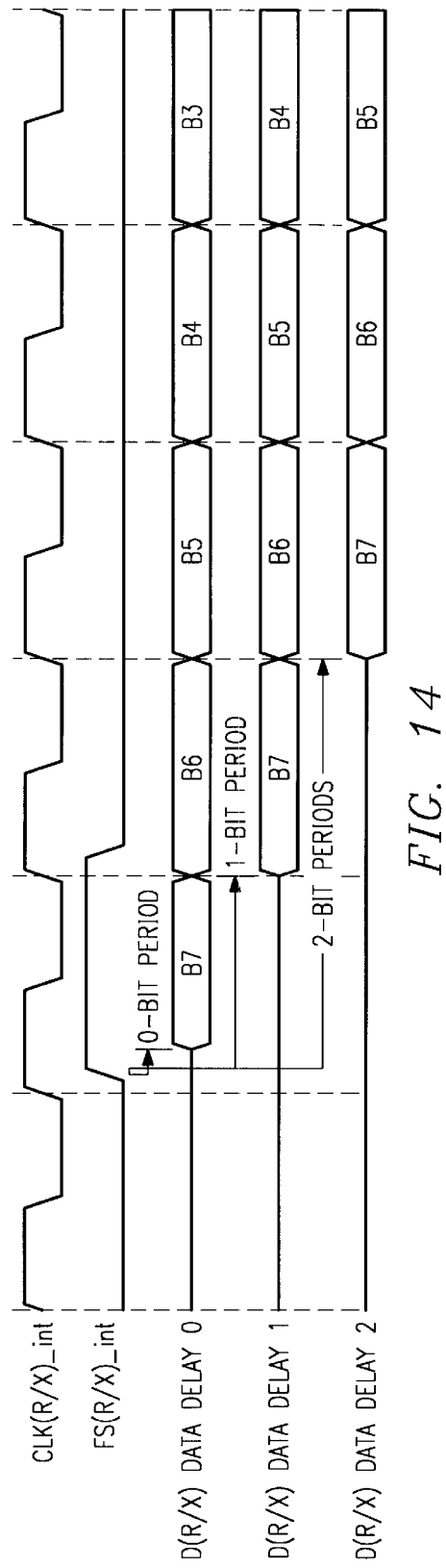
Figure 18:
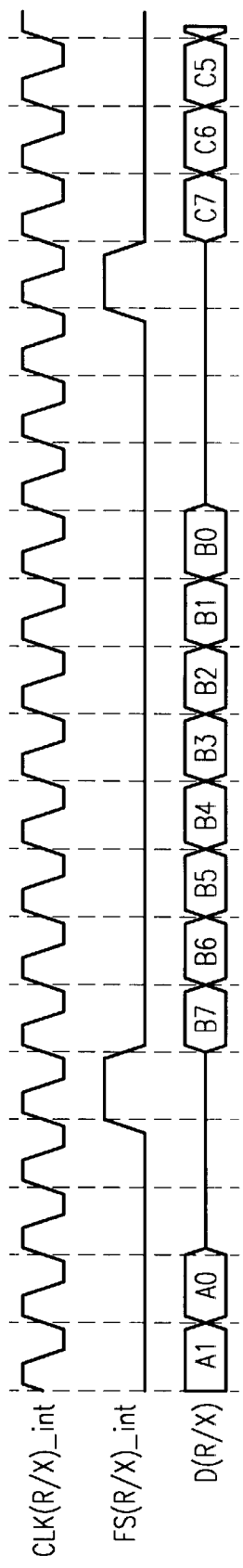
Figure 19:
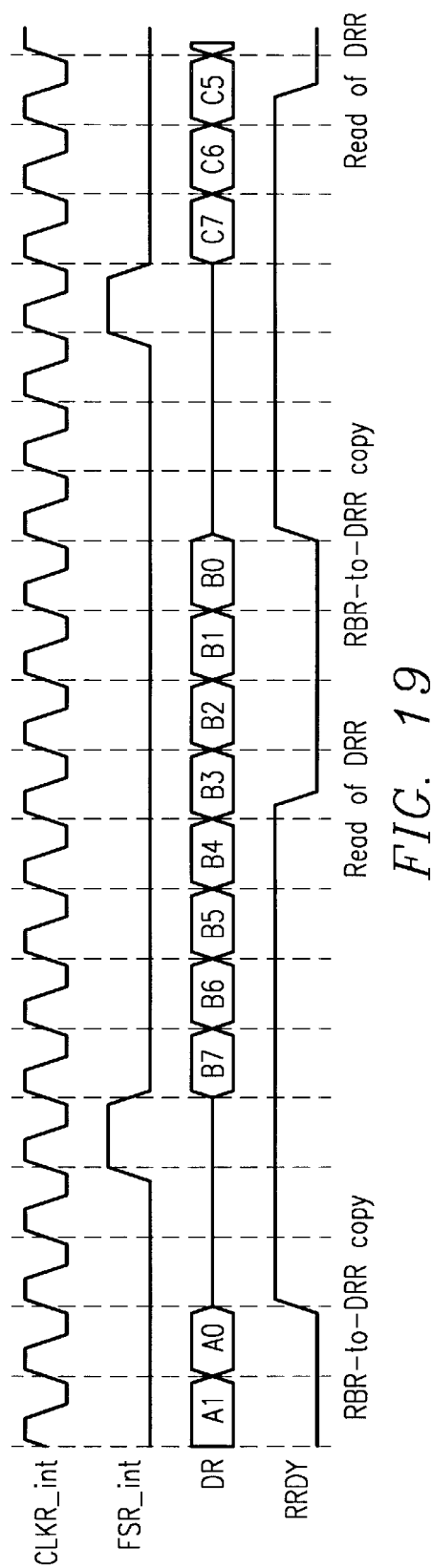
Figure 20:
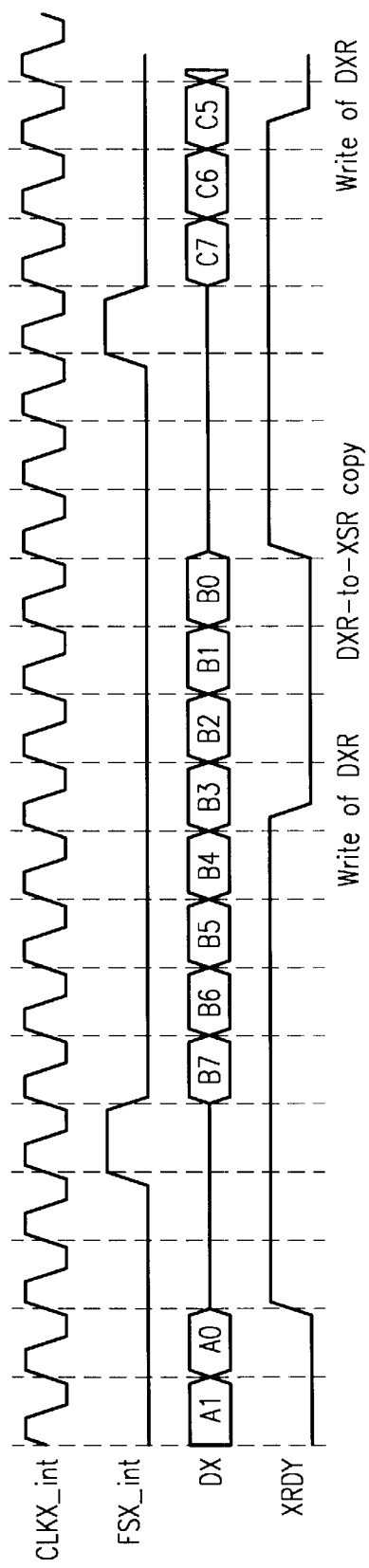
Figure 21:
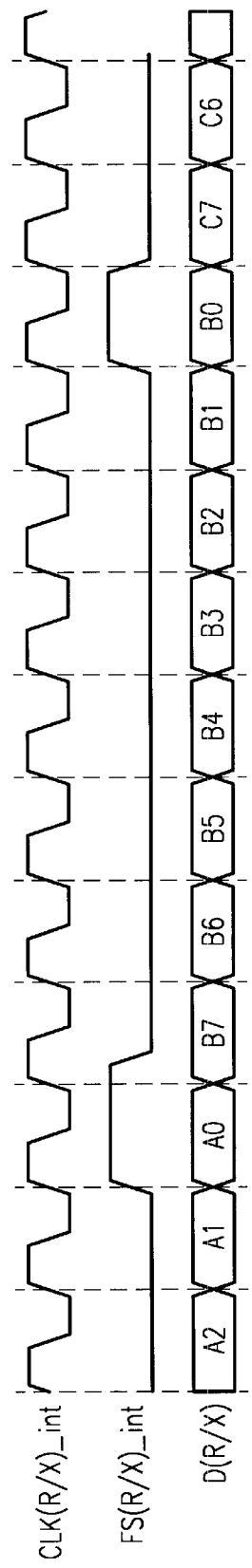
Figure 22:
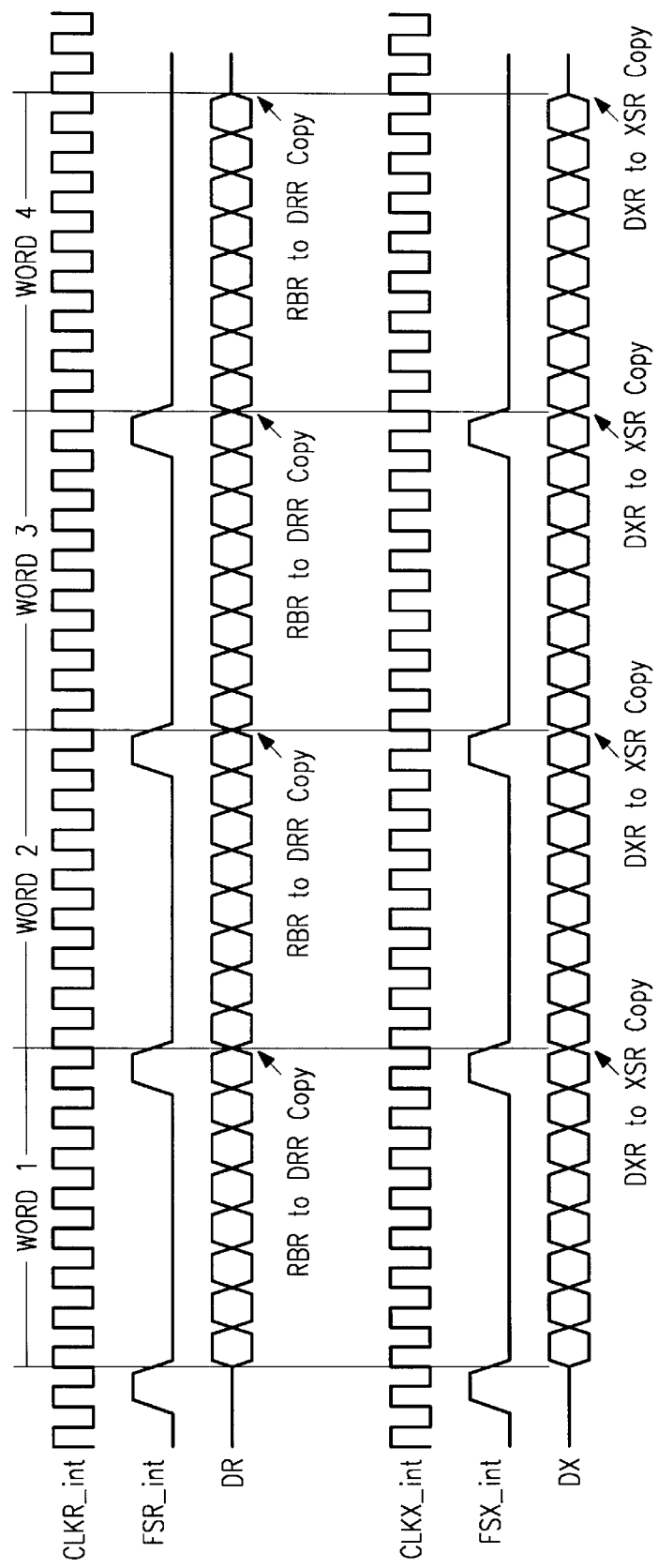
Figure 23:
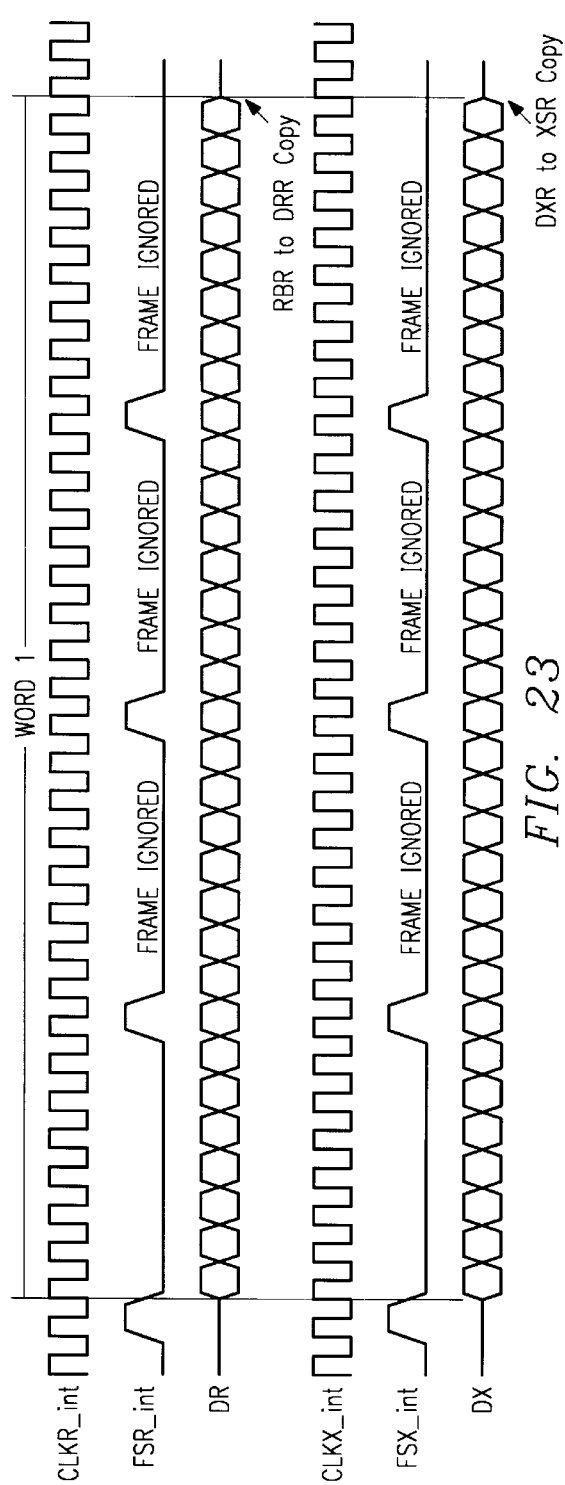
Figure 24:
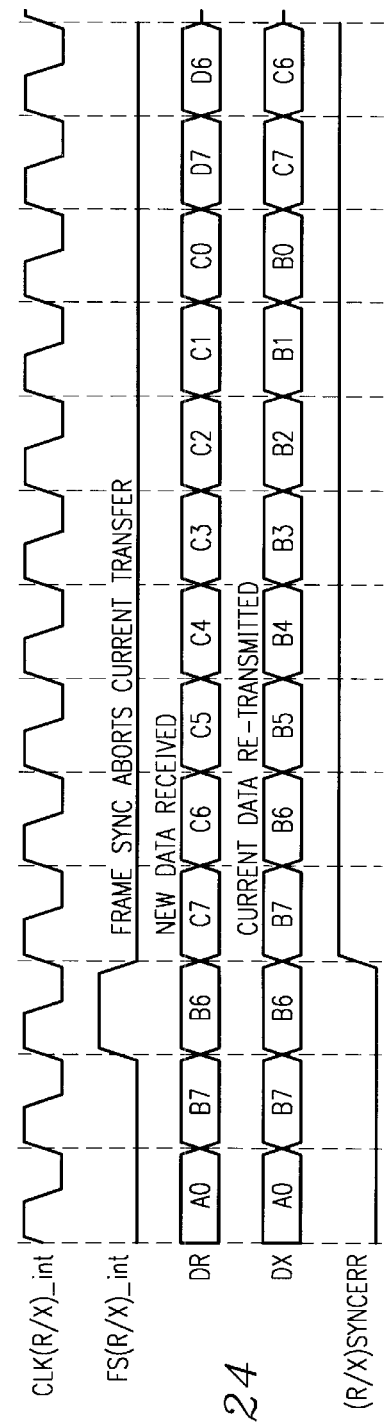
Figure 25:
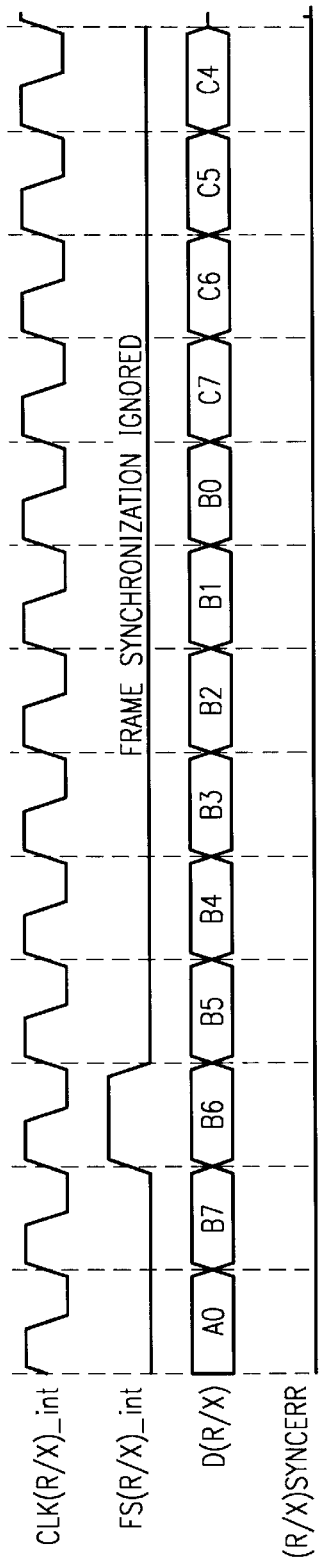
Figure 26:
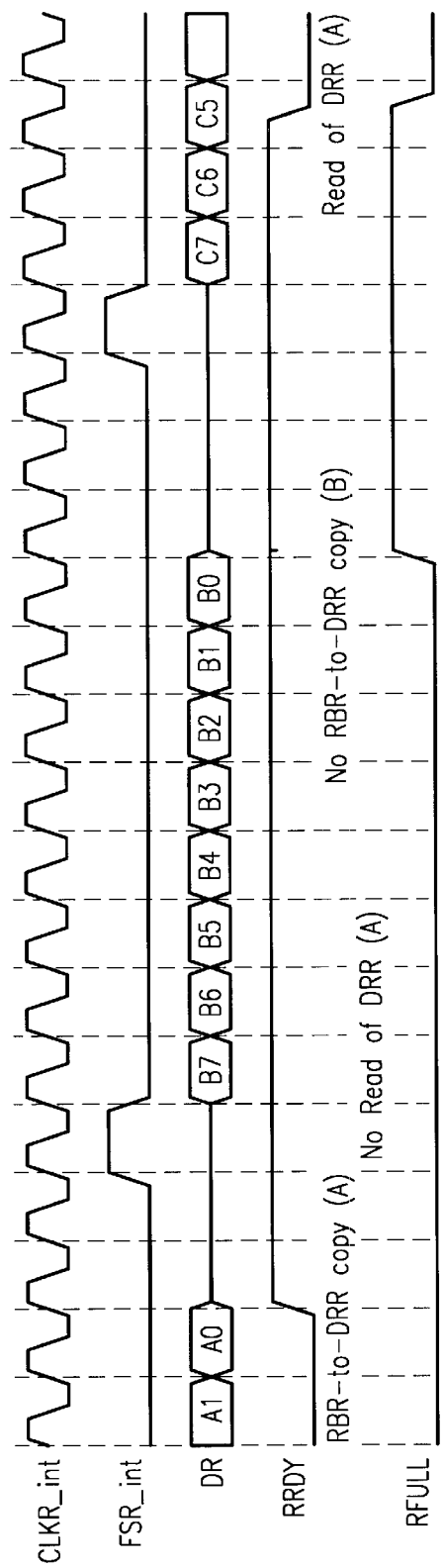
Figure 27:
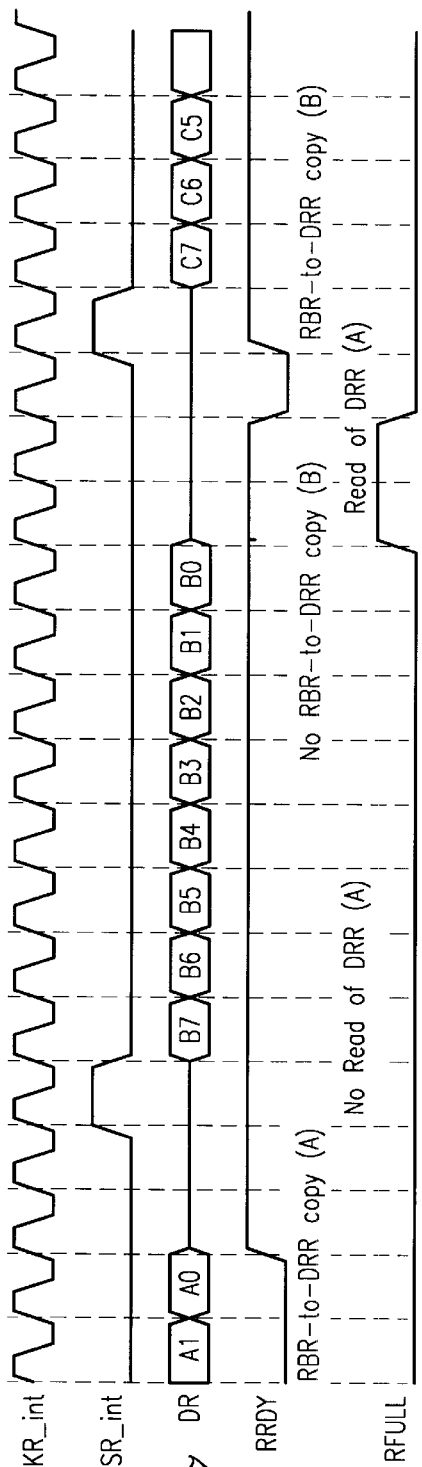
Figure 28:
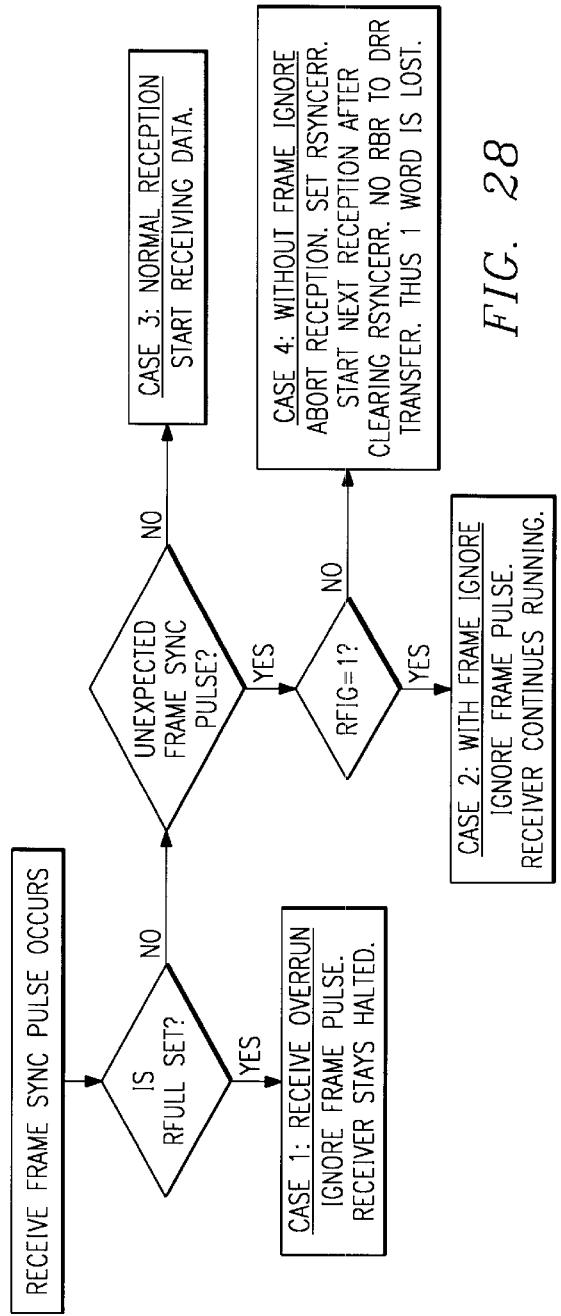
Figure 29:
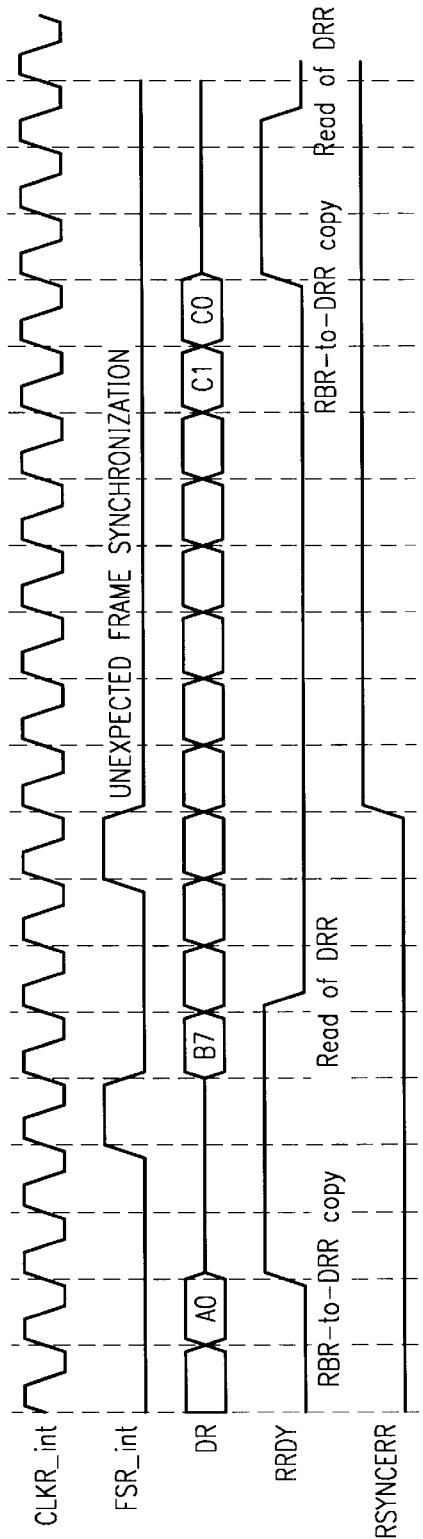
Figure 30:
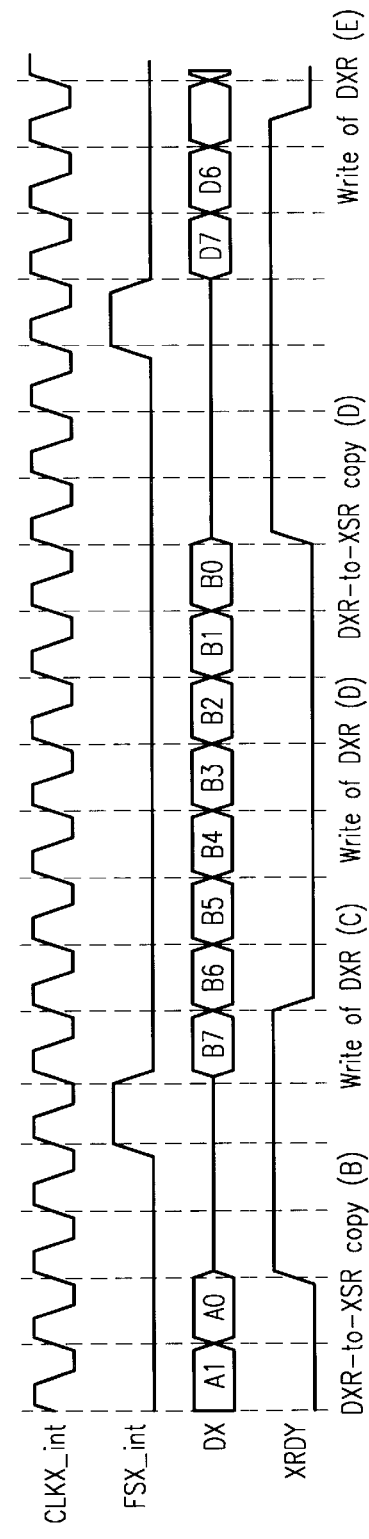
Figure 31:
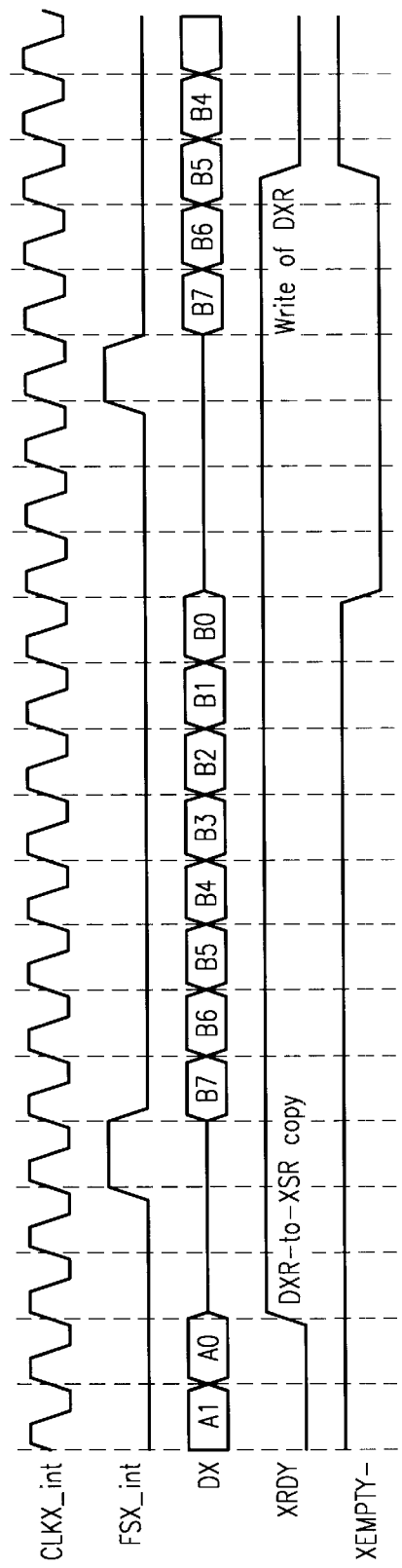
Figure 32:
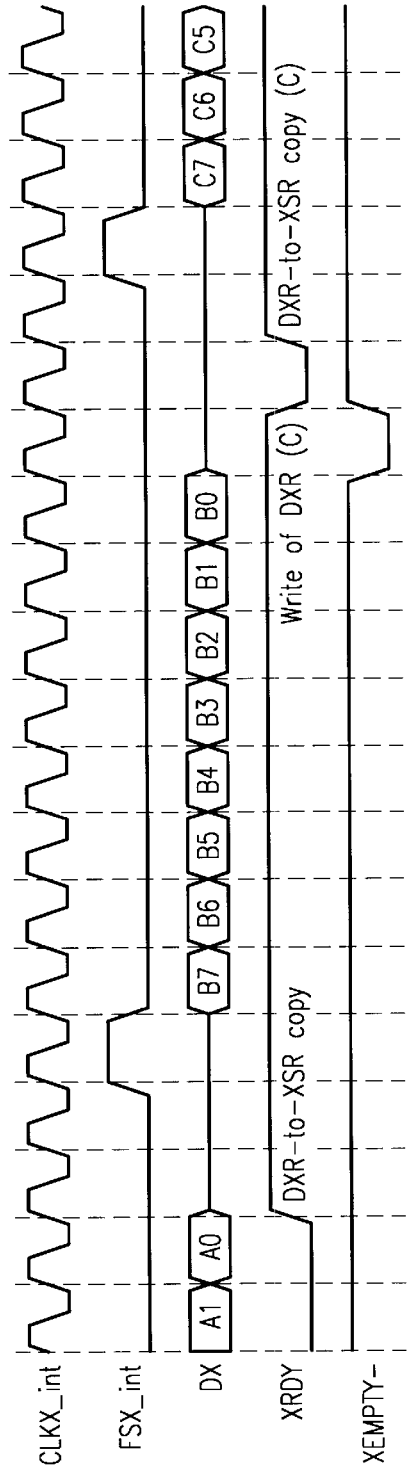
Figure 33:
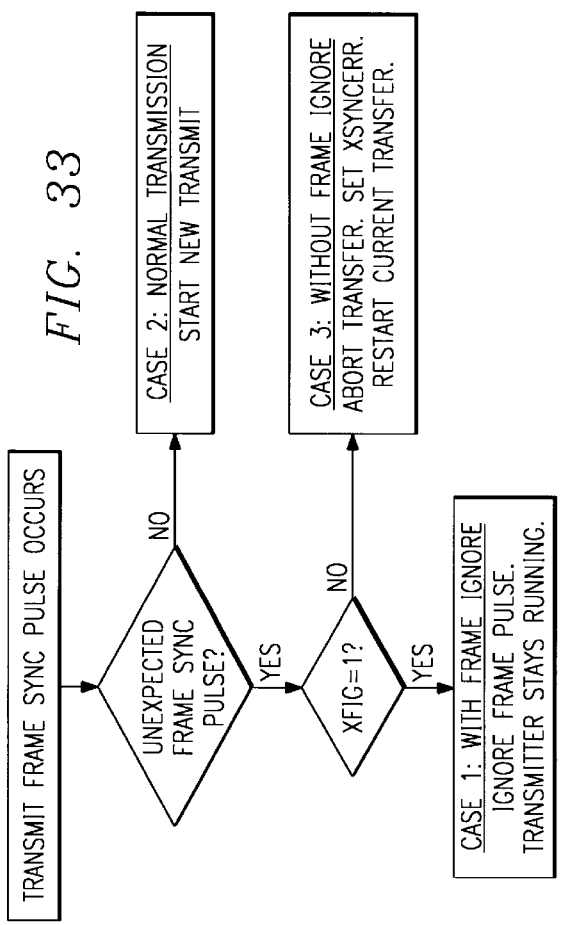
Figure 34:
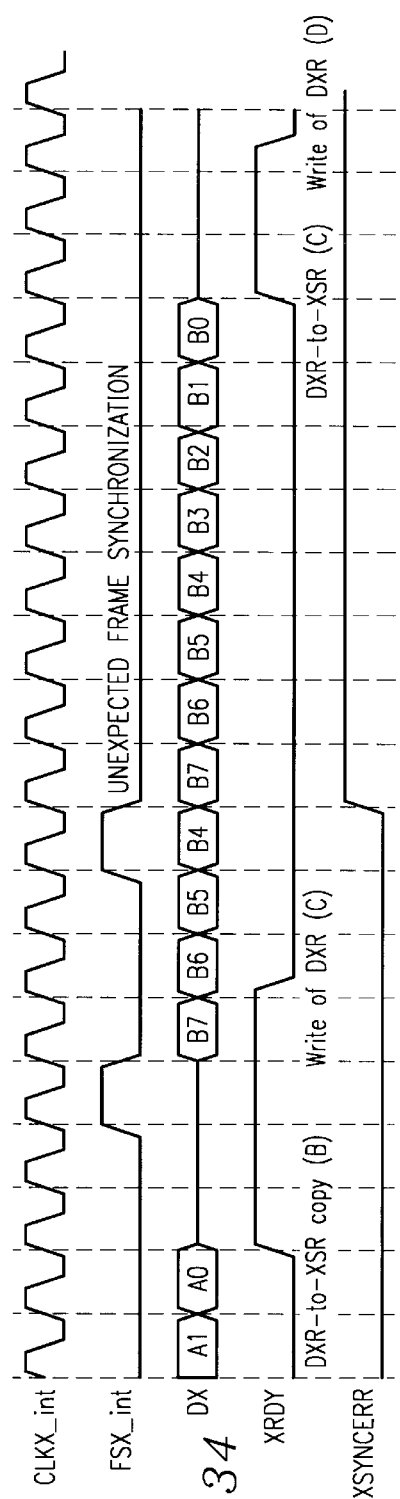
Figure 35:
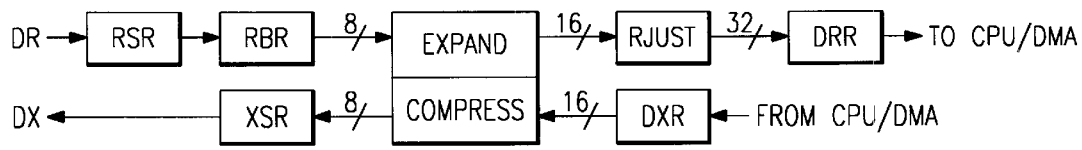
Figure 36:
Figure 37:
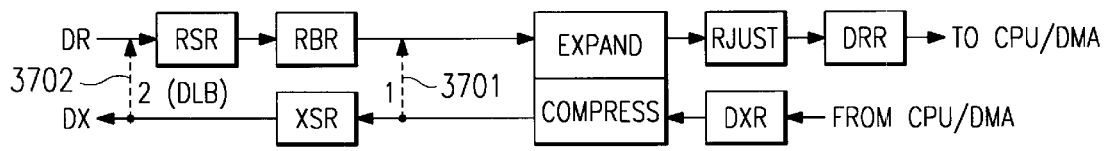
Figure 39:
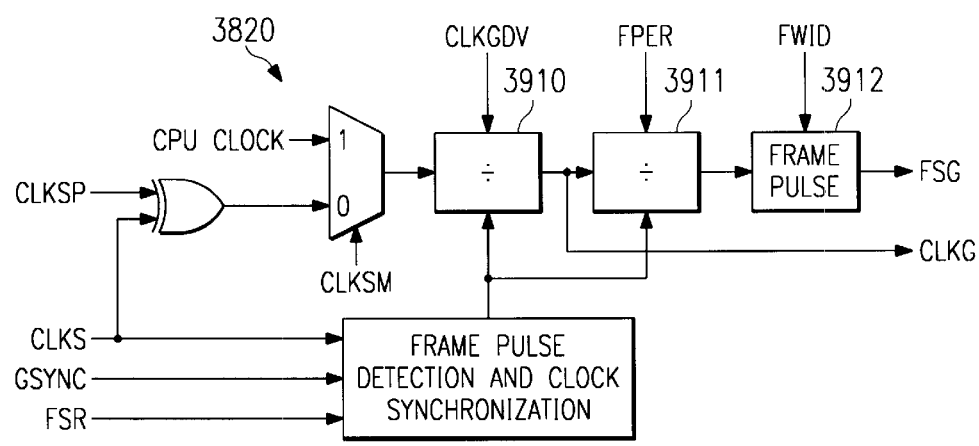
Figure 38:
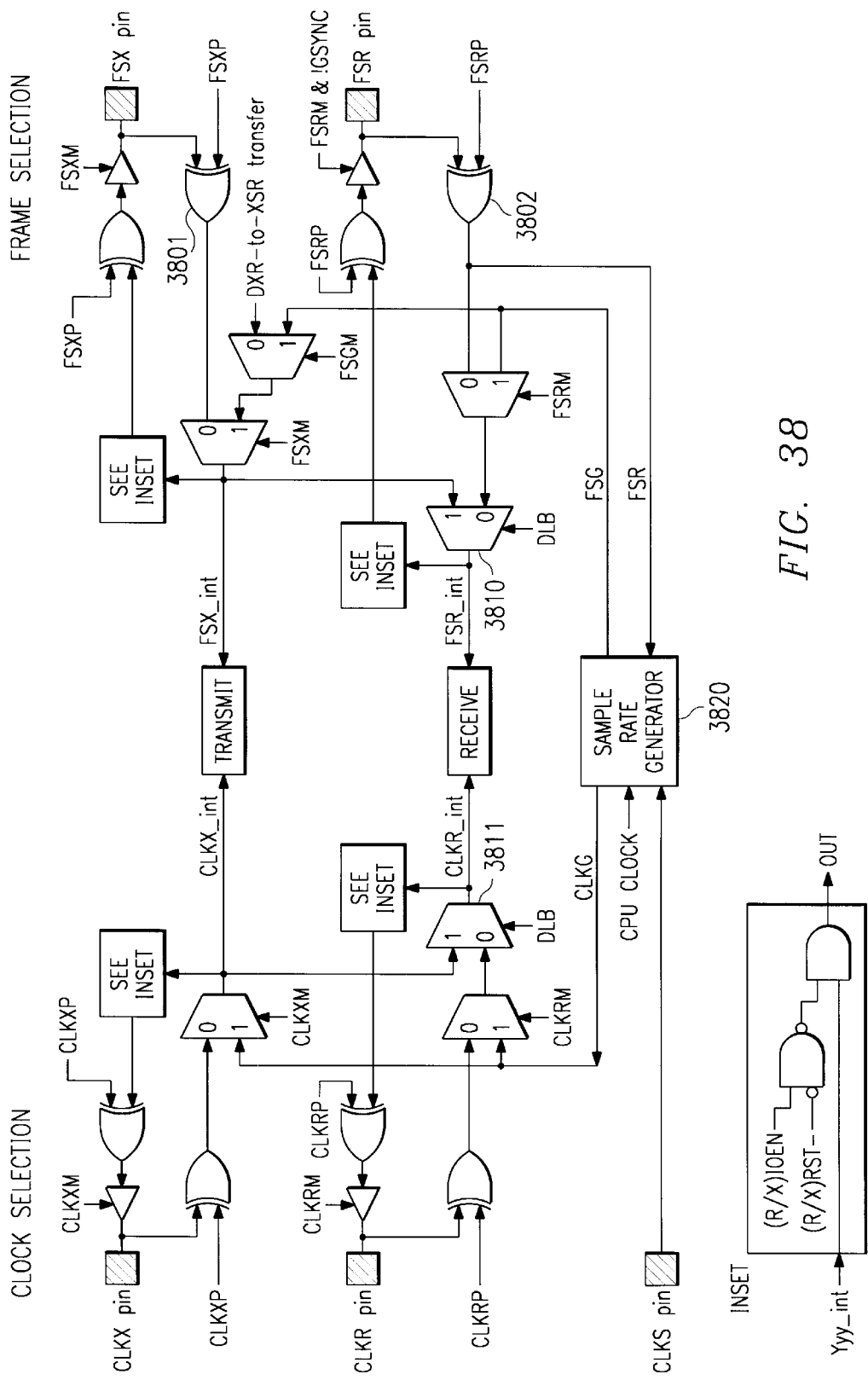
Figure 40:
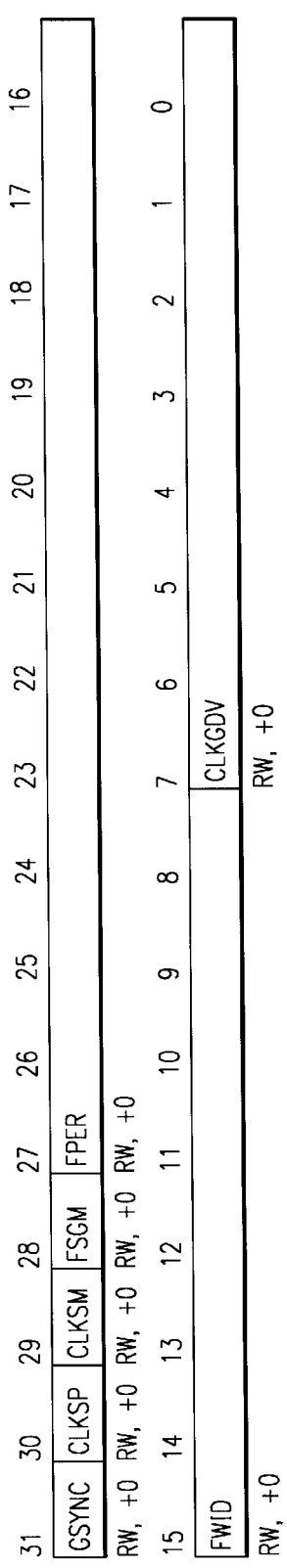
Figure 41:
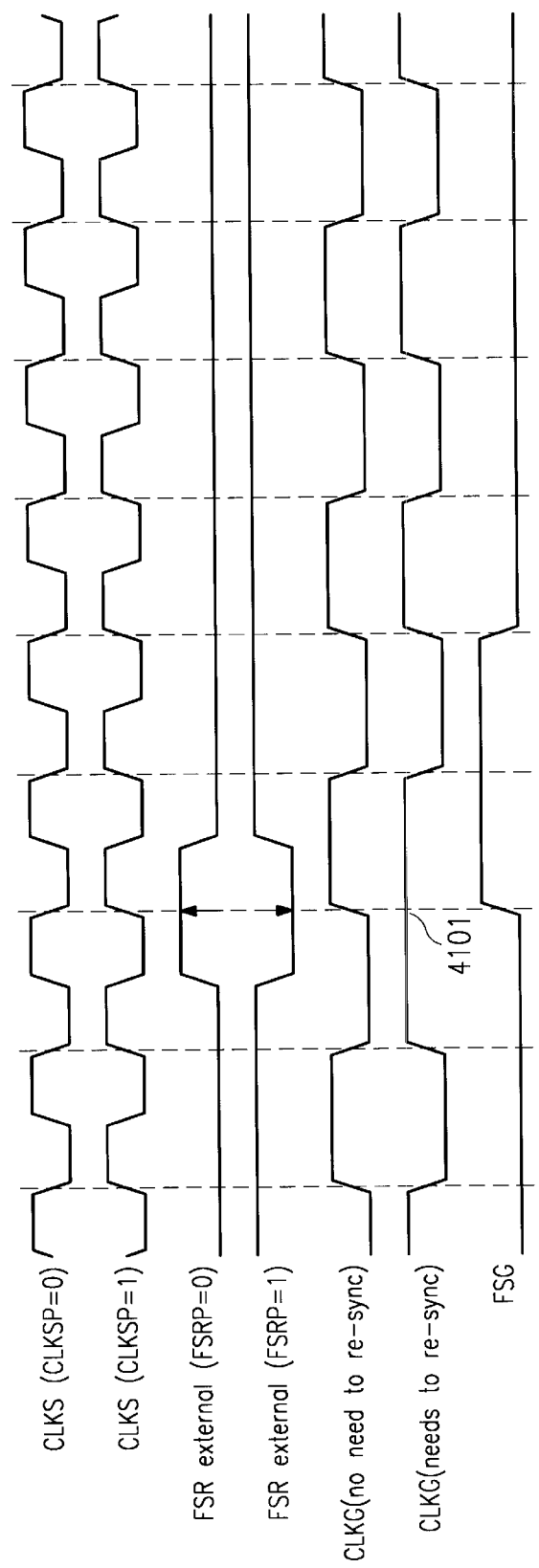
Figure 42:
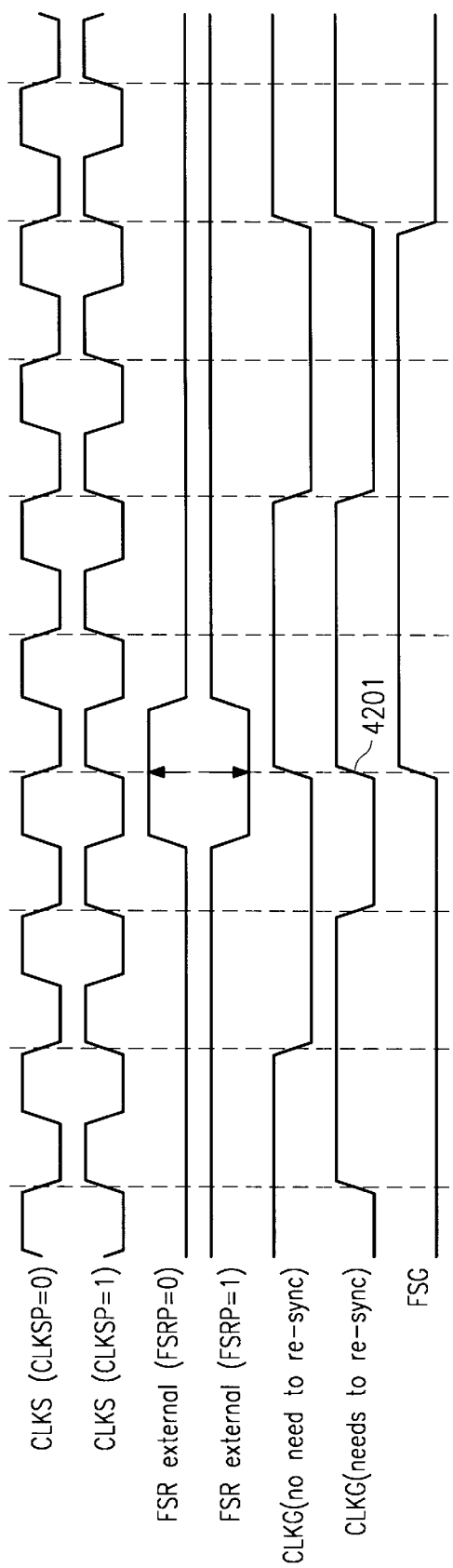
Figure 43:
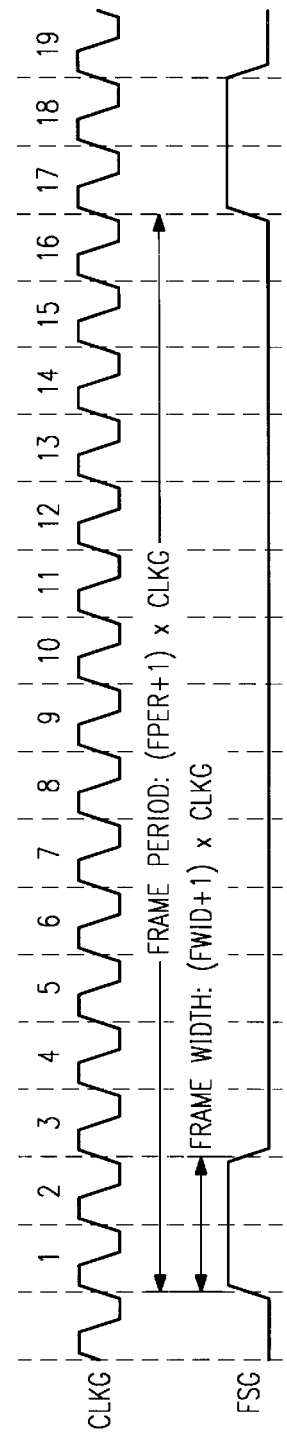
Figure 44:
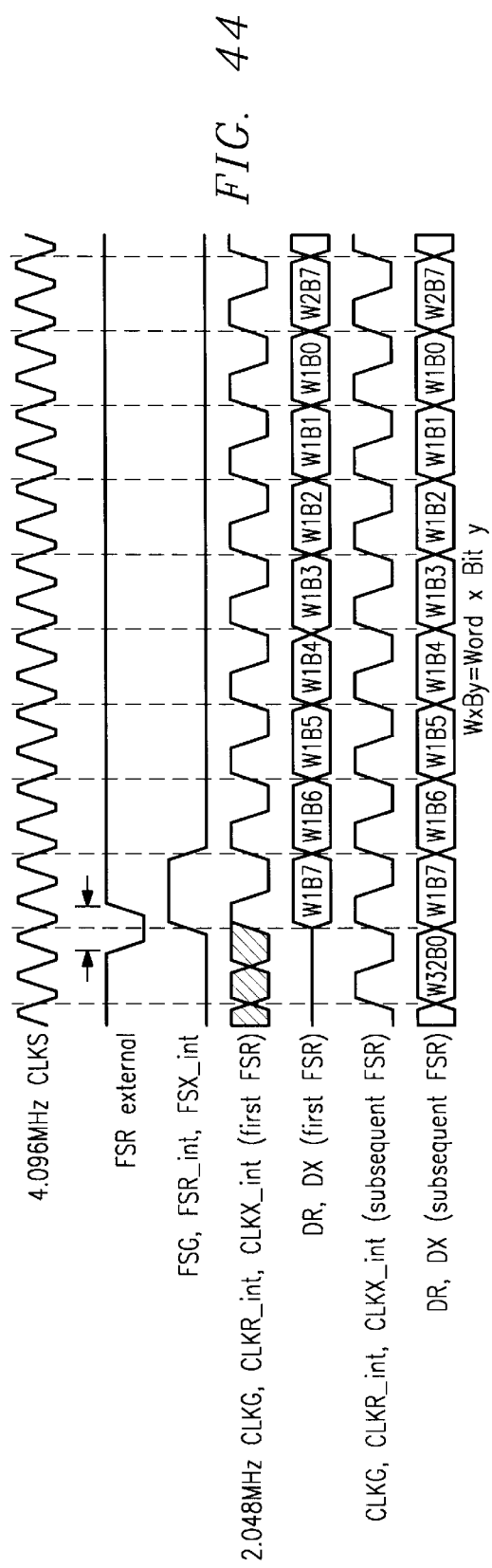
Figure 45:
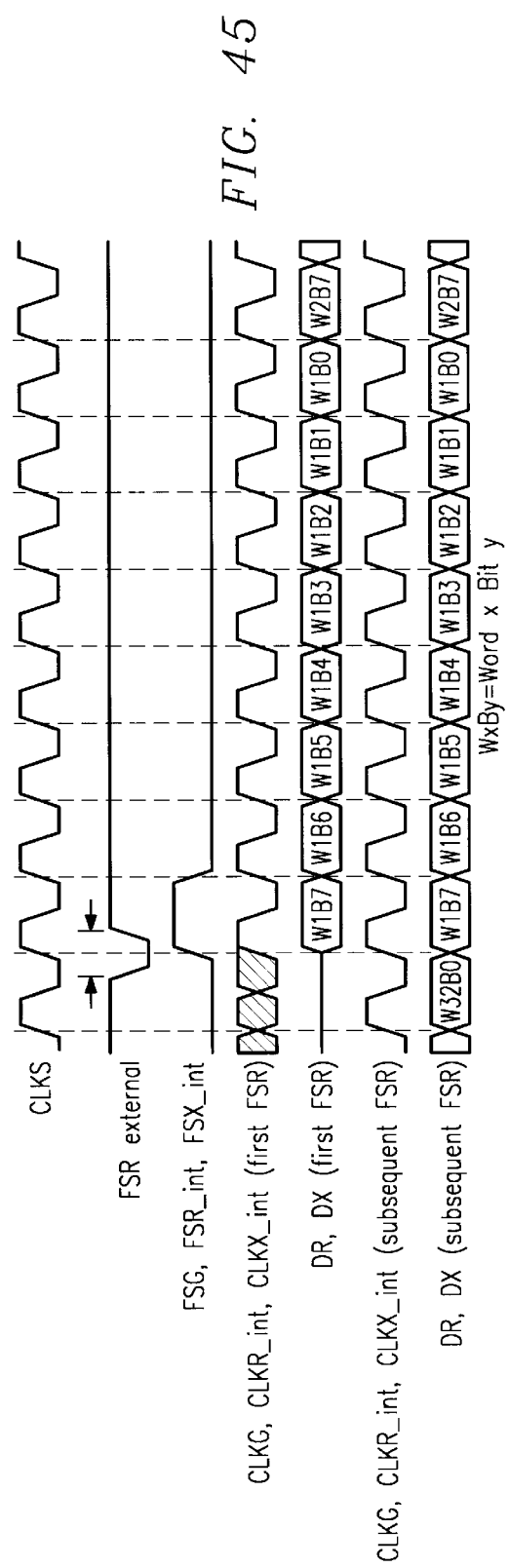
Figures 49D, 50:
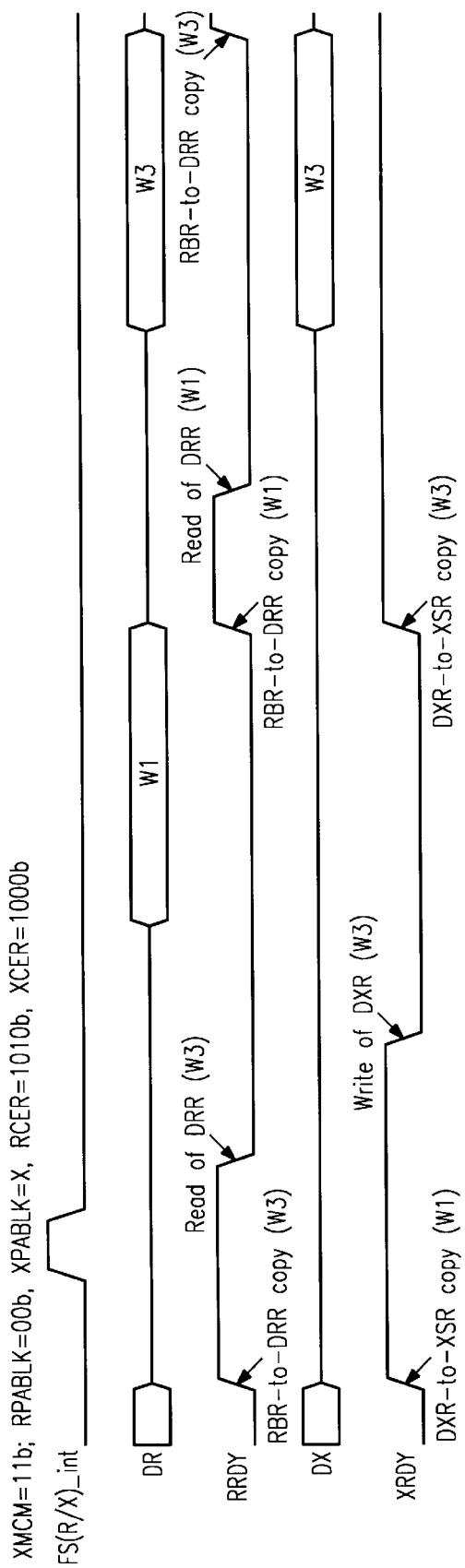
Figures 51, 52:
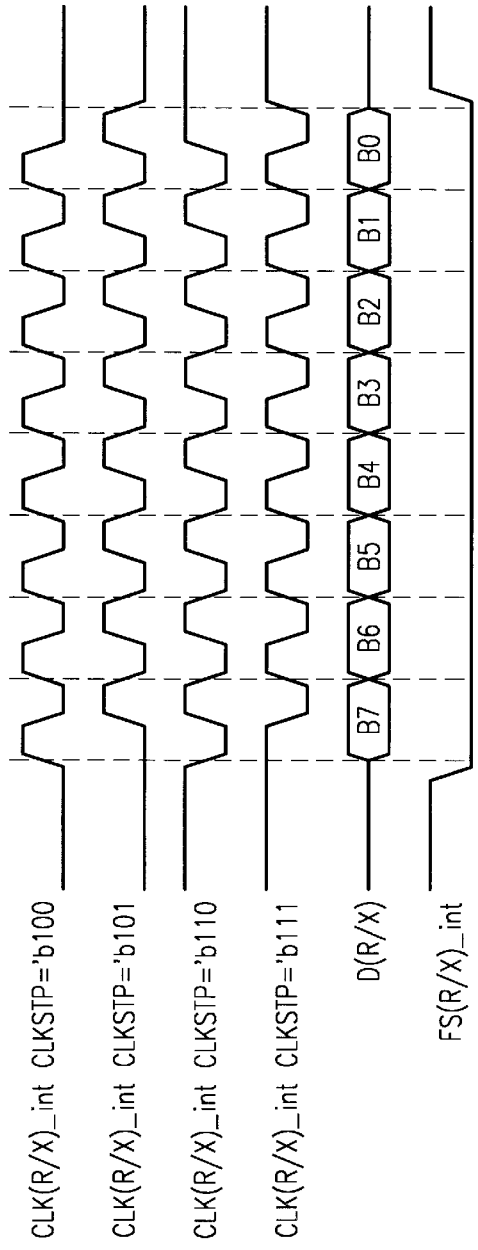

The following figures all relate to the MCSP of FIG. 4:

FIG. 5 is a Serial Port Control Register (SPCR);

FIG. 6 is a Pin Control Register (PCR);

FIG. 7 is a Receive Control Register (RCR);

FIG. 8 is a Transmit Control Register (XCR);

FIG. 9 is a Timing Diagram illustrating Frame and Clock Operation;

FIG. 10 is a Timing Diagram illustrating Receive Data Clocking;

FIG. 11 is a Timing Diagram illustrating Dual Phase Frame Example;

FIG. 12 is a Timing Diagram illustrating Single Phase Frame of Four 8-bit words;

FIG. 13 is a Timing Diagram illustrating Single Phase Frame of One 32-bit word;

FIG. 14 is a Timing Diagram illustrating Data Delay;

FIG. 15 is a Timing Diagram illustrating Two-Bit Data Delay Used to Discard Framing Bit;

FIG. 16 is a Timing Diagram illustrating AC97 Dual Phase Frame Format;

FIG. 17 is a Timing Diagram illustrating an AC97 Example Bit Timing Near Frame Synchronization;

FIG. 18 is a Timing Diagram illustrating an MCSP Standard Operation;

FIG. 19 is a Timing Diagram illustrating a Receive Operaion;

FIG. 20 is a Timing Diagram illustrating a Transmit Operation;

FIG. 21 is a Timing Diagram illustrating a Maximum Packet Frequency Receive;

FIG. 22 is a Timing Diagram illustrating a Maximum Packet Frequency Operation with 8-bit Data;

FIG. 23 is a Timing Diagram illustrating a Data Packing at Maximum Packet Frequency with (R/X) FIG.=1;

FIG. 24 is a Timing Diagram illustrating an Unexpected Frame Synchronization with (R/X)FIG.=0;

FIG. 25 is a Timing Diagram illustrating an Unexpected Frame Synchronization with (R/X)FIG.=1;

FIG. 26 is a Timing Diagram illustrating a Serial Port Receive Overrun;

FIG. 27 is a Timing Diagram illustrating a Serial Port Receive Overrun Avoided;

FIG. 28 is a Flow Chart illustrating a Response to Receive Frame Synchronization Pulse;

FIG. 29 is a Timing Diagram illustrating an Unexpected Receive Synchronization Pulse;

FIG. 30 is a Timing Diagram illustrating a Transmit with Data Overwrite;

FIG. 31 is a Timing Diagram illustrating a Transmit Empty;

FIG. 32 is a Timing Diagram illustrating a Transmit Empty Avoided;

FIG. 33 is a Flow Chart illustrating a Response to Transmit Frame Synchronization;

FIG. 34 is a Timing Diagram illustrating an Unexpected Transmit Frame Synchronization Pulse;

FIG. 35 is a Flow Chart illustrating a Companding Flow;

FIG. 36 illustrates a Companding Data Format;

FIG. 37 is a Flow Chart illustrating a Companding of Internal Data;

FIG. 38 is a Schematic of Circuitry for a Clock and Frame Generation;

FIG. 39 is a Schematic of Circuitry for a Sample Rate Generator;

FIG. 40 is a Timing Diagram illustrating a Sample Rate Generator Register (SRGR);

FIG. 41 is a Timing Diagram illustrating a CLKG Synchronization and FSG generation when GSYNC=1 and CLKGDV-1;

FIG. 42 is a Timing Diagram illustrating a CLKG Synchronization and FSG generation when GSYNC=1 and CLKGDV=3;

FIG. 43 is a Timing Diagram illustrating a Programmable Frame Period and Width;

FIG. 44 is a Timing Diagram illustrating a ST-BUS and MVIP Example;

FIG. 45 is a Timing Diagram illustrating a Single Rate Clock Example;

FIG. 46 is a Timing Diagram illustrating a Double Rate Clock Example;

FIG. 47 is a Multi-channel Control Register;

FIG. 48 is a Timing Diagram illustrating a Channel Enabling by Blocks in Partition A and B;

FIG. 49A–D are a Timing Diagram illustrating an XMCM operation;

FIG. 50 is a Receive Channel Enable Register (RCER) Diagram;

FIG. 51 is a Transmit Channel Enable Register (XCER) Diagram; and

FIG. 52 is a Timing Diagram illustrating a Clock Stop Mode Option.

Corresponding numerals and symbols in the different figures and tables refer to corresponding parts unless otherwise indicated.

DETAILED DESCRIPTION OF EMBODIMENTS OF THE INVENTION

Figure 1A:
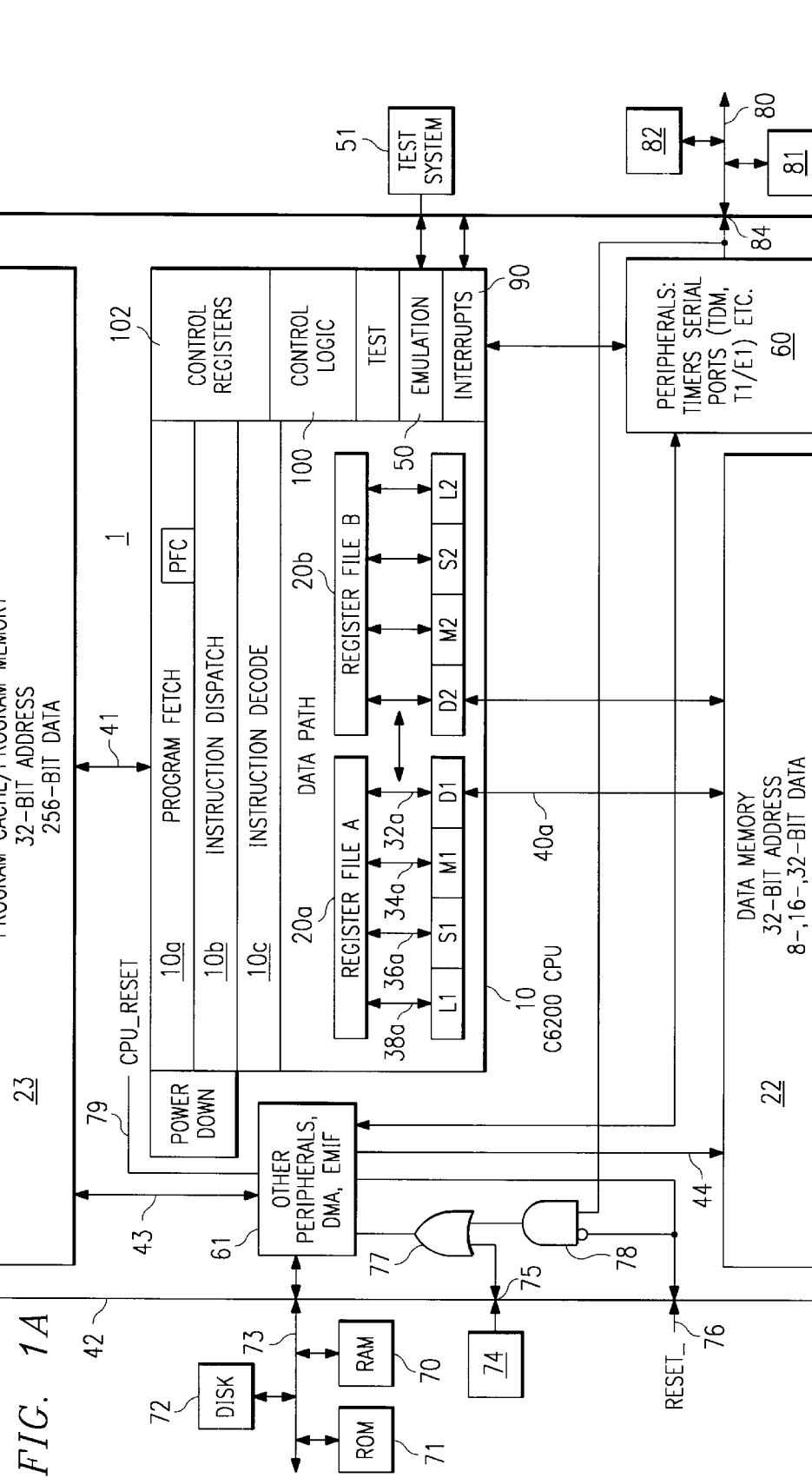
FIG. 1A is a block diagram of a microprocessor which has an embodiment of the present invention.

FIG. 1A is a block diagram of a microprocessor 1 which has an embodiment of the present invention. Microprocessor 1 is a VLIW digital signal processor ("DSP"). In the interest of clarity, FIG. 1 only shows those portions of microprocessor 1 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 1 relevant to an embodiment of the present invention are explained in sufficient detail hereinbelow, so as to enable one of ordinary skill in the microprocessor art to make and use the invention.

In microprocessor 1 there are shown a central processing unit (CPU) 10, data memory 22, program memory 23, peripherals 60 and an external memory interface (EMIF) with a direct memory access (DMA) 61. CPU 10 further has an instruction fetch/decode unit 10a–c, a plurality of execution units, including an arithmetic and load/store unit D1, a multiplier M1, an ALU/shifter unit S1, an arithmetic logic unit ("ALU") L1, a shared multiport register file 20a from which data are read and to which data are written. Decoded instructions are provided from the instruction fetch/decode unit 10a–c to the functional units D1, M1, S1, and L1 over various sets of control lines which are not shown. Data are provided to/from the register file 20a from/to load/store units D1 over a first set of busses 32a, to multiplier M1 over a second set of busses 34a, to ALU/shifter unit S1 over a third set of busses 36a and to ALU L1 over a fourth set of busses 38a. Data are provided to/from the memory 22 from/to the load/store units D1 via a fifth set of busses 40a. Note that the entire data path described above is duplicated with register file 20b and execution units D2, M2, S2, and L2. Instructions are fetched by fetch unit 10a from instruction memory 23 over a set of busses 41. Emulation unit 50 provides access to the internal operation of integrated circuit 1 which can be controlled by an external test system 51.

Note that the memory 22 and memory 23 are shown in FIG. 1 to be a part of a microprocessor 1 integrated circuit, the extent of which is represented by the box 42. The memories 22–23 could just as well be external to the microprocessor 1 integrated circuit 42, or part of it could reside on the integrated circuit 42 and part of it be external to the integrated circuit 42.: Also, an alternate number of execution units can be used.

When microprocessor 1 is incorporated in a data processing system, additional memory or peripherals may be connected to microprocessor 1, as illustrated in FIG. 1. For example, Random Access Memory (RAM) 70, a Read Only Memory (ROM) 71 and a Disk 72 are shown connected via an external bus 73. Bus 73 is connected to an External Memory Interface (EMIF) which is part of functional block 61 within microprocessor 42. A Direct Memory Access (DMA) controller is also included within block 61. The DMA controller is generally used to move data between memory and peripherals within microprocessor 1 and memory and peripherals which are external to microprocessor 1. Data can be transferred from block 61 to program memory 23 via bus 43; data can be transferred to/from data memory 22 via bus 44. Other types of peripherals, such as timer 82, are connected via host port bus 80. A bus interface is contained within block 60 for host port bus 80.

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat.

No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

A description of various architectural features of the microprocessor of FIG. 1A is provided in co-assigned application Ser. No. 09/012,813. A description of a complete set of instructions for the microprocessor of FIG. 1 is also provided in co-assigned application Ser. No. 09/012,813.

Figure 1B:
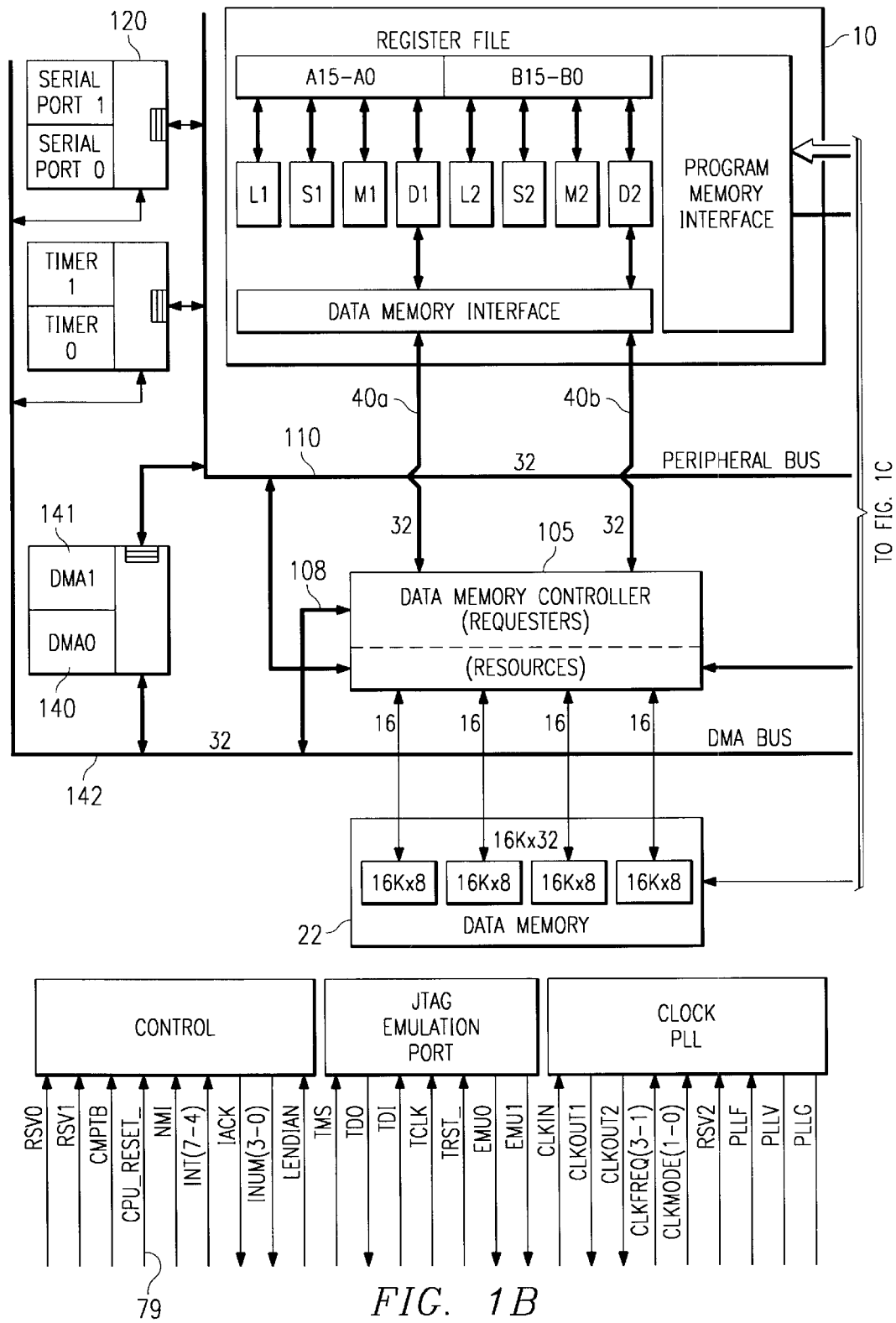

FIG. 1B is a more detailed block diagram of the microprocessor of FIG. 1A. Multichannel Serial Port 120 is connected to peripheral bus 110. Its generation and advantages will be described further with reference to FIG. 4.

Figure 2:
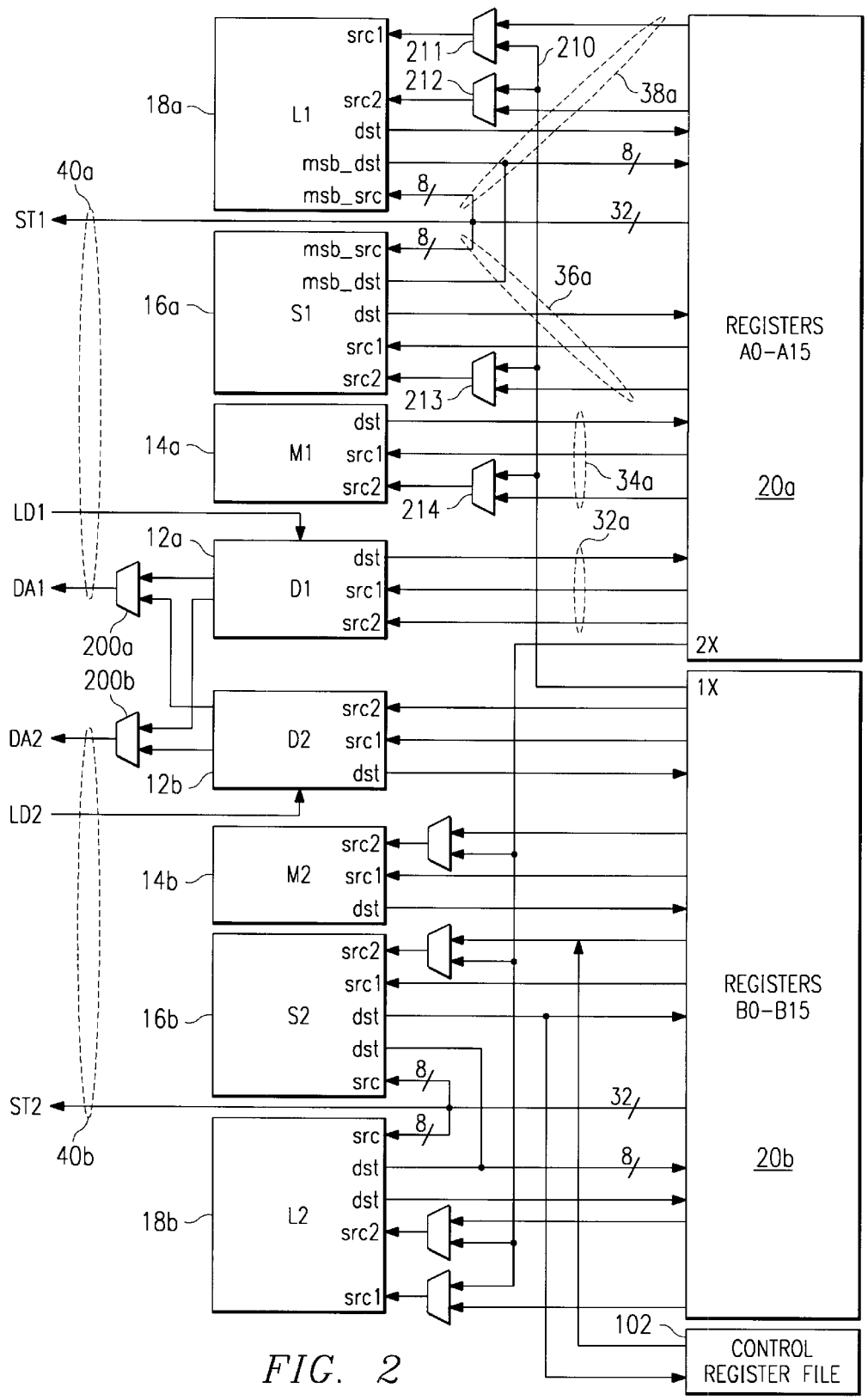
FIG. 2 is a block diagram of the execution units and register files of the microprocessor of FIG. 1.

FIG. 2 is a block diagram of the execution units and register files of the microprocessor of FIG. 1A and shows a more detailed view of the buses connecting the various functional blocks. In this figure, all data busses are 32 bits wide, unless otherwise noted. Bus 40a has an address bus DA1 which is driven by mux 200a. This allows an address generated by either load/store unit D1 or D2 to provide an address for loads or stores for register file 20a. Data Bus LD1 loads data from an address in memory 22 specified by address bus DA1 to a register in load unit D1. Unit D1 may manipulate the data provided prior to storing it in register file 20a. Likewise, data bus ST1 stores data from register file 20a to memory 22. Load/store unit D1 performs the following operations: 32-bit add, subtract, linear and circular address calculations. Load/store unit D2 operates similarly to unit D1, with the assistance of mux 200b for selecting an address.

ALU unit L1 performs the following types of operations: 32/40 bit arithmetic and compare operations; left most. 1, 0, bit counting for 32 bits; normalization count for 32 and 40 bits; and logical operations. ALU L1 has input src1 for a 32 bit source operand and input src2 for a second 32 bit source operand. Input msb_src is an 8 bit value used to form 40 bit source operands. ALU L1 has an output dst for a 32 bit destination operands. Output msb_dst is an 8 bit value used to form 40 bit destination operands. Two 32 bit registers in register file 20a are concatenated to hold a 40 bit operand. Mux 211 is connected to input src1 and allows a 32 bit operand to be obtained from register file 20a via bus 38a or from register file 20b via bus 210. Mux 212 is connected to input src2 and allows a 32 bit operand to be obtained from register file 20a via bus 38a or from register file 20b via bus 210. ALU unit L2 operates similarly to unit L1.

ALU/shifter unit S1 performs the following types of operations: 32 bit arithmetic operations; 32/40 bit shifts and 32 bit bit-field operations; 32 bit logical operations; branching; and constant generation. ALU S1 has input src1 for a 32 bit source operand and input src2 for a second 32 bit source operand. Input msb_src is an 8 bit value used to form 40 bit source operands. ALU S1 has an output dst for a 32 bit destination operands. Output msb_dst is an 8 bit value used to form 40 bit destination operands. Mux 213 is connected to input src2 and allows a 32 bit operand to be obtained from register file 20a via bus 36a or from register file 20b via bus 210. ALU unit S2 operates similarly to unit S1, but can additionally perform register transfers to/from the control register file 102.

Multiplier M1 performs 16×16 multiplies. Multiplier M1 has input src1 for a 32 bit source operand and input src2 for a 32 bit source operand. ALU S1 has an output dst for a 32 bit destination operands. Mux 214 is connected to input src2 and allows a 32 bit operand to be obtained from register file 20a via bus 34a or from register file 20b via bus 210. Multiplier M2 operates similarly to multiplier M1.

FIGS. 3A and 3B shows two memory maps for the microprocessor of FIG. 1A. The memory is byte addressable and it's total address range is 4G bytes (corresponding to a 32-bit internal address). The memory map is divided between the internal program memory 23, internal data memory 22 and 3 external memory spaces and internal peripheral space. A section of internal memory can be accessed by the host port interface (HPI) 60.

The internal memory consists of 512 k bits of on-chip program/cache memory 23 and 512 k bits of on-chip data memory 22. The program memory, configurable as cache or program, is organized in 2 k of 256-bit instruction fetch packets. The CPU 10 fetches all instructions one fetch packet at a time. The packets are processed at the maximum rate of eight 32-bit instructions per CPU cycle or at a minimum of one instruction per cycle. The internal data memory is byte addressable by the CPU (for reads as well as writes) and supports byte, half-word and full word transfers.

All external data accesses by CPU 10 or DMA 100 pass through the external memory interface (EMIF) 103. The external memory is divided into 3 spaces—CE0, CE1 and CE2. Each has a dedicated chip enable signal that is asserted during data access to or from the corresponding space. Each external space has assigned a separate internal peripheral bus register that determines the shape of the read/write cycle when accessing asynchronous memory.

In addition to asynchronous memory, CE0 and CE2 spaces can also interface to other types of memory. SBSRAM or SDRAM memory can be assigned to those two spaces by controlling signal levels on signal groups CE0_TYPE and CE2_TYPE (pins DC2–DC5) during Reset.

External memory space CE1 can only interface to asynchronous memory. However, while spaces CE0 and CE2 are always 32-bit wide, the CE1 memory space can also be configured to the width of 8 or 16 bits by controlling signal levels on signal group CE1_WIDTH pins 208–209 of FIG. 3. The EMIF automatically packs bytes and half-words into words during read cycles—a feature typically used when booting from an 8- or 16-bit EPROM. The CE1 memory space can be used for ROM interfacing because ROM cycles are similar to asynchronous SRAM read cycles. Note, that while the CE1 space is the only external memory space that allows read cycles from 8- or 16-bit wide memory, read cycles from any external memory space can access byte or half-word sized data from 32-bit wide external memory. The EMIF data write cycles can transfer bytes, half-words or words to external memory as well, using BE_ control signals for byte selects. Data read cycles always latch all 4 bytes (all 4 BE_'s active) and the CPU then extracts the appropriate bytes internally if the data size is less then 32 bits. Note, that EMIF writes requested by the program memory controller 104 or the DMA 100/101, are always 32-bits wide, as opposed to 8-, 16-, or 32-bit transfers originated by the data memory controller 105.

Referring now to FIG. 4, a block diagram of MCSP 120, inventive aspects and advantagous features of the present invention will be described in detail.

The Multi-Channel Serial Port (MCSP) is an improvement on a known serial port interface found on the TMS320C2x, and 'C5x, Digital Signal Processor devices available from Texas Instruments Incorporated. A detailed description of this serial port is provided in U.S. patent Ser.

No. 08/489,014 (application TI-19942) and U.S. Pat. No. 5,734,927 (TI-19942.2), issued Mar. 3, 1998, which is a Divisional application of U.S. Pat. No. 08/489,014 (TI-19942), now abandoned which is incorporated herein by reference. Like its predecessors the MCSP provides the following features:

1. Full-Duplex communication
2. Double buffered data registers which allow a continuous data stream.
3. Independent framing and clocking for receive and transmit.
4. Direct interface to industry standard Codecs, Analog Interface Chips (AICs), and other serially connected A/D and D/A devices.
5. External shift clock generation or an internal programmable frequency shift clock.

In addition, the MCSP has the following capabilities:

1. Direct interface to:
   T1/E1 framers
   MVIP and ST-BUS compliant devices
   IOM-2 compliant devices
   AC97 compliant devices. The necessary multi-phase frame synchronization capability is provided:
   IIS compliant devices
   SPI devices
2. Multi-channel transmit and receive of up to 128 channels.
3. A wider selection of data sizes including 8-, 12-, 16-, 20-, 24-, or 32-bit μ-Law and A-Law companding 8-bit data transfers with LSB or MSB first.
4. Programmable polarity for both frame synchronization and data clocks
5. Highly programmable internal clock and frame generation.

MCSP 120 consists of a data path and control path as shown in FIG. 4. Seven external pins 121a–121g listed in Table 1 connect the control and data paths to external devices. The data is communicated to devices interfacing to the MCSP via the Data Transmit (DX) pin for transmit and the Data Receive (DR) pin for receive. Control information in the form of clocking and frame synchronization is communicated via CLKX, CLKR, FSX, and FSR. Processor 1 communicates to the MCSP via 32-bit wide control registers accessible via the internal peripheral bus 110. The CPU 10 or DMA 100/101 reads the received data from the Data Receive Register (DRR) and writes the data to be transmitted to the Data Transmit Register (DXR). Data written to the DXR is shifted out to DX via the Transmit Shift Register (XSR). Similarly, receive data on the DR pin is shifted into RSR and copied into RBR. RBR is then copied to DRR which can be read by the CPU or DMA. This allows internal data movement and external data communications simultaneously. The remaining registers which are accessible to CPU 10 configure the control mechanism of the MCSP. These registers are listed in Table 2. The control block consists of internal clock generation, frame synchronization signal generation, and their control, and multi-channel selection. This control block sends notification of important events to the CPU and DMA via four signals shown in Table 3.

TABLE 1

MCSP Interface Signals

| Pin | I/O/Z | Description |
| --- | --- | --- |
| CLKR | I/O/Z | Receive clock |
| CLKX | I/O/Z | Transmit clock |
| CLKS | I | External clock |
| DR | I | Received serial data |
| DX | O/Z | Transmitted serial data |
| FSR | I/O/Z | Receive frame synchronization |
| FSX | I/O/Z | Transmit frame synchronization |

TABLE 2

MCSP Registers

| Hex Byte Address | | | |
| --- | --- | --- | --- |
| MCSP 0 | MCSP 1 | Acronym | Register Name[2] |
| — | — | RBR | MCSP Receive Buffer Register |
| — | — | RSR | MCSP Receive Shift Register |
| — | — | XSR | MCSP Transmit Shift Register |
| 018C0000 | 01900000 | DRR | MCSP Data Receive[3] Register |
| 018C0004 | 01900004 | DXR | MCSP Data Transmit Register |
| 018C0008 | 01900008 | SPCR | MCSP Serial Port Control Register |
| 018C000C | 0190000C | RCR | MCSP Receive Control Register |
| 018C0010 | 01900010 | XCR | MCSP Transmit Control Register |
| 018C0014 | 01900014 | SRGR | MCSP Sample Rate Generator Register |
| 018C0018 | 01900018 | MCR | MCSP Multi-Channel Register |
| 018C001C | 0190001C | RCER | MCSP Receive Channel Enable Register |
| 018C0020 | 01900020 | XCER | MCSP Transmit Channel Enable Register |
| 018C0024 | 01900024 | PCR | MCSP Pin Control Register |

[2]The RBR, RSR, and XSR are not directly accessible via the CPU or DMA.
[3]This register is read-only to the CPU and DMA.

TABLE 3

MCSP CPU Interrupts and DMA Event Synchronization

| Interrupy Name | Description |
| --- | --- |
| RINT | Receive Interrupt to CPU |
| XINT | Transmit Interrupt to CPU |
| REVT | Receive Synchronization Event to DMA |
| XEVT | Transmit Synchronization Event to DMA |

The serial port is configured via the 32-bit Serial Port Control Register (SPCR) and Pin Control Register as shown in FIG. 5 and FIG. 6, respectively. The SPCR and PCR contains MCSP status information and contains bits that can be configured for desired operation. The operation of each bit-field will be discussed in later sections.

Table 4 and Table 5 describe each bit field of the SPCR and PCR, respectively.

TABLE 4

Serial Port Control Register (SPCR) Bit-Field Description

| Name | Function |
| --- | --- |
| DX STAT | DX pin status. Reflects value driven on to DX pin when selected as a general purpose output. |
| DR STAT | DR pin status. Reflects value on DR pin. |
| RIOEN | Receive/Transmit General Purpose I/O Mode |

TABLE 4-continued

Serial Port Control Register (SPCR) Bit-Field Description

| Name | Function |
|---|---|
| XIOEN | (R/X)IOEN = 0, DR/DX pin is not a general purpose I/O<br>(RX)IOEN = 1, DR/DX pin used as general purpose I/O |
| CLKSTP | Clock Stop Mode<br>CLKSTP = 000b, Clock Stop Mode Disabled<br>CLKSTP = 100b, Clock starts with rising edge without delay<br>CLKSTP = 101b, Clock starts with rising edge with delay<br>CLKSTP = 110b, Clock starts with falling edge without delay<br>CLKSTP = 111b, Clock starts with falling edge with delay<br>CLKSTP = other, reserved |
| DLB | Digital Loop Back Mode<br>DLB = 0, Digital loop back mode disabled<br>DLB = 1, Digital loop back mode enabled |
| RJUST | Receive Sign-Extension and Justification Mode<br>RJUST = 00b, right-justify and zero-fill MSBs in DRR<br>RJUST = 01b, right-justify and sign-extend MSBs in DRR<br>RJUST = 10b, left-justify and zero-fill LSBs in DRR<br>RJUST = 11b, reserved |
| RINTM<br>XINTM | Receive/Transmit Interrupt mode<br>(R/X)INTM = 00b,(RX)INT driven by (R/X)RDY<br>(R/X)INTM = 01b, (R/X)INT generated by new block in multi-channel mode<br>(R/X)INTM = 10b, (R/X)INT generated by a new frame synchronization<br>(R/X)INTM = 11b, (R/X)INT generated by (R/X)SYNCERR |
| RSYNCERR<br>XSYNCERR | Receive/Transmit Synchronization Error<br>(R/X)SYNCERR = 0, no synchronization error<br>(R/X)SYNCERR = 1, synchronization error detected by MCSP. |
| RFULL | Receive Shift Register (RSR) Full<br>RFULL = 0, RBR is not full<br>RFULL = 1, RBR is full and DRR is not read |
| XEMPTY- | Transmit Shift Register (XSR) Empty<br>XEMPTY- = 0, XSR is empty<br>XEMPTY- = 1, XSR is not empty |
| RRDY<br>XRDY | Receiver/Transmitter Ready<br>(R/X)RDY = 0, receiver/transmitter is not ready.<br>(R/X)RDY = 1, receiver is ready with data to be read from DRR or transmitter is ready with data in DXR. |
| RRST-<br>XRST- | Receiver/transmitter reset. This resets and enables the receiver/transmitter.<br>(R/X)RST- = 0, The serial port receiver/transmitter is disabled and in reset state.<br>(R/X)RST- = 1, The serial port receiver/transmitter is enabled. |

TABLE 5

Pin Control Register (PCR) Bit-Field Description

| Name | Function |
|---|---|
| XIOEN<br>RIOEN | Transmit/Receive General Purpose I/O Mode<br>(R/X)IOEN = 0, DR pin is not a general purpose input; DX pin is not a general purpose output<br>(R/X)IOEN = 1, DR pin is a general purpose input; DX pin is a general purpose output.<br>The serial port pins do not perform serial port operation. |
| FSXM | Transmit Frame Synchronization Mode<br>FSXM = 0, Frame synchronization signal derived from an external source<br>FSXM = 1, Frame synchronization is determined by the Sample Rate Generator frame synchronization mode bit FSGM in the SRGR. |
| FSRM | Receive Frame Synchronization Mode<br>FSRM = 0, Frame synchronization pulses generated by an external device. FSR is an input pin<br>FSRM = 1, Frame synchronization generated internally by sample rate generator. FSR is an output pin except when GSYNC = 1 in SRGR. |

TABLE 5-continued

Pin Control Register (PCR) Bit-Field Description

| Name | Function |
|---|---|
| CLKS_STAT | CLKS pin status. Reflects value driven on to CLKS pin when selected as a general purpose output. |
| DX_STAT | DX pin status. Reflects value driven on to DX pin when selected as a general purpose output. |
| DR_STAT | DR pin status. Reflects value on DR pin when selected as a general purpose input. |
| FSXP<br>FSRP | Receive/Transmit Frame Synchronization Polarity<br>FS(R/X)P = 0, Frame synchronization pulse FS(R/X) is active high<br>FS(R/X)P = 1, Frame synchronization pulse FS(R/X) is active low |
| CLKXP | Transmit Clock Polarity<br>CLKXP = 0, Transmit data sampled on rising edge of CLKX<br>CLKXP = 1, Transmit data sampled on falling edge of CLKX |
| CLKRP | Receive Clock Polarity<br>CLKRP = 0, Receive data sampled on falling edge of CLKR<br>CLKRP = 1, Receive data sampled on rising edge of CLKR |

The Receive and Transmit Control Registers (RCR and XCR) shown in FIG. 7 and FIG. 8 configure various parameters of receive and transmit operation respectively. The operation of each bit-field will be discussed in later sections. Table 6 describes each bit field of RCR and XCR.

TABLE 6

Receive/Transmit Control Register (RCR/XCR) Bit-Field Description

| Name | Function |
|---|---|
| (R/X)PHASE | Receive/Transmit Phases<br>(R/X)PHASE = 0, single phase frame<br>(R/X)PHASE = 1, dual phase frame |
| (R/X)FRLEN(1/2) | Receive/Transmit Frame Length 1/2 |
| (R/X)WDLEN(1/2) | Receive/Transmit Word Length 1/2 |
| RCOMPAND<br>XCOMPAND | Receive/Transmit Companding Mode. Modes other than 00b are only enabled when the appropriate (R/X)WDLEN is 000b, indicating 8-bit data.<br>(R/X)COMPAND = 00b, no companding, data transfer starts with MSB first.<br>(R/X)COMPAND = 01b, no companding, 8-bit data, transfer starts with LSB first.<br>(R/X)COMPAND = 10b, compand using $\mu$-law for receive/transmit data.<br>(R/X)COMPAND = 11b, compand using A-law for receive/transmit data. |
| RFIG<br>XFIG | Receive/Transmit Frame Ignore<br>(R/X)FIG = 0, Receive/Transmit Frame synchronization pulses after the first restarts the transfer.<br>(R/X)FIG = 1, Receive/Transmit Frame synchronization pulses after the first are ignored. |
| RDATDLY<br>XDATDLY | Receive/Transmit data delay<br>(R/X)DATDLY = 00b, 0-bit data delay<br>(R/X)DATDLY = 01b, 1-bit data delay<br>(R/X)DATDLY = 10b, 2-bit data delay<br>(R/X)DATDLY = 11b, reserved |

As shown in FIG. 4, the receive operation is triple-buffered and transmit operation is double buffered. Receive data arrives on data receive pin DR and is shifted into the receive shift register RSR. Once a full word (8-, 12-, 16-, 20-, 24-, or 32-bit) is received, the RSR is always copied to the Receive Buffer Register, RBR. RBR is then copied to data read register DRR unless DRR is not read by the CPU or DMA.

Transmit data is written by the CPU or DMA to the data transmit register DXR. If there is no data in the XSR, the value in the DXR is copied tithe XSR. Otherwise, the DXR is copied to the transmit shift register XSR after the last bit of data in the DXR has been shifted out on DX. After transmit frame synchronization, the XSR begins shifting out the transmit data on data transfer pin DX.

The serial port transmitter and receiver are independently reset by the RRST- and XRST- bits in the Serial Port Control register. If RRST- =XRST-=0, the entire serial port is in reset state. A device reset 76 also places the serial port in the reset state. When device reset 76 is removed, RRST-=XRST- =0, keeping the entire serial port in the reset state. Table 7 shows the state of MCSP pins when the serial port is reset due to receiver/transmitter reset (XRST- =RRST- =0) and due to device reset 76.

TABLE 7

Reset State of MCSP Pins

| MCSP PINS | DEVICE RESET | MCSP RESET |
|---|---|---|
| | | Receiver Reset (RRST- = 0) |
| DR | Hi-Z | Hi-Z Input |
| CLKR | Hi-Z | Hi-Z if Input; CLKRP if Output |
| FSR | Hi-Z | Hi-Z if Input; FSRP(inactive state) if Output |
| CLKS | Hi-Z | Input should be pulled-up or pulled-down ONLY if transmitter is also reset or if the transmitter is configured with CLKSM = 1 in SRGR. |
| | | Transmitter Reset (XRST- = 0) |
| DX | Hi-Z | Hi-Z Output |
| CLKX | Hi-Z | Hi-Z if Input; CLKXP if Output |
| FSX | Hi-Z | Hi-Z if Input; FSXP(inactive state) if Output |
| CLKS | Hi-Z | Input should be pulled-up or pulled-down ONLY if receiver is also reset or if the receiver is configured with CLKSM = 1 in SRGR. |

The following occurs when the MCSP is reset:

1) The state machine is reset to its initial state. This initial state includes resetting counters and status bits. The receive status bits include RFULL, RRDY, and RSYNCERR. The transmit status bits include XEMPTY-, XRDY, and XSYNCERR. (R/X)SYNCERR can also be cleared to zero by the user.

2) Activity in the corresponding section (transmitter/receiver) of the serial port stops. FS(R/X) is driven to its inactive state if they are outputs or are placed in a high impedance state (high impedance state) if they are configured as inputs (external frame synchronization when FS(R/X)M=0).

CLK(R/X) is set to the value of its polarity bit, CLK(R/X)P, if driven by the internal sample rate generator or placed in a high impedance state (high impedance state) if the transmit and receive clocks are treated as inputs to the MCSP. Lastly, the D(R/X) pins will be in high impedance state when the transmitter and/or receiver and/or the device is reset. One exception is that the internal sample rate generator clock, CLKG, runs as configured regardless of the reset state of the serial port. The frame sync signal FSG from the sample rate generator is driven to an inactive state (same as the value on the frame sync polarity bit, FS(R/X)P) to facilitate for FSR/FSX if FS(R/X)M=1 during reset.

3) When MCSP is reset due to device reset 76, all serial port pins are driven to the hi-Z state. When the serial port remains in reset state, but not the device, the DR and DX pins may be used as general purpose I/O as described in a later section.

The serial port initialization procedure includes the following steps:

1) Set XRST-=RRST-=0 in SPCR.
2) Program only the MCSP configuration registers (and not the data registers) listed in Table 2 as required when the serial port is in reset state (XRST-=RRST-=0).
3) Wait for two bit clocks. This is to ensure proper synchronization internally.
4) Set XRST-=RRST-=1 to enable the serial port. Note that the value written to the SPCR at this time should have only the reset bits changed to 1 and the remaining bit-fields should have the same value as in Step 2 above.

Alternatively, on either write (Steps 1 and 4 above), the transmitter and receiver may be placed in or taken out of reset, individually by only modifying the desired bit. Note that the necessary duration of the active-low period of XRST- or RRST- is at least two bit clocks (CLKR/CLKX) wide.

Note: (a) The appropriate bit-fields in the serial port configuration registers SPCR, PCR, RCR, XCR, and SRGR should only be modified by the user when the affected portion of the serial port is in reset. (b) Data register DXR can be modified by the CPU or DMA only when the transmitter is not in reset (XRST-=1). (c) The multi-channel selection registers MCR, XCER, and RCER can be modified at any time as long as they are not being used by the current block in the multi-channel selection; the multi-channel mode case is described in one detail with respect to FIGS. 47–51.

For example, the following values in the control registers resets and configures the transmitter while the receiver is running:

| | |
|---|---|
| SPCR = 0x0030 0001 | Transmitter reset, transmit interrupt (XINT to CPU) generated by XSYNCERR; receiver is running with RINT driven by RRDY. |
| PCR = 0x0000 0A00 | FSX determined by FSGM in SRGR, receive clock driven by external source, transmit clock continues to be driven by sample rate generator. |
| SRGR-0x2000 0001 | CPU clock drives the sample rate generator clock (CLKG) after a divide-by-2. A DXR-to-XSR copy generated the transmit frame sync signal. |
| XCR = 0x8421 0840 | Dual phase frame; phase 1 has nine 16-bit words; phase 2 has five 12-bit words, and 1-bit data delay |
| SPCR = 0x0031 0001 | Transmitter taken out of reset |

The Ready Status is indicated by RRDY and XRDY. RRDY and XRDY indicate the ready status of the MCSP receiver and transmitter, respectively. Writes and reads of the serial port may be synchronized by polling RRDY and XRDY, or by using the events to DMA (REVT and XEVT) or interrupts to CPU (RINT and XINT) that they generate. Note that reading the DRR and writing to DXR affects RRDY and XRDY.

Receive Ready Status includes the following: REVT, RINT, and RRDY; RRDY=1 indicates that the RBR contents have been copied to the DRR and that the data can be read by the CPU or DMA. Once that data has been read by either the CPU or DMA, RRDY is cleared to 0. Also, at device reset or serial port receiver reset (RRST-=0), the RRDY is cleared to 0 to indicate no data has yet been received and loaded into DRR. RRDY directly drives the MCSP receive event to the DMA (REVT). Also, the MCSP receive interrupt (RINT) to the CPU may be driven by RRDY if RINTM=00b in the SPCR.

Transmit Ready Status includes the following: XEVT, XINT, and XRDY: XRDY=1 indicates that the DXR contents have been copied to XSR and that DXR is ready to be loaded with a new data word. When the transmitter transitions from reset to non-reset (XRST- transitions from 0 to 1), the XRDY also transitions from 0 to 1 indicating that the DXR is ready for new data. Once new data is loaded by the CPU or DMA, XRDY is cleared to 0. However, once this data is copied from the DXR to the XSR, XRDY transitions again from 0 to 1. Now again, the CPU or DMA can write to DXR although XSR has not been shifted out on DX as yet. XRDY directly drives the transmit synchronization event to the DMA (XEVT). Also, the transmit interrupt (XINT) to the CPU may also be driven by XRDY if XINTM=00b in the SPCR.

CPU Interrupts: are requested by (R/X)INT. The receive interrupt (RINT) and transmit interrupt (XINT) signals the CPU of changes to the serial port status. Four options exist for configuring these interrupts. They are set by the receive/transmit interrupt mode bit-field, (R/X)INTM, in the SPCR.

1) (R/X)INTM=00b. Interrupt on every serial word by tracking the (R/X)RDY bits in the SPCR. The RRDY and XRDY bits were described previously.

2) (R/X)INTM=01b. Interrupt after every 16-channel block boundary (in multi-channel selection mode) has been crossed within a frame. In any other serial transfer case, this setting is not applicable and therefore no interrupts are generated. This is described in detail later.

3) (R/X)INTM=10b. Interrupt on detection of frame synchronization pulses. This generates an interrupt even when the transmitter/receiver is in reset. This is done by synchronizing the incoming frame sync pulse to the CPU clock and sending it to the CPU via (R/X)INT. This is described in detail later.

4) (R/X)INTM=11b. Interrupt on frame synchronization error.

Note that if any of the other interrupt modes are selected, (R/X)SYNCERR may be read to detect this condition. Synchronization error is described in more detail later.

FIG. 9 shows typical operation of the MCSP clock and frame sync signals. Serial clocks CLKR, and CLKX define the boundaries between bits for receive and transmit respectively. Similarly, frame sync signals FSR and FSX define the beginning of a serial word. The MCSP allows configuration of various parameters for data frame synchronization. This can be done independently for receive and transmit which includes the following options:

1) Polarities of FSR, FSX, CLKX, and CLKR may be independently programmed.

2) A choice of single or dual-phase frames.

3) For each phase, the number of words is programmable.

4) For each phase, the number of bits per word is programmable.

Subsequent frame synchronization may restart the serial data stream or be ignored.

5) The data bit delay from frame synchronization to first data bit can be 0-, 1-, or 2-bit delays.

6) Right or left-justification as well as sign-extension or zero-filling can be chosen for receive data.

Frame and Clock Operation will now be described. Receive and transmit frame sync pulses can be generated either internally by the sample rate generator (described later) or driven by an external source. This can be achieved by programming the mode bit, FS(R/X)M, in the PCR. FSR is also affected by the GSYNC bit in the SRGR (described later). Similarly, receive and transmit clocks can be selected to be inputs or outputs by programming the mode bit, CLK(R/X)M, in the PCR.

When FSR and FSX are inputs (FSXM=FSRM=0, external frame sync pulses), the MCSP detects them on the internal falling edge of clock, CLKR_int, and CLKX_int respectively (See FIG. 38). The receive data arriving at DR pin is also sampled on the falling edge of CLKR_int. Note that these internal clock signals are either derived from external source via CLK(R/X) pins or driven by the sample rate generator clock (CLKG) internal to the MCSP.

When FSR and FSX are outputs, implying that they are driven by the sample rate generator, they are generated (transition to their active state) on the rising edge of internal clock, CLK(R/X)_int. Similarly data on DX pin is output on the rising edge of CLKX_int.

FSRP, FSXP, CLKRP, and CLKXP configure the relative polarities of the external FSR, FSX, CLKR, and CLKX signals as shown in Table 5. All frame sync signals (FSR_int; FSX_int) internal to the serial port are active high. If the serial port is configured for external frame synchronization (FSR/FSX are inputs to MCSP), and FSRP=FSXP=1, the external active low frame sync signals are inverted before being sent to the receiver (FSR_int) and transmitter (FSX_int). Similarly, if internal synchronization (FSR/FSX are output pins and GSYNC=0) is selected, the internal active high sync signals are inverted if the polarity bit FS(R/X)P=1, before being sent to the FS(R/X) pin. FIG. 38 shows this inversion using XOR gates, 3801 and 3802.

On the transmit side, the transmit clock polarity bit, CLKXP, sets the edge used to shift and clock out transmit data. Note that data is always transmitted on the rising edge of CLKX_int. If CLKXP=1, and external clocking is selected (CLKXM=0 and CLKX is an input), the external falling-edge triggered input clock on. CLKX is inverted to a rising-edge triggered clock before being sent to the transmitter. If CLKXP=1, and internal clocking selected (CLKXM=1 and CLKX is an output pin), the internal (rising-edge triggered) clock, CLKX_int, is inverted before being sent out on the CLKX pin.

Similarly, on the transmitter side, the configuration is so that the receiver can reliably sample data that is clocked with a rising edge clock (by the transmitter). The receive clock polarity bit, CLKRP, sets the edge used to sample received data. Note that the receive data is always sampled on the falling edge of CLKR_int. Therefore, if CLKRP=1 and external clocking is selected (CLKRM=0 and CLKR is an input pin), the external rising edge triggered input clock on CLKR is inverted to a falling-edge before being sent to the receiver. If CLKRP=1, and internal clocking is selected (CLKRM=1), the internal falling-edge triggered clock is inverted to a rising-edge before being sent out on the CLKR pin.

Note that in a system where the same clock (internal or external) is used to clock the receiver and transmitter, CLKRP=CLKXP. The receiver uses the opposite edge as the transmitter to guarantee valid setup and hold of data around this edge. FIG. 10 shows how data clocked by an external serial device using a rising edge may be sampled by the MCSP receiver with the falling edge of the same clock.

Frame Synchronization Phases will now be described. Frame synchronization is used to indicate the beginning of a transfer on the MCSP. The data stream following frame synchronization may have two phases, phase 1 and phase 2. The number of phases in a data stream can be selected by the phase bit, (R/X)PHASE, in the RCR and XCR. The number of words per frame and bits per word can be independently selected for each phase via (R/X)FRLEN(1/2) and (R/X)WDLEN(1/2) respectively. FIG. 11 shows an example of a frame where the first phase consists of 2 words of 12 bits each followed by a second phase of 3 words of 8 bits each. Note that the entire bit stream in the frame is contiguous. There are no gaps either between words or between phases.

Table 8 shows the bit-fields in the receive/transmit control register (RCR/XCR) that control the number of words/frame and bits/word for each phase for both the receiver and transmitter. The maximum number of words per frame is 128, and the number of bits per word can be 8-, 12-, 16-, 20-, 24-, or 32-bits.

TABLE 8

RCR/XCR Bit-fields Controlling Words/Frame and Bits/Word

| Serial Port MCSP0/1 | Frame Phase | RCR/XCR Bit-field Words/Frame | Control Bits/Word |
| --- | --- | --- | --- |
| Receive | 1 | RFRLEN1 | RWDLEN1 |
| Receive | 2 | RFRLEN2 | RWDLEN2 |
| Transmit | 1 | XFRLEN1 | XWDLEN1 |
| Transmit | 2 | XFRLEN2 | XWDLEN2 |

Frame Length, (R/X)FRLEN(1/2), will now be described, with reference to Table 9. Frame length can be defined as the number of serial words (8-, 12-, 16-, 20-, 24-, or 32-bit) transferred per frame. It corresponds to the number of words or logical time slots or channels per frame synchronization signal. The 7-bit (R/X)FRLEN(1/2) field in the (R/X)CR supports up to 128 words per frame as shown in Table 9. Note that (R/X)PHASE=0 represents a single phase data frame and a (R/X)PHASE=1 selects a dual phase for the data stream. Note that for a single phase frame, FRLEN2 is a don't care. The user is cautioned to program the frame length fields with w minus 1, where w represents the number of words per frame. For the example in FIG. 11, (R/X)FRLEN1=1 or 0000001b and (R/X)FRLEN2=2 or 0000010b.

TABLE 9

MCSP Receive/Transmit Frame Length 1/2 Configuration

| (R/X)PHASE | (R/X)FRLEN1 | (R/X)FRLEN2 | Frame Length |
| --- | --- | --- | --- |
| 0 | $0 \leq n \leq 127$ | X | Single Phase Frame; (n + 1) words per frame |
| 1 | $0 \leq n \leq 127$ | $0 \leq m \leq 127$ | Dual Phase Frame; (n + 1) plus (m + 1) words per frame |

Word Length, (R/X)WDLEN(1/2), will now be described. The 3-bit (R/X)WDLEN(1/2) fields in the receive/transmit control register determine the word length in bits per word for the receiver and transmitter for each phase of the frame as shown in Table 8. Table 10 shows how the value of word lengths in bits. For the example in FIG. 11, (R/X)WDLEN1= 0001b, and (R/X)WDLEN2=000b. Note that if (R/X)PHASE=0 indicating a single phase frame, R/X)WDLEN2 is not used by the MCSP and its value is a don't care.

TABLE 10

MCSP Receive/Transmit Word Length Configuration

| (R/X)WDLEN(1/2) | MCSP Word Length (bits) |
| --- | --- |
| 000 | 8 |
| 001 | 12 |
| 010 | 16 |
| 011 | 20 |
| 100 | 24 |
| 101 | 32 |

TABLE 10-continued

MCSP Receive/Transmit Word Length Configuration

| (R/X)WDLEN(1/2) | MCSP Word Length (bits) |
| --- | --- |
| 110 | reserved |
| 111 | reserved |

Data Packing using Frame Length and Word Length will now be described. The frame length and word length can be manipulated to effectively pack data. For example, consider a situation where four 8-bit words are transferred in a single phase frame as shown in FIG. 12. In this case.
 (R/X)FRLEN1=0000011b, 4-word frame
 (R/X)PHASE=0, single phase frame
 (R/X)FRLEN2=X
 (R/X)WDLEN1=000b, 8-bit words In this case, four 8-bit data elements are transferred to and from the MCSP by the CPU or DMA. Thus, four reads of DRR and four writes of DXR are necessary for each frame.

The example in FIG. 12 can also be treated as a data stream of a single phase frame consisting of one 32-bit data word as shown in FIG. 13. In this case:
 (R/X)FRLEN1=0b, 1-word frame
 (R/X)PHASE=0, single phase frame
 (R/X)FRLEN2=X
 (R/X)WDLEN1=101b, 32-bit words.

In this case, one 32-bit data word is transferred to and from the MCSP by the CPU or DMA. Thus, one read of DRR and one write of DXR is necessary for each frame. This results in only one-fourth the number of transfers compared to the previous case. This manipulation reduces the percentage of bus time required for serial port data movement.

Data Delay, (R/X)DATDLY, will now be described. The start of a frame is defined by the first clock cycle in which frame synchronization is found to be active. The beginning of actual data reception or transmission with respect to the start of the frame can be delayed if required. This delay is called data delay. RDATDLY and XDATDLY specify the data delay for reception and transmission, respectively. The range of programmable data delay is zero to two bit-clocks ((R/X)DATDLY=00b -10b) as described in Table 6 and shown in FIG. 14. Typically 1-bit delay is selected as data often follows a one-cycle active frame sync pulse.

Normally, frame sync pulse is detected or sampled with respect to an edge of serial clock CLK(R/X)_int (described earlier). Thus, on the following cycle or later (depending on data delay value), data may be received or transmitted. However, in the case of zero-bit data delay, the data must be ready for reception and/or transmission on the same serial clock cycle. For reception, this problem is solved as receive data is sampled on the first falling edge of CLKR_int where an active high FSR_int is detected. However, data transmission must begin on the rising edge of CLKX_int clock that generated the frame synchronization. Therefore, the first data bit is assumed to be present in the XSR and thus DX. The transmitter then asynchronously detects the frame synchronization, FSX_int, going active high, and immediately starts driving the first bit to be transmitted on the DX pin.

Another common mode is a data delay of two. This configuration allows the serial port to interface to different types of T1 framing devices where the data stream is preceded by a framing bit. During reception of such a stream with data delay of two bits (framing bit appears after one-bit delay and data appears after 2-bit delay), the serial port essentially discards the framing bit from the data stream as shown in FIG. 15. In transmission, by delaying the first transfer bit, the serial port essentially inserts a blank period (high impedance period) where framing bit should be. Here, it is expected that the framing device inserts its own framing bit or that the framing bit is generated by another device.

A Multi-phase Frame Example will now be described. FIG. 16 shows an example of the Audio Codec '97 (AC97) standard which uses the dual phase frame feature. The first phase consists of a single 16-bit word. The second phase consists of 12 20-bit words. The phases are configured as follows:

(R/X)PHASE=1b, dual phase frame
(R/X)FRLEN1=0b, 1 word per frame in phase 1
(R/X)WDLEN1=010b, 16-bits per word in phase 1
(R/X)FRLEN2=0001011b, 12 words per frame in phase 2
(R/X)WDLEN2=011b, 20-bits per word in phase 2
CLK(R/X)P=0, receive data sampled on falling edge of CLKR_int; transmit data clocked on rising edge of CLKX_int.
FS(R/X)P=0, active high frame sync signals
(R/X)DATDLY=01b, data delay of one bit-clock FIG. 16 shows the timing of AC97 near frame synchronization. First notice that the frame sync pulse itself overlaps the first word. In MCSP operation, the inactive to active transition of the frame synchronization signal actually indicates frame synchronization. For this reason, frame synchronization may be high an arbitrary number of bit clocks. Only after the frame synchronization is recognized to have gone inactive and then active again is the next frame synchronization recognized.

Also notice in FIG. 17, there is one-bit data delay. Notice that regardless of the data delay, transmission can: occur without gaps. The last bit of the previous (last) word in phase 2 is immediately followed by the first data bit of the first word in phase 1 of the next data frame.

MCSP Standard Operation Mode will now be described. Depending on the mode of operation, there can be periods of serial port inactivity between packets or transfers. In this case, the receive and transmit frame synchronization pulse occurs for every serial word transfer. When the MCSP is not in reset state and:has been configured for the desired operation, a serial transfer can be initiated by programming (R/X)PHASE=0 for a single phase frame with required number of words programmed in (R/X)FRLEN1. The number of words can range from 1 to 128 ((R/X)FRLEN1=0x0 to 0x7F). The required serial word length is set in the (R/X)WDLEN1 field in the (R/X)CR. If dual phase is required for the transfer, RPHASE=1, (R/X)FRLEN(1/2) can be set to any value between 0x0 to 0x7F which represents 1 to 128 words.

FIG. 18 shows an example of a single phase data frame comprising one 8-bit word. Since the transfer is configured for one data bit delay, the data on the DX and DR pins are available one bit clock after FS(R/X) goes active. This figure as well as all others in this section make the following assumptions:

(R/X)FRLEN1=0b, 1 word per frame
(R/X)PHASE=0, single phase frame
(R/X)FRLEN2=X, don't care
(R/X)WDLEN1=000b, 8-bit word
(R/X)CLKP=0, receive data clocked on falling edge; transmit data clocked on rising edge
FS(R/X)P=0, active high frame sync signals
(R/X)DATDLY=0.1b, one-bit data delay FIG. 19 shows an example of serial reception. Once receive frame synchronization (FSR_int) transitions to its active state, it is detected on the first falling edge of CLKR_int of the receiver. The data on the DR pin is then shifted into the receive shift register (RSR) after the appropriate data delay as set by RDATDLY. The contents of RSR is then shifted to RBR. RRDY is activated on every RBR-to-DRR copy to indicate that the receive data register (DRR) is ready with the data to be read by the CPU or DMA. RRDY is deactivated when the DRR is read by the CPU or DMA.

FIG. 20 shows an example of serial transmission. Once transmit frame synchronization occurs, the value in the transmit shift register, XSR, is shifted out and driven on the DX pin after the appropriate data delay as set by XDATDLY. XRDY is activated on every DXR-to-XSR copy indicating that the data transmit register (DXR) is written with the next data to be transmitted. XRDY is deactivated when the DXR is written by the CPU or DMA.

FIG. 21 shows the MCSP operating at maximum packet frequency. The total number of words in a frame, whether single phase or dual phase, may be called the serial transfer packet. The packet frequency is determined by the period between frame synchronization signals:

$$\text{Packet Frequency} = \frac{(\text{Bit-Clock Frequency})}{(\text{Number of Bit Clocks Between Frame Sync Signals})}$$

The packet frequency may be increased by decreasing the distance between frame synchronization signals in bit clocks (limited only by the number of bits per packet). As the packet transmit frequency is increased, the inactivity period between the data packets for adjacent transfers decreases to zero. The minimum distance between frame synchronization is the number of bits transferred per packet. This distance also defines the maximum packet frequency:

$$\text{Maximum Packet Frequency} = \frac{(\text{Bit-Clock Frequency})}{(\text{Number of Bits Per Frame or Packet})}$$

At maximum packet frequency, the data bits in consecutive packets are transmitted contiguously with no inactivity between bits. If there is a one-bit data delay as shown, the frame synchronization pulse overlaps the last bit transmitted in the previous packet.

Effectively, this permits a continuous stream of data, and, thus the frame synchronization pulses are essentially redundant. Theoretically, then, only an initial frame synchronization pulse is required to initiate the multi-packet transfer. The MCSP does support operation of the serial port in this fashion by ignoring the successive frame sync pulses. Data is clocked in to the receiver or clocked out of the transmitter on every clock. The frame ignore bit, (R/X)FIG. in the (R/X)CR can be programmed to ignore the successive frame sync pulses until the desired frame length or number of words is reached. This is explained later.

Frame Synchronization Ignore Mode will now be described. The MCSP can be configured to ignore transmit and receive frame synchronization pulses. The (R/X)FIG bit in the (R/X)CR can be programmed to zero and not ignore frame sync pulses, or, be set to one and ignore frame sync pulses. This way the user can use (R/X)FIG bit to either pack data or ignore unexpected frame sync pulses. Data packing is explained in the following paragraph; and MCSP operation on unexpected frame sync pulses in the next paragraph.

Data Packing using Frame Sync Ignore Bits will now be described. One method of changing the word length and frame length to simulate 32-bit serial word transfers was described with reference to FIG. 12, thus requiring much lesser bus bandwidth. This example worked when there were multiple words, per frame. Now consider the case of the MCSP operating at maximum packet frequency as shown in FIG. 22. Here, each frame only has a single 8-bit word. This stream takes one read and one write transfer for each 8-bit word. FIG. 23 shows the MCSP configured to treat this stream as a continuous stream of 32-bit words. In this example (R/X)FIG is set to 1 to ignore subsequent frames after the first. Here, only one read and one write transfer is needed every 32-bits. This configuration effectively reduces the required bus bandwidth to one-fourth.

Frame Sync Ignore and Unexpected Frame Sync Pulses will now, be described. The previous section explained how frame ignore bits can be used to pack data and efficiently use the bus bandwidth. (R/X)FIG bit can also be used to ignore unexpected frame sync pulses. Unexpected frame sync pulses are those that occur at a time when they are not expected. Thus, any frame sync pulse which occurs one or more bit clocks earlier than the programmed data delay ((R/X)DATDLY) is deemed as unexpected. Setting the frame ignore bits to one causes the serial port to ignore these unexpected frame sync signals.

In reception, if not ignored (RFIG=0), an unexpected FSR pulse will discard the contents of RSR in favor of the new incoming data. Therefore if RFIG=0, an unexpected frame synchronization pulse aborts the current data transfer, sets RSYNCERR in the SPCR to 1, and begins the transfer of a new data word. This is described in more detail later. When RFIG=1, reception continues, ignoring the unexpected frame sync pulses.

If (R/X)FIG is set to zero, these frame sync pulses are not ignored. In transmission, if not ignored (XFIG=0), an unexpected FSX pulse will abort the present transmission, cause one data packet to be lost, sets the XSYNCERR in the SPCR to 1, and initiates a new transmission. This is described in more detail later. When XFIG=1, normal transmission continues with unexpected frame sync signals ignored.

FIG. 24 shows an example wherein word B is interrupted by an unexpected frame sync pulse when (R/X)FIG=0. In the case of reception, the reception of B is aborted (B is lost), and a new data word (C in this example) is received after the appropriate data delay. This condition is a receive synchronization error and thus sets the RSYNCERR field. However, for transmission, the transmission of B is aborted, and the same data (B) is re-transmitted after the appropriate data delay. This condition is a, transmit synchronization error and thus sets the XSYNCERR field. Synchronization errors are discussed later. In contrast, FIG. 25 shows MCSP operation when unexpected frame synchronization signals are ignored by setting (R/X)FIG=1. Here, the transfer of word B is not affected by an unexpected frame synchronization.

Serial Port Exception Conditions will now be described. There are five serial port events that may constitute a system error, as follows:

1) Receive Overrun (RFULL=1). This occurs when RBR is full and the previous received data in the DRR has not been read (RRDY=1) by the CPU or DMA. The contents of RBR will not be transferred to DRR until DRR has been read.

2) Unexpected Receive Frame Synchronization (RSYNCERR=1). This can occur during reception when RFIG=0 and an unexpected frame sync pulse occurs. An unexpected frame sync pulse is defined as that which occurs RDATDLY minus one or more bit-clocks earlier than the first bit of the next associated word. This causes the current data reception to abort and restart. If new data has been copied into the RBR from RSR since the last RBR-to-DRR copy, this new data in RBR will be lost. This is because no RBR-to-DRR copy occurs as the reception has been restarted.

3) Transmit Data Overwrite. Here the user overwrites data in the DXR before it is copied to the XSR. The data previously in the DXR is never transferred on DX since it never got copied to the XSR.

4) Transmit Empty (XEMPTY- 0). If a new frame synchronization signal arrives before new data is loaded into the DXR, the old data in the DXR will be sent again. This will continue for every new frame sync signal that arrives on the FSX pin until the DXR is loaded with new data.

5) Unexpected Transmit Frame Synchronization (XSYNCERR=1). This can occur during transmission when XFIG=0 and an unexpected frame sync pulse occurs. Again, an unexpected frame sync pulse is defined as that which occurs XDATDLY minus one or more bit-clocks earlier than the first bit of the next associated word. This causes the current data transmission to abort and restart the current transfer. If new data had been written to the DXR since the last DXR-to-XSR copy, the current value in the XSR will be lost. Otherwise, the previous value will be retransmitted.

These events are described in more detail in the following paragraphs.

Reception with Overrun, RFULL will now be described. RFULL=1 in the SPCR indicates that the receiver has experienced overrun. Overrun occurs when: RBR is full, and DRR has not been read since the last RBR-to-DRR transfer (RRDY=1).

During this condition, any new data input on DR pin will still be shifted into RSR. Once a complete word is shifted into RSR, and RFULL=1, the receiver halts and waits for DRR to be read and does not perform a RBR-to-DRR transfer. At this time any data arriving on the DR pin will be lost. This data loss is because completion of reception of a serial word triggers an RSR-to-DRR transfer only when RRDY=0. Note that after the receive portion starts running from reset, a minimum of three words must be received before RFULL is set. That is because there was no last RBR-to-DRR transfer before the first word.

Any one of the following events clears the RFULL bit to 0 and allows subsequent transfers to be read properly: 1.) Reading DRR; 2.) Resetting the receiver (RRST-=0) or the device. Another frame synchronization is required to restart the receiver.

FIG. 26 shows a receive overrun condition. Because serial word A is not read before the completion of the reception of serial word B, B is never transferred to the DRR. Thus, at the end of reception of B, RFULL is set. When the DRR is finally read, the value A is still in the DRR. Because the read of the DRR occurs after the serial word C has started transfer, C is never shifted into the RSR.

FIG. 27 shows the case where RFULL is set, but the overrun condition is averted by reading the contents of DRR before the next serial word. This ensures an RBR-to-DRR copy of data B occurs before the next serial word is transferred from RSR to RBR.

Unexpected Receive Frame Synchronization, RSYNCERR, will now be described. FIG. 28 shows the decision tree that the receiver uses to handle all incoming frame synchronization pulses. The diagram assumes that the receiver has been started, RRST-=1. Unexpected frame sync pulses can originate from an external source or from the internal sample rate generator. Any one of four cases can occur:

Case 1: FSR_int pulses during receive overrun. The transfer of word C in FIG. 26 is an example of this. These frame sync pulses are ignored and receiver stays halted.

Case 2: Unexpected FSR_int pulses with RFIG=1. This case is discussed with reference to FIG. 25. Here, receive frame sync pulses are ignored and the reception continues.

Case 3: Normal serial port reception. Note that there are three possible reasons why a receive might NOT be in progress:

1) This FSR is the first after RRST-=1.
2) This FSR is the first after DRR is read clearing a RFULL condition.
3) The serial port is in the inter-packet intervals. Thus, at maximum packet frequency, frame synchronization can still be received RDATDLY bit clocks before the first bit of the associated word. Alternatively, an unexpected frame sync pulse is detected when it occurs at or before RDATDLY minus one bit clock before the last bit of the previous word is received on DR pin.

For this case, reception continues normally since these tare not unexpected frame sync pulses.

4) Case 4: Unexpected receive frame synchronization with RFIG=0 (unexpected frame not ignored). This case was shown in FIG. 24 for maximum packet frequency. FIG. 29 shows this case during normal operation of the serial port with inter-packet intervals. In both cases, RSYNCERR bit in the SPCR is set. RSYNCERR can be cleared only by receiver reset or by the user writing a 0 to this bit in the SPCR. Note that if RINTM=11b in the SPCR, RSYNCERR drives the receive interrupt (RINT) to the CPU.

Transmit with Data Overwrite will now be described. FIG. 30 depicts what happens if the data in DXR is over-written before being transmitted. Initially, the programmer loaded the DXR with data C. A subsequent write to the DXR overwrites C with D before it is copied to the XSR. Thus, C is never transmitted on DX. The CPU can avoid data overwrite by polling XRDY before writing to DXR or by waiting for an XINT programmed to be triggered by XRDY (XINTM=00b). The DMA can avoid overwriting by write synchronizing data transfers with XEVT.

XEMPTY- indicates whether the transmitter has experienced under-flow. Any of the following conditions causes XEMPTY- to become active (XEMPTY-=0):

1) Under-flow during transmission. DXR has not been loaded since the last DXR-to-XSR copy, and all bits of the data word in the XSR have been shifted out on DX.
2) The transmitter is reset (XRST-=0 or device is reset) and then restarted.

When XEMPTY-=0, the transmitter halts and places DX in high-impedance until the next frame synchronization. XEMPTY- is deactivated (XEMPTY-=1) after DXR is loaded by either the CPU or DMA. If DXR is reloaded after a halt due to under-flow, the device begins transmission again. In the case of internal frame generation, the transmitter re-generates a single FSX_int initiated by a DXR-to-XSR copy (FSXM=1 in the XCR and FSGM=0 in SRGR). Otherwise, the transmitter waits for the next frame synchronization.

FIG. 31 depicts a transmit under-flow condition. After B is transmitted, the programmer fails to reload the DXR before the subsequent frame synchronization. Thus, B is again transmitted on DX. FIG. 32 shows the case of writing to DXR just before a transmit under-flow condition that would otherwise occur. After B is transmitted, C is written to DXR before the next transmit frame sync pulse occurs so that C is successfully transmitted on DX, thus averting a transmit empty condition.

Unexpected Transmit Frame Synchronization, XSYNCERR, will now be described. FIG. 33 shows the decision tree that the transmitter uses to handle all incoming frame synchronization signals. The diagram assumes that the transmitter has been started, XRST-=1. Any one of three cases can occur:

Case 1: Unexpected FSX_int pulses with XFIG=1. This case is discussed with reference to FIG. 25.

Case 2: Normal serial port transmission was discussed earlier. Note that there are two possible reasons why a transmit might NOT be in progress:

1) This FSX_int pulse is the first after XRST-=1.
2) The serial port is in the inter-packet intervals. Thus, if operating at maximum packet frequency, frame synchronization can still be received XDATDLY bit clocks before the first bit of the associated word.

Case 3: Unexpected transmit frame synchronization with XFIG=0.

The case for subsequent frame synchronization with XFIG=0 at maximum packet frequency is shown in FIG. 24. FIG. 34 shows the case for normal operation of the serial port with inter-packet intervals. In both cases, XSYNCERR bit in the SPCR is set. XSYNCERR can only be cleared by transmitter reset or by the user writing a 0 to this bit in the SPCR. Note that if XINTM=11b in the SPCR, XSYNCERR drives the receive interrupt (XINT) to the CPU. Note further that the XSYNCERR bit in the SPCR is a read/write bit. Therefore, writing a 1 to it sets the error condition. Typically, writing a 0 is expected.

Receive Data Justification and Sign-Extension, RJUST, will now be described. RJUST in the SPCR selects whether data in the RBR is right or left justified (with respect to the MSB) in the DRR. If right-justification is selected RJUST further selects whether the data is sign-extended or zero-filled. Table 11 shows the effect various modes of RJUST have on an example 12-bit receive data value 0xABC.

TABLE 11

Use of RJUST Field with 12-Bit Example Data 0xABC

| RJUST | Justification | Extension | Value in DRR |
|---|---|---|---|
| 00 | right | zero-fill MSBs | 0x00000ABC |
| 01 | right | sign-extend MSBs | 0xFFFFFABC |
| 10 | left | zero-fill LSBs | 0xABC00000 |
| 11 | reserved | reserved | reserved |

Operation of the μ-LAW/A-LAW Companding Hardware (R/X)COMPAND, will now be described. Companding (COMpress and exPAND) hardware allows compression and expansion of data in either μ-law or A-law format. The companding standard employed in the United States and Japan is μ-law. The European companding standard is referred as A-law. The specification for μ-law and A-law log PCM is part of the CCITT G.711 recommendation. A-law and μ-law allows 13-bits and 14-bits of dynamic range, respectively. Any values outside this range will be set to the most positive or most negative value.

The μ-law and A-law formats encode this data into 8-bit code words. Thus, as companded data is always 8-bit wide, the appropriate (R/X)WDLEN(1/2) must be set to 0, indicating 8-bit wide serial data stream. If either phase of the frame does not have 8-bit word length, then companding is automatically disabled for that portion (transmit or receive) and phase.

When companding is used transmit data is encoded according to specified companding law, and receive data is decoded to 2's complement format. Companding is enabled and the desired format selected by appropriately setting (R/X)COMPAND in the (R/X)CR as shown in Table 6. Compression occurs during the process of copying data from the DXR-to-XSR and from the RBR-to-DRR as shown in FIG. 35.

For transmit data to be compressed, it should be a 16-bit left justified data, say LAW16. The value can be either. 13- or 14-bits depending on the companding law. This is shown in FIG. 36.

For reception, the 8-bit compressed data in RBR is expanded to a left-justified 16-bit data, LAW16. This can be further justified to a 32-bit data by programming the RJUST field in the SPCR as shown in Table 12.

TABLE 12

Justification of Expanded Data (LAW16)

| RJUST | DRR | | | |
|---|---|---|---|---|
| | 31 | 16 | 15 | 0 |
| 00 | 0 | | LAW16 | |
| 01 | sign | | LAW16 | |
| 10 | LAW16 | | 0 | |
| 11 | reserved | | | |

If the MCSP is otherwise unused, the companding hardware can compand internal data. This can be used to:

a) Convert linear to the appropriate µ-law or A-law format.

b), Convert µ-law or A-law to the linear format.

c) To observe the quantization effects in companding by transmitting linear data, and compressing and re-expanding this data. This is only useful if both XCOMPAND and COMPAND enable the same companding format.

FIG. 37 shows two methods by which the MCSP can compand internal data.

1) When both the transmit and receive sections of the serial port are reset, the DRR and DXR are internally connected through the companding logic by link 3701. Values from the DXR are compressed as selected by XCOMPAND and then expanded as selected by RCOMPAND. Data is available within four CPU clocks after being written. The advantage of this method is its speed. The disadvantage is that there is no synchronization available to the CPU and DMA to control the flow.

2) The MCSP is enabled in digital loop back mode with link 3702 with companding appropriately enabled by RCOMPAND and XCOMPAND. Receive and transmit interrupts (RINT when RINTM=0 and XINT when XINTM=0) or synchronization events (REVT and XEVT) allow synchronization of the CPU or DMA to these conversions, respectively. Here, the time for this companding depends on the serial bit rate selected.

Normally, all transfers on the MCSP are sent and received with the MSB first. However certain 8-bit data protocols (that don't use companded data) require the LSB to be transferred first. By setting the (R/X)COMPAND=01b in the (R/X)CR, the bit ordering of 8-bit words are reversed (LSB first) before being sent to the serial port. Similar to companding, this feature is only enabled if the appropriate (R/X)WDLEN(1/2) is set to 0, indicating 8-bit words to be transferred serially. If either phase of the frame does not have 8-bit word length, then LSB first ordering is automatically disabled for that portion (transmit or receive) and phase.

Programmable Clock and Framing will now be described. The MCSP has several means of selecting clocking and framing for both the receiver and transmitter. Clocking and framing can be sent to both portions by the sample rate generator. Both portions can select external clocking and/or framing independently. FIG. 38 shows a block diagram of the clock and frame selection circuitry. The features enabled by this logic are explained in the following paragraphs.

The sample rate generator 3820 is composed of a three stage clock divider 3910–3912 that allows programmable data clocks (CLKG) and framing signals (FSG) as shown in FIG. 39. CLKG and FSG are MCSP internal signals that can be programmed to drive receive and/or transmit clocking (CLKR/X) and framing (FSR/X). The sample rate generator can be programmed to be driven by an internal clock source or an internal clock derived from an external clock source. The three stages compute:

1) Clock divide down 3910 (CLKGDV): The number of input clocks per data bit clock.

2) Frame period divide down 3911 (FPER): The frame period in data bit clocks.

3) Frame width count down 3912 (FWID): The width of an active frame pulse in data bit clocks.

In addition, a frame pulse detection and clock synchronization module allows synchronization of the clock divide down with an incoming frame pulse.

The Sample Rate Generator Register (SRGR) shown in FIG. 40 and Table 13 controls the operation of various features of the sample rate generator. The following sections describe how its operation can be configured using the SRGR bit-fields.

TABLE 13

Sample Rate Generator Register (SRGR) Bit-Field Summary

| Name | Function |
|---|---|
| GSYNC | Sample rate generator clock synchronization. Only used when the external clock (CLKS) drives the sample rate generator clock (CLKSM = 0). GSYNC = 0, the sample rate generator clock (CLKG) is always running. GSYNC = 1, the sample rate generator clock (CLKG) is synchronized and frame sync signal (FSG) is generated only after detecting the receive frame synchronization signal (FSR). Also, frame period, FPER, is a don't care because the period is dictated by the external frame sync pulse. |
| CLKSP | CLKS Polarity Clock Edge Select. Only used when the external clock CLKS drives the sample rate generator clock (CLKSM = 0). CLKSP = 0, falling edge of CLKS generates CLKG and FSG. CLKSP = 1, rising edge of CLKS generates CLKG and FSG. |
| CLKSM | MCSP Sample Rate Generator Clock Mode CLKSM = 0, Sample rate generator clock derived from the CLKS pin. CLKSM = 1 Sample rate generator clock derived from CPU clock. |
| FSGM | Sample Rate Generator Transmit frame synchronization mode. Used when FSXM = 1 in XCR. FSGM = 0, Transmit frame sync signal (FSX) due to DXR-to-XSR copy. FSGM = 1, Transmit frame sync signal driven by the sample rate generator frame sync signal, FSG. |
| FPER | Frame Period. This determines when the next frame sync signal should become active. |
| FWID | Frame Width. Determines the width of the frame sync pulse, FSG, during its active period. |

TABLE 13-continued

Sample Rate Generator Register (SRGR) Bit-Field Summary

| Name | Function |
| --- | --- |
| CLKGDV | Sample rate generator clock divider. This value is used as the divide-down number to generate the required sample rate generator clock frequency. |

Data Clock Generation will now be described. When the receive/ transmit clock mode is set to 1 (CLK(R/X)M=1), the data clocks (CLK(R/X)) are driven by the internal sample rate generator output clock, CLKG. A variety of data bit clocks can be selected independently for the receiver and transmitter. These options include:

1) The input clock to the sample rate generator can be either the CPU clock or a dedicated external clock input (CLKS).

2) The input clock (CPU clock or external clock CLKS) source to the sample rate generator can be divided down by a programmable value (CLKGDV) to drive CLKG.

The CLKSM bit in the SRGR selects either the. CPU clock (CLKSM=1) or the external clock input (CLKSM=0), CLKS, as the source for the sample rate generator input clock. Any divide periods are divide-downs calculated by the sample rate generator and are timed by this input clock selection.

The CLK GDV field determines the sample rate generator data bit clock rate. The first divider :stage generates the serial data bit clock from the input clock. This divider stage utilizes a counter that is pre-loaded by CLKGDV which contains the divide ratio value. The output of this stage is the data bit clock which is output on sample rate generator output, CLKG, and serves as the input for the second and third divider stages. CLKG has a frequency equal to 1/(CLKGDV+1) of sample rate generator input clock. Thus, sample generator input clock frequency is divided by a value from 1–256. When CLKGDV is odd or equal to 0, the CLKG duty cycle is, 50%. When CLKGDV is an even value, 2p, representing an odd divide-down, the high state duration is p+1 cycles and the low state duration is p cycles.

Bit Clock Polarity is determined by CLKSP. External clock (CLKS) is selected to drive the sample rate generator clock divider by selecting CLKSM=0. In this case, the CLKSP bit in the SRGR selects the edge of CLKS on which sample rate generator data bit clock (CLKG) and frame sync signal (FSG) are generated. Either the falling edge (CLKSP=0) or the rising edge (CLKSP=1) of the external clock can cause transitions on the data bit-rate clock and FSG.

Bit Clock and Frame Synchronization will now be described. When CLKS is selected to drive the sample rate generator (CLKSM=0), GSYNC can be used to configure the timing of CLKG relative to CLKS. GSYNC=1 ensures that the MCSP and the external device it is communicating to, are dividing down the CLKS with the same phase relationship. If GSYNC=0, this feature is disabled and therefore CLKG runs freely and is never re-synchronized. If GSYNC=1, an active transition on FSR triggers a re-synchronization of CLKG and generation of FSG. CLKG always begins with a high state after synchronization. Also, FSR is always detected at the same edge of CLKS that generates CLKG. Although an external FSR is provided, FSG can still drive internal receive frame synchronization when GSYNC=1. Note that when GSYNC=1, FPER is a don't care because the frame period is determined by the arrival of the external frame sync pulse.

FIG. 41 and FIG. 42 shows this operation with various polarities of CLKS and FSR. These figures assume: FWID=0, for a FSG one CLKG wide. Note that FPER is not programmed since it is determined by the arrival of the next external frame sync pulse. The figure shows what happens to CLKG at time 4101 (FIG. 41) and 4201 (FIG. 42) when it is initially in sync and GSYNC=1 as well as not in sync with the frame synchronization and GSYNC=1.

When GSYNC=1, the transmitter can operate synchronously with the receiver providing:

1), FSX is programmed to be driven by the sample rate generator frame sync FSG (FSGM=1 in the SRGM and FSXM=1 in the XCR). If the input FSR has the timing so that it can be sampled by the falling edge of CLKG, it can be used instead, by setting FSXM=0 in the XCR and connecting FSR to FSX externally.

2) The sample rate generator clock should drive the transmit and receive bit clock (CLK(R/X)M=1 in the SPCR). Therefore, the CLK(R/X) pin should not be driven by any other driving source.

Digital Loop Back Mode, DLB, will now be described. Setting DLB=1 in the SPCR enables digital loop back mode. During DLB mode, the DR, FSR, and CLKR are internally connected to DX, FSX, CLKX respectively, through link 3702 (FIG. 37) and multiplexers 3810–3811 as shown in FIG. 38. DLB mode allows testing of serial port code with a single DSP device. FIG. 38 shows the multiplexing of receiver control inputs during digital loop back mode.

Receive Clock Selection, DLB, CLKRM, will now be described. Table 14 shows how the digital loop back bit (DLB) and the CLKRM bit in the PCR can select the receiver clock. In digital loop back mode (DLB=1), the transmitter clock drives the receiver. CLKRM determines whether the CLKR pin is an input or an output.

TABLE 14

Receive Clock Selection

| DLB in SPCR | CLKRM in RCR | Source of Receive Clock | CLKR Pin |
| --- | --- | --- | --- |
| 0 | 0 | CLKR pin acts as an input driven by external clock and inverted as determined by CLKRP before being used. | Input |
| 0 | 1 | Sample Rate Generator Clock (CLKG) drives CLKR. | Output. CLKG inverted as deter-mined by CLKRP before being driven out on CLKR. |
| 1 | 0 | CLKX_int drives CLKR_int as selected and inverted. | High Impedance |

TABLE 14-continued

Receive Clock Selection

| DLB in SPCR | CLKRM in RCR | Source of Receive Clock | CLKR Pin |
|---|---|---|---|
| 1 | 1 | CLKX_int drives CLKR_int as selected and inverted. | Output. CLKR inverted as deter-mined by CLKRP before being driven out. |

Transmit Clock Selection, CLKXM will now be described. Table 15 shows how one of two transmit clock sources can be selected.

TABLE 15

Transmit Clock Selection

| CLKXM in XCR | Source of Transmit Clock | CLKX Pin |
|---|---|---|
| 0 | External clock drives the CLKX input pin. CLKX is inverted as determined by CLKXP before being used. | Input |
| 1 | Sample rate generator clock, CLKG, drives transmit clock | Output. CLKG inverted as determined by CLKXP before being driven out on CLKX. |

Frame Sync Signal Generation will now be described. Like data bit clocking, data frame synchronization is also independently programmable for the receiver and transmitter for all data delays. Programming options include:

1) A frame pulse with programmable period between sync pulses, and programmable active width using the sample rate generator register (SRGR).

2) The transmit portion may trigger its own frame sync signal generated by a DXR-to-XSR copy.

3) Both the receive and transmit sections may independently select an external frame synchronization on the FSR and FSX pins, respectively.

Frame Period is determined by FPER The second divider stage in the sample rate generator is a 12-bit counter which counts the generated data clocks from 0 to 4095. Once the value of the counter matches the programmed frame period (FPER), the frame counter is reset to zero and a FSG is generated. Then the counting process restarts. Thus, the value of FPER+1 determines a frame length from 1 to 4096 data bits. When GSYNC=1, FPER is a don't care value. FIG. 43 shows a frame of period 16 CLKG periods (FPER=15 or 00001111b).

Frame Width is determined by FWID. The FWID field controls the active width of the frame sync pulse. When the counter keeping track of the frame period (FPER) reaches the value programmed in FWID, the frame pulse becomes inactive. Thus, the value of FWID+1 determines a active frame pulse width ranging from 1 to 256 data bit clocks. FIG. 43 shows a frame with an active width of 2 CLKG periods (FWID=1).

Receive Frame Sync Selection is determined by DLB, FSRM, and GSYNC. Table 16 shows how various sources may be selected to provide the receive frame synchronization signal. Note that in digital loop back mode (DLB=1) the transmit frame sync signal is used as the receive frame sync signal and that DR is connected to DX internally.

TABLE 16

Receive Frame Synchronization Selection

| DLB in SPCR | FSRM in PCR | GSYNC in SRGR | Source of Receive Frame Synchronization | FSR Pin |
|---|---|---|---|---|
| 0 | 0 | x | External frame sync signal drives the FSR input pin. This is then inverted as determined by FSRP before being used as FSR_int. | Input |
| 0 | 1 | 0 | FSR_int driven by Sample Rate Generator Frame Sync signal (FSG) | Output. FSG inverted determined by FSRP before being driven out on FSR pin. |
| 0 | 1 | 1 | FSR_int driven by Sample Rate Generator Frame Sync signal (FSG) | Input. The external frame sync input on FSR is used to synchronize CLKG and generate FSG. |
| 1 | 0 | 0 | FSX_int drives FSR_int. FSX is selected. | High Impedance. |
| 1 | X | 1 | FSX_int drives FSR_int and is selected | Input. External FSR not used for frame synchroniza-tion but still used to synchro-nize CLKG and generate FSG since GSYNC = 1. |
| 1 | 1 | 0 | FSX_int drives FSR_int and is | Output. Receive (same as |

TABLE 16-continued

Receive Frame Synchronization Selection

| DLB in SPCR | FSRM in PCR | GSYNC in SRGR | Source of Receive Frame Synchronization | FSR Pin |
|---|---|---|---|---|
| | | | selected. | transmit) frame synchronization inverted as determined by FSRP before being driven out. |

Transmit Frame Sync Signal Selection is determined by FSXM, and FSGM. Table 17 shows how you can select the source of transmit frame synchronization pulses can be selected. The three choices are:
1) External frame sync input.
2) The sample rate generator frame sync signal, FSG.
3) A signal that indicates a DXR-to-XSR copy has been made.

TABLE 17

Transmit Frame Synchronization Selection

| FSXM in PCR | FSGM in SRGR | Source of Transmit Frame Synchronization | FSX Pin |
|---|---|---|---|
| 0 | x | External frame sync input on FSX pin. This is inverted by FSXP before being used as FSX_int. | Input. |
| 1 | 1 | Sample Rate Generator Frame Sync signal (FSG) drives FSX_int. | Output. FSG inverted by FSXP before being driven out on FSX pin. |
| 1 | 0 | A DXR-to-XSR copy activates transmit frame sync signal. | Output. One bit clock wide signal inverted by FSXP before being driven out on FSX pin. |

To facilitate detection of frame synchronization, the receive and transmit CPU interrupts (RINT and XINT) may be programmed to detect frame synchronization by setting RINTM=XINTM=10b, in the SPCR. Unlike other types of serial port interrupts, this mode can operate while the associated portion of the serial port is in reset (such as activating RINT when the receiver is in reset). In that case, the FS(R/X)M and FS(R/X)P still select the appropriate source and polarity of frame synchronization. Thus even when the serial port is in reset state, these signals are synchronized to CPU clock and then sent to the CPU in the form of RINT and XINT at the point at which they feed the receive and transmit portions of the serial port. Thus, a new frame synchronization pulse can be detected, after which the CPU can take the serial port out of reset safely.

Various examples of MCSP configurations will now be described. FIG. 44 shows MCSP configuration to be compatible with the Mitel ST-Bus which is a double rate ST-Bus. Note that this operation is running at maximum packet frequency. Various control bits are set as follows:
  a) CLK(R/X)M=1, CLK(R/X)_int generated internally by sample rate generator
  b) GSYNC=1, synchronize CLKG with external frame sync signal input on FSR. Also note that FSR is regenerated internally to form a minimum pulse width.
  c) CLKSM=1, External clock (CLKS) drives the sample rate generator.
  d) CLKSP=0, falling edge of CLKS generates CLKG and thus CLK(R/X)_int.
  e) CLKGDV=1, receive clock (shown as CLKR) is half of CLKS frequency.
  f) FS(R/X)P=1, active-low frame sync pulse.
  g) (R/X)FRLEN1=11111b, 32 words per frame.
  h) (R/X)WDLEN1=0, 8-bit word.
  i) (RX)PHASE=0, single phase frame and thus (R/X)FRLEN2=X.
  j) (R/X)DATDLY=0, no data delay.

FIG. 45 illustrates a single rate ST-BUS. This example is the same as the ST-BUS example except for the following:
  a) CLKGDV=0, CLKS drives CLK(R/X)_int without any divide down (single rate clock).
  b) CLKSP=1, rising edge of CLKS generates internal clocks CLKG, CLK(R/X)_int.

The rising edge of CLKS is used to detect the external FSR. This external frame sync pulse is used to re-synchronize internal MCSP clocks and generate frame sync for internal use. Note that the internal frame sync is generated so that it is wide enough to be detected on the falling edge of internal clocks.

FIG. 46 illustrates a Double Rate Clock Example. This example is the same as the ST-BUS example except for the following:
  a) GSYNC=0, CLKS drives CLKG. CLKG runs freely and is not re-synchronized by FSR.
  b) FS(R/X)M=0, frame synchronization is externally generated. The framing pulse is wide enough to be detected.
  c) FS(R/X)P=0, active-high input frame sync signal.
  d (R/X)DATDLY=1, data delay of 1-bit.
  e) CLKSP=1, rising edge of CLKS generates CLKG and thus CLK(R/X).

Multi-channel Selection Operation will now be described. Multiple channels can be independently selected for the transmitter and receiver by configuring the MCSP with a single phase frame as described earlier. The number of words per frame represented by (R/X)FRLEN1, denotes the number of channels available for selection.

Each frame represents a time-division multiplexed (TDM) data stream. In using time-division multiplexed data streams, the CPU may only need to process a few of them.

Thus, to save memory and bus bandwidth, multi-channel selection allows independent enabling of particular channels for transmission and reception. Up to 32 channels in an up to 128 channel bit stream can be enabled at any given time, but a dynamic scheme (described later) allows any combination of the 128 channels to be processed.

If a receive channel is not enabled, the following results:

1) RRDY is not set to 1 upon reception of the last bit of the word.

2) RBR is not copied to DRR upon reception of the last bit of the word. Thus, RRDY is not set active. This feature also implies that no interrupts or synchronization events are generated for this word.

If a transmit channel is not enabled, the following results:

1) DX is in high impedance.

2) A DXR-to-XSR transfer is not automatically triggered at the end of serial transmission of the related word.

3) XEMPTY- and XRDY similarly are not affected by the end of transmission of the related serial word.

A transmit channel which is enabled can have its data masked or transmitted. When masked, the DX pin will be forced to high impedance although the transmit channel is enabled.

The following control registers are used in multi-channel operation:

The Multi-channel Control (MCR) Register

The Transmit Channel Enable (XCER) Register

The Receive Channel Enable (RCER) Register.

The use of these registers in controlling multi-channel operation is described in the following sections.

The MCR is illustrated in FIG. 47 and described in Table 18.

TABLE 18

Multi-Channel Control Register Bit-Field Descriptions

| Name | Function |
|---|---|
| RMCM | Receive Multi-channel Selection Enable<br>RMCM = 0, all 128 channels enabled.<br>RMCM = 1, all channels disabled by default. Required channels are selected by enabling RP(A/B)BLK and RCER appropriately |
| XMCM | Transmit Multi-channel Selection Enable<br>XMCM = 00b, all channels enabled without masking (DX is always driven and never placed in a high impedance state).<br>XMCM = 01b, all channels disabled and therefore masked by default. Required channels are selected by enabling XP(A/B)BLK and XCER appropriately. Also, these selected channels are not masked and therefore DX is always driven.<br>XMCM = 10b, all channels enabled, but masked. Selected channels enabled via XP(A/B)BLK and XCER are unmasked.<br>XMCM = 11b, all channels disabled and therefore masked by default. Required channels are selected by enabling RP(A/B)BLK and RCER appropriately. Selected channels can be unmasked by RP(A/B)BLK and XCER. This mode is used for symmetric transmit and receive operation |
| RCBLK/<br>XCBLK | Receive/Transmit Current Block.<br>(R/X)CBLK = 000b, Block 0. Channel 0 to channel 15<br>(R/X)CBLK = 001b, Block 1. Channel 16 to channel 31<br>(R/X)CBLK = 010b, Block 2. Channel 32 to channel 47<br>(R/X)CBLK = 011b, Block 3. Channel 48 to channel 63<br>(R/X)CBLK = 100b, Block 4. Channel 64 to channel 79<br>(R/X)CBLK = 101b, Block 5. Channel 80 to channel 95<br>(R/X)CBLK = 110b. Block 6. Channel 96 to channel 111<br>(R/X)CBLK = 111b, Block 7. Channel 112 to channel 127 |
| RPBBLK/<br>XPBBLK | Receive/Transmit Partition B Block.<br>(R/X)PBBLK = 00b, Block 1. Channel 16 to channel 31<br>(R/X)PBBLK = 01b, Block 3. Channel 48 to channel 63<br>(R/X)PBBLK = 10b, Block 5. Channel 80 to channel 95<br>(R/X)PBBLK = 11b, Block 7. Channel 112 to channel 127 |

TABLE 18-continued

Multi-Channel Control Register Bit-Field Descriptions

| Name | Function |
|---|---|
| RPABLK/<br>XPABLK | Receive/Transmit Partition A Block.<br>(R/X)PABLK = 00b, Block 0. Channel 0 to channel 15<br>(R/X)PABLK = 01b, Block 2. Channel 32 to channel 47<br>(R/X)PABLK = 10b, Block 4. Channel 64 to channel 79<br>(R/X)PABLK = 11b, Block 6. Channel 96 to channel 111 |

Multi-channel mode can be enabled independently for receive and transmit by setting RMCM=1 and XMCM to a non-zero value in the MCR, respectively.

A total of 32 out of the available 128 channels may be enabled at any given point in time. The 128 channels comprise eight blocks (0 through 7) and each block has 16 contiguous channels. Further, even-numbered blocks 0, 2, 4, and 6 belong to Partition A, and odd-numbered blocks 1, 3, 5, and 7 belong to Partition B.

The number of channels enabled can be updated during the course of a 10 frame to allow any arbitrary group of channels to be enabled. This feature is accomplished using an alternating ping-pong scheme controlling two blocks (one odd-numbered and other even-numbered) of 16 contiguous channels each, at any given time within the frame. Thus one block belongs to Partition A and the other to Partition B.

Any two out of the eight 16-channel blocks may be selected, yielding a total of 32 channels that can be enabled. The blocks are allocated on 16-channel boundaries within the frame as shown in FIG. 48. (R/X)PABLK and (R/X) PBBLK fields in the MCR determine the blocks that get selected in partition A and B respectively. This enabling is performed independently for transmit and receive.

Transmit data masking allows a channel enabled for transmit to have its DX pin set to high impedance state during its transmit period. In systems where symmetric transmit and receive provides software benefits, this feature allows transmit channels to be disabled on a shared serial bus. A similar feature is not needed for receive as multiple reception cannot cause serial bus contention.

The following gives a description of the multi-channel operation during transmit for various XMCM values:

XMCM=00b: The serial port will transmit data over the DX pin for as many number of words as programmed in XFRLEN1. Thus, DX is driven and never masked.

XMCM=01b: Required channels or only those words that need to be transmitted are selected via XP(A/B)BLK and XCER.

Therefore only these selected words will be written to DXR and ultimately transmitted. In other words, if XINTM= 00b which implies that an XINT will be generated for every DXR-to-XSR copy, the number of XINT generated will be equal to the number of channels selected via XCER (and NOT equal to XFRLEN1).

XMCM=10b: For this case, all channels are enabled which means all the words in a data frame (XFRLEN1) will be written to DXR and DXR-to-XSR copy occurs at their respective times. However, DX will be driven only for those channels that are selected via XP(A/B)BLK and XCER and placed in a high impedance state otherwise. In this case, if XINTM=00b, the number of interrupts generated due to every DXR-to-XSR copy would equal the number of words in that frame (XFRLEN1).

XMCM=11b: This mode is basically a combination of XMCM=01b and 10b cases so that symmetric transmit and receive operation is achieved. All channels are disabled and therefore DR and DX are in high impedance state. For receive, a RBR-to-DRR copy occurs only for those channels that are selected via RP(A/B)BLK and RCER. If RINT were to be generated for every RBR-to-DRR copy, it would occur as many times as the number of channels selected in RCER (and NOT the number of words programmed in RFRLEN1). For transmit, the same block that is used for reception is used in order to maintain symmetry and thus XP(A/B)BLK is a don't care. DXR is loaded and DXR-to-XSR copy occurs for all the channels that are enabled via RP(A/B)BLK. However, DX will be driven only for those channels that are selected via XCER. Note that the channels enabled in XCER can only be a subset or same as those selected in RCER. Therefore, if XINTM=00b, transmit interrupts to the CPU would be generated as many times as the number of channels selected in RCER (not XCER).

FIGS. 49A–D shows the activity on the MCSP pins for all the above modes with the following conditions:

a) (R/X)PHASE=0, single phase frame for multi-channel selection enabled b) FRLEN1=011b, 4-word frame c) WDLEN1=any valid serial word length Note that in FIGS. 49A–49D, the arrows showing where the various events occur is only a sample indication. Wherever possible, there is a time window in which these events could occur.

The Receive Channel Enable (RCER) and Transmit Channel Enable (XCER) registers are used to enable any of the 32 channels for receive and transmit, respectively. Out of the 32 channels, 16 channels belong to a block in partition A and the other 16 belong to a block in partition B. They are shown in FIG. 50 and FIG. 51, (R/X)CEA and (R/X)CEB register fields shown in Table 19 enable channels within the 16 channel wide blocks in partitions A and B, respectively. The (R/X)PABLK and (R/X)PBBLK fields in the MCR select which 16-channel blocks get selected.

TABLE 19

Receive/Transmit Channel Enable Register Bit-Field Description

| Name | Function |
| --- | --- |
| (R/X)CEAn<br>0 ≦ n ≦ 15 | Receive/Transmit Channel Enable<br>(R/X)CEA n = 0, Disables reception/transmission of nth channel in an even-numbered block in partition A<br>(R/X)CEA n = 1, Enables reception/transmission of nth channel in an even-numbered block in partition A |
| (R/X)CEBn<br>0 ≦ n ≦ 15 | Receive/Transmit Channel Enable<br>(R/X)CEB n = 0, Disables reception/transmission of nth channel in odd-numbered block in partition B.<br>(R/X)CEB n = 1, Enables reception/transmission of nth channel in odd-numbered block in partition B. |

Channel selection may be changed. Using the multi-channel selection feature, a static group of 32 channels may be enabled, and will remain enabled with no CPU intervention until this allocation requires modification. An arbitrary number, group, or all of the words/channels within a frame can be accessed, by updating the block allocation registers during the course of the frame in response to the end-of-block interrupts.

However, care must be used when changing the selection, not to affect the currently selected block. The currently selected block is readable through the RCBLK and XCBLK fields in the MCR for receive and transmit respectively. The associated channel enable register cannot be modified if it is selected by the appropriate (R/X)P(A/B)BLK register to point toward the current block. Similarly the (R/X)PABLK and (R/X)PBBLK fields in the MCR cannot be modified while pointing to or being changed to point to the currently selected block. Note that if the total number of channels is 16 or less, the current partition is always pointed to. In this case, only a reset of the serial port can change enabling.

Update Interrupt is provided. At the end of every 16-channel block boundary during multi-channel operation, the receive interrupt (RINT) or transmit interrupt (XINT) to the CPU is generated if RINTM=01b or XINTM=01b in the SPCR, respectively. This interrupt indicates a new partition has been crossed. You can then check the current partition and change the selection of blocks in the A and/or B partitions if they do not point to the current block. These interrupts are two CPU clock long active high pulses. Note that if RINTM=XINTM=01b when (R/X)MCM=0 (non-multi-channel operation), it does not generate any interrupts.

The Clock Stop Mode, CLKSTP, will now be described. The clock stop mode provides compatibility with the SPI™ protocol. Clock stop mode works with single-phase frame configuration. Clock stop mode bit-field (CLKSTP) in the SPCR, allows serial clocks to be stopped between transfers using one of four possible timing variations as shown in Table 20.

When using. SPI-type of interface, frame sync occurs somewhat differently from that in other serial port modes of operation. In these types of interfaces, framing is essentially performed by the presence or absence of clock, and the only other signal involved is the slave enable signal, which simply serves to enable the serial data output driver on the slave device (device not outputting clock). Some devices do not have the slave enable. In order to interface to devices with and without the slave enable, an alternative framing scheme is used. When the MCSP is configured to operate in SPI mode, both the transmitter and the receiver operate together as a master or as a slave.

When the MCSP is the master device, FSX is set as an output (generated with a load of DXR), and connected to FSR and to the enable input on the slave device, if required. The MCSP generates a continuous clock internally and gates the clock off to the external interface when transfers are complete. In this case receive clock is provided from the internal, continuously running version, so the receiver and transmitter both work internally as if clocks do not stop.

When the MCSP is the slave device, the internal serial port logic performs transfers using only the exact number of input clock pulses per data bits. If the master device provides a slave enable signal, it is connected to FSX/FSR and is used in its asynchronous form. FSX, then, controls only the initial drive of data to the DX pin. If the master device does not provide a slave enable, the external FSR/FSX pins are connected to an active (as defined by FSX/FSR polarity control bits) level, and data is driven to the DX pin as soon as DXR is loaded. The input clock and frame sync from the master is synchronized to the CPU clock to allow reset. The first data to be transmitted is available on the DX, but is enabled only after detection of SPI clock.

In clock stop mode, for both the transmitter and receiver, stopping of clocks is handled differently depending on whether the clocks are externally or internally generated. In the case where clocks are externally generated, the external device that is generating clocks holds clocks appropriately between transmitted words. When serial port clock is internally generated, this clock runs continuously, and is simply gated off to the external interface when the transfer is complete. In this case, transfers are performed in the same fashion as with external free running clocks.

CLKSTP selects the appropriate clock scheme for a particular SPI interface as shown in Table 20 and FIG. 52. CLKSTP bit-field in the SPCR selects one of the following:

1) Whether clock stop mode is enabled or not.
2) In clock stop mode, whether the clock is high or low when stopped.

3) In clock stop mode, whether first clock edge occurs at the start of the first data bit or at the middle of the first data bit.

driven onto DX. DR is always an input and its value is held in the DR_STAT bit in the PCR. To configure CLKS as a general purpose input, both the transmitter and receiver has to be in reset state and (R/X)IOEN=1, because it is always an input to the MCSP and affects both transmit and receive operations.

TABLE 21

Configuration of Pins as General Purpose I/O

| Pin | General Purpose I/O Enabled by Setting Both | Selected as Output | Output Value Driven From | Selected as Input | Input Value Readable on |
|---|---|---|---|---|---|
| CLKX | XRST -= 0<br>XIOEN = 1 | CLKXM = 1 | CLKXP | CLKXM = 0 | CLKXP |
| FSX | XRST -= 0<br>XIOEN = 1 | FSXM = 1 | FSXP | FSXM = 0 | FSXP |
| DX | XRST -= 0<br>XIOEN = 1 | always | DX_STAT | never | does not apply |
| CLKR | RRST -= 0<br>RIOEN = 1 | CLKRM = 1 | CLKRP | CLKRM = 0 | CLKRP |
| FSR | RRST -= 0<br>RIOEN = 1 | FSRM = 1 | FSRP | FSRM = 0 | FSRP |
| DR | RRST -= 0<br>RIOEN = 1 | never | does not apply | always | DR_STAT |
| CLKS | RRST -= XRST -= 0<br>RIOEN = XIOEN = 1 | never | does not apply | always | CLKS_STAT |

TABLE 20

Serial Port Clock Scheme

| CLKSTP | Clock Scheme |
|---|---|
| 000 | Clock Stop Mode Disabled |
| 100 | Low inactive state without delay: The MCSP transmits data on the rising edge of the CLKX and receive data on the falling edge of the CLKR. |
| 101 | Low inactive state with delay: The MCSP transmits data one half cycle ahead of the rising edge of CLKX and receives data on the falling edge of the CLKR. |
| 110 | High inactive state without delay: The MCSP transmits data on the falling edge of the CLKX and receive data on the rising edge of the CLKR. |
| 111 | High inactive state with delay: The MCSP transmits data one half cycle ahead of the falling edge of CLKX and receives data on the rising edge of the CLKR. |

Two conditions allow the serial port pins (CLKX, FSX, DX, CLKR, FSR, and DR) to be used as general purpose I/O rather than serial port pins:

1) The related portion (transmitter or receiver) of the serial port is in reset; (R/X)RST-=0 in the SPCR, and
2) General purpose I/O is enabled for the related portion of the serial port; (R/X)IOEN=1 in the PCR.

The Pin Control Register shown in FIG. 6 has bits that configure each of the MCSP pins as general purpose inputs or outputs. Table 21 shows how this is achieved. In the case of FS(R/X), FS(R/X)M=0 configures the pin as an input and FS(R/X)M=1 configures that pin as an output. When configured as an output, the value driven on FS(R/X) is the value stored in FS(R/X)P. If configured as an input, the FS(R/X)P becomes a read only bit that reflects the status of that signal. CLK(R/X)M and CLK(R/X)P work similarly for CLK(R/X). When the transmitter is selected as general purpose I/O, the value of the DX_STAT bit in the PCR is Fabrication of data processing device 1 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice, which may be sold as bare die or packaged. After packaging, finished parts are biased into an operational state and tested for operational functionality.

An alternative embodiment of the novel aspects of the present invention may include other functional circuitries, which are combined with the functional circuitries disclosed herein in order to reduce the total gate count of the combined functions. Since those skilled in the art are aware of techniques for gate minimization, the details of such an embodiment will not be described herein.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A data processing device, comprising:
   a central processing unit (CPU) for executing instructions;
   a memory circuit connected to the CPU for storing a plurality of instructions which are executed by the CPU; and serial port interface circuitry connected to the CPU, operable to transmit and receive data, wherein the serial port interface circuitry further comprises:
  a data transmit output;
  a data transmit register connected to the data transmit output, the data transmit register operable to receive a plurality of transmit data words from the CPU;
  frame sync generation circuitry and control circuitry, operable to cause a serial data stream to be transmitted from the data transmit register via the data transmit output in a time-division multiplexed manner, such that a plurality of data channels exist in a frame of the transmitted serial data stream;
  at least a first control register operable to be loaded by an instruction executed by the CPU, wherein the first control register is operable to select a set of parameters for the frame, such that the set of parameters comprise a number of data channels in the frame;
  a multi-channel control register operable to be loaded by an instruction executed by the CPU to select a first mode of operation, the serial port interface circuitry operable in the first mode of operation to enable a first plurality of transmit data words from the plurality of data words to be transmitted in the plurality of data channels, such that each transmit data word in the first plurality of transmit data words is assigned to a respective channel in the plurality of data channels; wherein the multi-channel control register is operable to select a second mode of operation and to select a block of data channels from the plurality of data channels such that less than the entire plurality of data channels is selected, the serial port interface circuitry being operable in the second mode of operation to enable a second plurality of transmit data words from the plurality of data words to be assigned to the selected block of data channels;
  a transmit channel enable register for selecting a portion of the plurality of data channels and operable to be loaded by an instruction executed by the CPU, the serial port interface circuitry operable to mask transmission by the data transmit output of a non-selected portion of the plurality of data channels, such that each transmit data word assigned to the non-selected portion of data channels is not transmitted via the data transmit output; and
  wherein the selected portion of the plurality of data channels is selected only from the selected block of data channels.

2. The data processing device of claim 1, wherein the data transmit output is operable to be in a high impedance state during a transmit period of each masked data channel, whereby a plurality of serial port interface circuits can share a serial transmission bus.

3. The data processing device of claim 1, wherein the multi-channel control register is operable to select a third operating mode, the serial port interface circuitry operable in the third mode of operation to enable a third plurality of transmit data words from the plurality of data words to be assigned only to a respective one of the selected portion of the plurality of data channels, such that all of the third plurality of transmit data words are transmitted via the data transmit output.

4. The data processing device of claim 1, wherein the multi-channel control register is operable to select a second block of data channels while a first block of data channels is being transmitted.

5. The data processing device of claim 1, wherein the serial port interface circuitry further comprises:

a data receive input;
  a data receive register connected to the data receive input;
  receive control circuitry, operable to cause a serial data stream to be received from the data received register via the data receive input in a time-division multiplexed manner, such that a plurality of receive data channels exist in a frame of the received serial data stream; and
  a receive channel enable register for selecting a portion of the plurality of receive data channels and operable to be loaded by an instruction executed by the CPU, the serial port interface circuitry operable to disable reception of a non-selected portion of the plurality of receive data channels.

6. The data processing device of claim 5, wherein the serial port interface circuitry is operable to select a portion of the receive data channels that is different from the selected portion of data channels for transmission.

7. The data processing device of claim 6, wherein the selected portion of receive data channels is selected only from a block of receive data channels selected by the multi-channel control register.

8. A data processing device, comprising:
  a central processing unit (CPU) for executing instructions;
  a memory circuit connected to the CPU for storing a plurality of instructions which are executed by the CPU; and
  serial port interface circuitry connected to the CPU, operable to transmit and receive data, wherein the serial port interface circuitry further comprises:
    a data transmit output;
    a data transmit register connected to the data transmit output, the data transmit register operable to receive a plurality of transmit data words from the CPU;
    frame sync generation circuitry and control circuitry, operable to cause a serial data stream to be transmitted from the data transmit register via the data transmit output in a time-division multiplexed manner, such that a plurality of data channels exist in a frame of the transmitted serial data stream;
    at least a first control register operable to be loaded by an instruction executed by the CPU, wherein the first control register is operable to select a set of parameters for the frame, such that the set of parameters comprise a number of data channels in the frame;
    a multi-channel control register operable to be loaded by an instruction executed by the CPU to select a first mode of operation, the serial port interface circuitry operable in the first mode of operation to enable a first plurality of transmit data words from the plurality of data words to be transmitted in the plurality of data channels, such that each transmit data word in the first plurality of transmit data words is assigned to a respective channel in the plurality of data channels; wherein the multi-channel control register is operable to select a second mode of operation and to select a block of data channels from the plurality of data channels such that less than the entire plurality of data channels is selected, the serial port interface circuitry being operable in the second mode of operation to enable a second plurality of transmit data words from the plurality of data words to be assigned to the selected block of data channels;
    a transmit channel enable register for selecting a portion of the plurality of data channels and operable to be loaded by an instruction executed by the CPU, the serial port interface circuitry operable to mask transmission by the data transmit output of a non-selected portion of the plurality of data channels, such that each transmit data word assigned to the non-selected portion of data channels is not transmitted via the data transmit output;

a data receive input;

a data receive register connected to the data receive input;

receive control circuitry, operable to cause a serial data stream to be received from the data received register via the data receive input in a time-division multiplexed manner, such that a plurality of receive data channels exist in a flame of the received serial data stream;

a receive channel enable register for selecting a portion of the plurality of receive data channels and operable to be loaded by an instruction executed by the CPU, the serial port interface circuitry operable to disable reception of a non-selected portion of the plurality of receive data channels; and wherein the serial port interface circuitry is operable to select a portion of the receive data channels that is different from the selected portion of data channels for transmission.

9. The data processing device of claim 8, wherein the selected portion of receive data channels is selected only from a block of receive data channels selected by the multi-channel control register.

10. A data processing device, comprising:

a central processing unit (CPU) for executing instructions;

a memory circuit connected to the CPU for storing a plurality of instructions which are executed by the CPU; and serial port interface circuitry connected to the CPU, operable to transmit and receive data, wherein the serial port interface circuitry further comprises:

a data transmit output;

a data transmit register connected to the data transmit output, the data transmit register operable to receive a plurality of transmit data words from the CPU;

frame sync generation circuitry and control circuitry, operable to cause a serial data stream to be transmitted from the data transmit register via the data transmit output in a time-division multiplexed manner, such that a plurality of data channels exist in a frame of the transmitted serial data stream;

at least a first control register operable to be loaded by an instruction executed by the CPU, wherein the first control register is operable to select a set of parameters for the frame, such that the set of parameters comprise a number of data channels in the frame;

transmit channel enable register for selecting a portion of the plurality of data channels and operable to be loaded by an instruction executed by the CPU, the serial port interface circuitry operable to mask transmission by the data transmit output of a non-selected portion of the plurality of data channels, such that each transmit data word assigned to the non-selected portion of data channels is not transmitted via the data transmit output; a data receive input;

a data receive register connected to the data receive input;

receive control circuitry, operable to cause a serial data stream to be received from the data received register via the data receive input in a time-division multiplexed manner, such that a plurality of receive data channels exist in a frame of the received serial data stream; and a receive channel enable register for selecting a portion of the plurality of receive data channels and operable to be loaded by an instruction executed by the CPU, the serial port interface circuitry operable to disable reception of a non-selected portion of the plurality of receive data channels; and wherein the serial port interface circuitry is operable to select a portion of the receive data channels that is different from the selected portion of data channels for transmission.

11. The data processing device of claim 10, further comprising a multi-channel control register operable to be loaded by an instruction executed by the CPU to select a first mode of operation, the serial port interface circuitry operable in the first mode of operation to enable a first plurality of transmit data words from the plurality of data words to be transmitted in the plurality of data channels, such that each transmit data word in the first plurality of transmit data words is assigned to a respective channel in the plurality of data channels; and wherein the multi-channel control register is operable to select a second mode of operation and to select a block of data channels from the plurality of data channels such that less than the entire plurality of data channels is selected, the serial port interface circuitry being operable in the second mode of operation to enable a second plurality of transmit data words from the plurality of data words to be assigned to the selected block of data channels.

12. The data processing device of claim 11, wherein the selected portion of receive data channels is selected only from a block of receive data channels selected by the multi-channel control register.

* * * * *